(12) United States Patent
Suzuki et al.

(10) Patent No.: US 7,840,116 B2
(45) Date of Patent: Nov. 23, 2010

(54) BROADCAST RECEIVING TERMINAL

(75) Inventors: Takaaki Suzuki, Lawrenceville, NJ (US); Yuki Horii, Kyoto (JP)

(73) Assignee: Panasonic Corporation, Osaka (JP)

( * ) Notice: Subject to any disclaimer, the term of this patent is extended or adjusted under 35 U.S.C. 154(b) by 1085 days.

(21) Appl. No.: 11/421,145

(22) Filed: May 31, 2006

(65) Prior Publication Data
US 2006/0280434 A1 Dec. 14, 2006

Related U.S. Application Data

(60) Provisional application No. 60/685,380, filed on May 31, 2005.

(51) Int. Cl.
*H04N 5/91* (2006.01)

(52) U.S. Cl. .......................... 386/83; 386/95

(58) Field of Classification Search ................ 386/46, 386/83, 112, 125, 126
See application file for complete search history.

(56) References Cited

U.S. PATENT DOCUMENTS

| | | | |
|---|---|---|---|
| 6,185,360 B1 * | 2/2001 | Inoue et al. | 386/46 |
| 6,760,538 B1 | 7/2004 | Bumgardner et al. | |
| 7,369,750 B2 * | 5/2008 | Cheng et al. | 386/83 |
| 2002/0087989 A1 | 7/2002 | Proidl et al. | |
| 2004/0208477 A1 | 10/2004 | Bumgardner et al. | |
| 2004/0210949 A1 | 10/2004 | Sugiura et al. | |
| 2005/0100321 A1 | 5/2005 | Koudo et al. | |
| 2005/0102698 A1 | 5/2005 | Bumgardner et al. | |
| 2006/0053469 A1 | 3/2006 | Newton et al. | |
| 2006/0078296 A1 | 4/2006 | Takao | |

FOREIGN PATENT DOCUMENTS

| | | |
|---|---|---|
| JP | 2003-006445 | 1/2003 |
| JP | 2004-221907 | 8/2004 |
| WO | 02/093299 | 11/2002 |
| WO | 02/059973 | 7/2004 |

(Continued)

OTHER PUBLICATIONS

U.S. Appl. No. 11/383,816 to Hashimoto et al., which was filed on May 17, 2006.

(Continued)

*Primary Examiner*—Huy T Nguyen
(74) *Attorney, Agent, or Firm*—Greenblum & Bernstein, P.L.C.

(57) ABSTRACT

Although a scheduled recording that is set by an EPG (Electronic Program Guide) specifies in advance a time slot for using the resource, reproduction that is set by the EPG does not specify a time slot for using the resource. Therefore, although it is possible to carry out resource allocations for a plurality of scheduled recordings in advance, it is not possible to carry out a resource adjustment in advance when the scheduled recording and the reproduction operation use the same resource. However, when an adjustment process is performed after the starting time of the scheduled recording, the adjustment process itself takes up some time, thus giving rise to the possibility that the scheduled recording may not start at the specified starting time. The resource adjustment for the scheduled recording and the reproduction is initiated ahead of the starting time of the scheduled recording. The amount of time ahead of the scheduled recording, by which the resource adjustment is to be started, can be specified by the EPG.

17 Claims, 43 Drawing Sheets

FOREIGN PATENT DOCUMENTS

WO 2004/059973 7/2004

OTHER PUBLICATIONS

U.S. Appl. No. 11/420,639 to Horii, which was filed on May 26, 2006.
U.S. Appl. No. 11/421,146 to Horii, which was filed on May 31, 2006.
U.S. Appl. No. 11/421,126 to Hashimoto et al., which was filed on May 31, 2006.
U.S. Appl. No. 10/596,107 to Hashimoto et al., which was filed on May 31, 2006.
U.S. Appl. No. 11/420,982 to Kawakami et al., which was filed on May 30, 2006.
U.S. Appl. No. 11/349,955 to Horii et al., which was filed on Feb. 9, 2006.
U.S. Appl. No. 11/425,727 to Horii et al., which was filed on Jun. 22, 2006.
ETSI ES 201 812 v1.1.1 (Dec. 2003), Digital Video Broadcasting (DVB); Multimedia Home Platform (MHP) Specification 1.0.3.
English Language Abstract of JP 2004-221907.
English Language Abstract of JP 2003-006445.
OpenCable Application Platform Specification, OCAP 1.0 Profile. OC-SP-OCAP 1.0-114-050119 (Jan. 19, 2005).
OpenCable Application Platform Specification, OCAP Digital Video Recorder (DVR), OC-SP-OCAP-DVR-101-040524 (May 24, 2005).
OpenCable Application Platform Specification, OCAP Digital Video Recorder (DVR), OC-SP-OCAP-DVR-102-040524 (May 24, 2005).

* cited by examiner

FIG. 2

| Frequency Band | Application | Modulation Type |
|---|---|---|
| 5~130MHz | Out Of Band (OOB) Data exchange between broadcast station system and terminal | QPSK |
| 130~864MHz | In-band Normal television broadcast that includes video/audio | QAM |

FIG. 3

| Frequency Band | Application |
|---|---|
| 70~74MHz | Sending data from broadcast station system 101 to terminal apparatuses |
| 10.0~10.1MHz | Sending data from terminal apparatus A111 to broadcast station system 101 |
| 10.1~10.2MHz | Sending data from terminal apparatus B112 to broadcast station system 101 |
| 10.2~10.3MHz | Sending data from terminal apparatus C113 to broadcast station system 101 |

FIG. 4

| Frequency Band | Application |
|---|---|
| 150~156MHz | TV channel 1 |
| 156~162MHz | TV channel 2 |
| ⋮ | ⋮ |
| 310~311MHz | Radio Channel 1 |
| ⋮ | ⋮ |

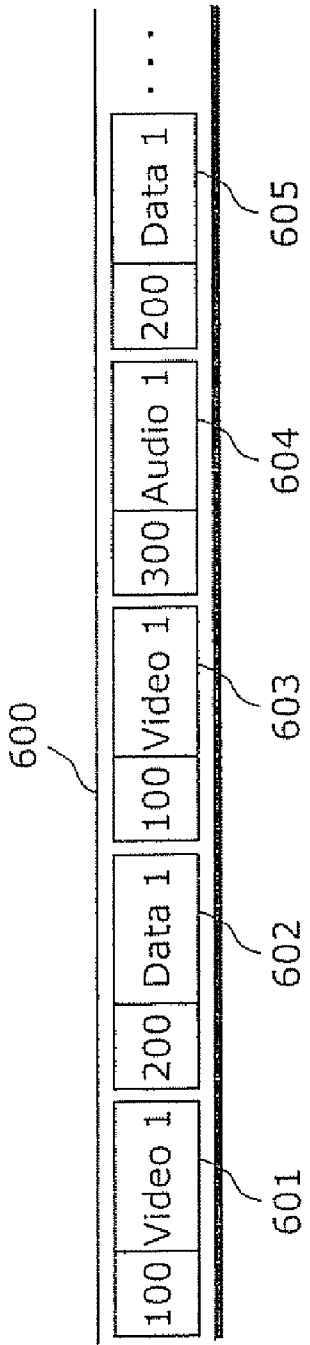

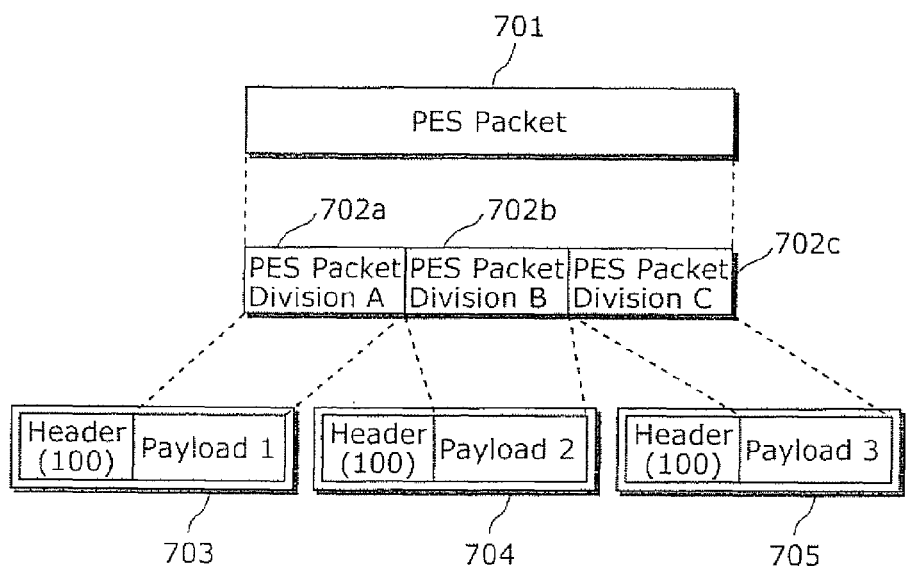
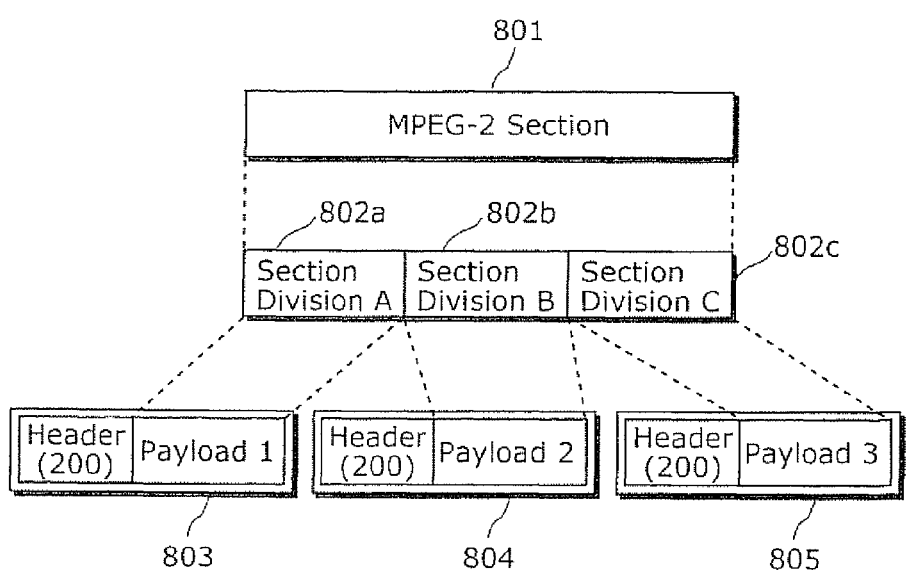

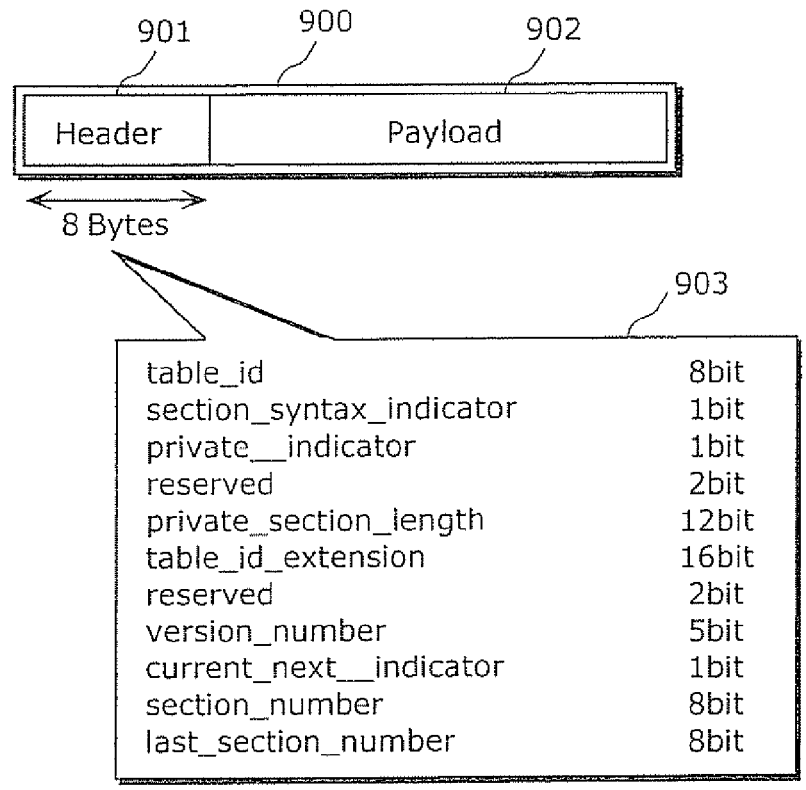

FIG. 11

| | | | | |
|---|---|---|---|---|
| Program Number | | | 101 | ←1100 |
| ES | Audio | 5011 | | ←1111 |
| | Video | 5012 | | ←1112 |
| | Data | 5013 | AIT | ←1113 |
| | Data | 5014 | DSMCC[1] | ←1114 |
| | Data | 5015 | DSMCC[2] | ←1115 |

| | | | |
|---|---|---|---|
| transport_stream_id | | 1000 | ←1200 |
| Program | 101 | 501 | ←1211 |
| | 102 | 502 | ←1212 |
| | 103 | 503 | ←1213 |

| Record Information Management Table | | | | | |
|---|---|---|---|---|---|
| 000 | 2 | 102 | 2005/03/30 11:00 | 2005/03/30 12:00 | TS_001 |
| 001 | 4 | 104 | 2005/04/01 21:00 | 2005/04/01 23:00 | TS_002 |
| 2001 Record Identifier | 2002 Channel Identifier | 2003 Program Number | 2004 Start Time | 2005 End Time | 2006 Media Identifier |

| | | | | |
|---|---|---|---|---|
| 2100 | AIT Version 2 | | | |
| 2111 | 301 | autostart | 1 | /a/TopXlet |
| 2112 | 302 | present | 1 | /b/GameXlet |
| 2113 | 303 | kill | 2 | /z/StudyXlet |
| 2114 | 304 | destroy | 1 | /b/MusicXlet |

2101 Java Program Identifier
2102 Control Information
2103 DSMCC Identifier
2104 Program Name

FIG. 24

| Exclusive device | Java program | Device client | Priority level |
|---|---|---|---|
| Tuner 1 | Program A | Client C | 10 |
| Tuner 2 | Program B | Client D | 50 |
| Tuner 3 | | | |

FIG. 33

| Service | Program | Recording time | Status | Schedule ID |
|---|---|---|---|---|
| Service 1 | Program A | May 5th 21:00~<br>May 5th 23:00 | Recording-standby | 1 |
| Service 2 | Program B | May 5th 21:00~<br>May 6th 0:30 | Recording-standby | 2 |
| Service 3 | Program A | May 7th 10:00~<br>May 7th 10:30 | Recording-standby | 3 |

3311　3312　3313　3314　3315

3301　3302　3303

| Conflict solution time | Schedule ID |
|---|---|
| May 5th 20:59 | 1 |
| May 5th 23:29 | 2 |
| May 7th 9:59 | 3 |

| Service 3311 | Program 3312 | Recording time 3313 | Status 3314 | Schedule ID 3315 | Recording priority flag 4816 |
|---|---|---|---|---|---|
| Service 1 | Program A | May 5th 21:00~ May 5th 23:00 | Recording-standby | 1 | TRUE |
| Service 2 | Program B | May 5th 23:30~ May 6th 0:30 | Recording-standby | 2 | FALSE |
| Service 3 | Program A | May 7th 10:00~ May 7th 10:30 | Recording-standby | 3 | TRUE |

BROADCAST RECEIVING TERMINAL

CROSS REFERENCE TO RELATED APPLICATION(S)

This application claims the benefit of U.S. Provisional Application No. 60/685,380, filed May 31, 2005, the contents of which are herein incorporated by reference in its entirety.

BACKGROUND OF THE INVENTION (1) Field of the Invention

The present invention relates to a broadcast receiving terminal which is a recording and reproduction apparatus that accumulates contents and reproduces the accumulated contents. In particular, the present invention relates to a setup for receiving a broadcast signal including content made up of video, audio as well as data such as a program that are multiplexed into the broadcast signal in synchronization with each other and transmitted, and for accumulating the video, audio and data, as well as a setup for executing trick play such as fast-forward and reverse playback of the content while maintaining the synchronization of the video, audio and the data such as a program.

(2) Description of the Related Art

Various contents are included in a broadcast signal sent from a broadcast station Aside from video and audio used in a normal broadcast program, there are cases where data is included in the contents. There are several methods for sending the data, which can be roughly divided into a method of sending the data chronologically and a method of repeatedly sending the data per set interval. In the former method of sending the data chronologically, for example, data that continues over the course of time is sent in sequential order. This method is suitable for sending large amounts of data over a long period of time, but there is a drawback in that data that could not be received at the timing of the sending cannot be received again. On the other hand, in the latter method of repeatedly sending the data at a set interval, the same data is repeatedly sent any number of times during a fixed period. This method has an advantage in that during the period when the same data is being sent, it is acceptable to receive any one of the repeatedly-sent pieces of data, and thus the timing of receiving is not limited. Data broadcast, represented by BML, and file sending through DSMCC data carousel are examples of this method. It is unknown, particularly in broadcast, when a recipient will select a channel and commence reception. In the method of sending the data chronologically, when the start of reception falls behind the timing of the sending and obtainment of the data fails, the data cannot be re-obtained. Therefore, when sending data such as an application program along with video and audio in the broadcast signal, the method of repeatedly sending the data per set interval is favorable.

At present, specifications for receiving a broadcast signal that includes video, audio, and an application program and executing the application program in synchronization with video and audio, as in the above method, have been developed, and are in operation. It is possible to receive the sent application program, load the application program in a terminal, and realize various extra functions by executing the application program, rather than simply viewing the video and audio. This method for sending the application program and capturing the application program in the terminal is also called "downloading". For example, a specification called Digital Video Broadcasting—Multimedia Home Platform (DVB-MHP) ETSI ES 201812 v1.1.1 (2003-12) has been developed in Europe, and operations according to this specification have already commenced. In addition, OCAP1.0 (Open Cable Application Platform OC-SP-OCAP1.0-I14-050119) specification, which provides the same specification in the cable broadcast environment, is being developed in the U.S., and operations are set to commence in 2005. In these specifications, the application program is written in the Java language. Various Application Programming Interfaces (APIs) for tuning, graphics display, and the like are provided in the terminal, and the Java application program can control those functions by calling the APIs.

In addition, in North America, the OCAP-DVR specification (OC-SP-OCAP-DVR-I01-040524), which is aimed at adding a function for recording and reproducing the contents in the OCAP specification, is being developed. Here, a content (video, audio, application and so on) which is broadcast is recorded and, in addition, the recorded content is reproduced in the same manner as a content which is directly reproduced from the broadcast signal. The direct reproduction of a content from a broadcast signal, without recording, is also referred to as "play", and reproduction of a recorded content is also referred to as "playback".

In the OCAP-DVR specification, a scheduled recording API is stipulated, and by using such API, the Java application is able to register a scheduled recording. Based on the scheduled recording registered by the Java program using the scheduled recording API, an OCAP-DVR terminal starts recording at the specified recording start time, and ends the recording at the specified recording end time.

The various functions stipulated by the OCAP and OCAP-DVR specifications are implemented by using devices existing in a terminal. For example, the reproduction of video/audio included in a broadcast signal makes use of devices, namely, a tuner which extracts an individual data stream from the broadcast signal, a TS decoder which retrieves video/audio from a data stream outputted by the tuner, and an AV decoder which decodes the retrieved video/audio and reproduces the decoded result. In other words, it can be said that the capability of a terminal is determined by the devices that the terminal is equipped with. For example, the aforementioned tuner can be used, not only in receiving a broadcast signal and reproducing video and audio, but also during the recording of the broadcast signal. Since the tuner cannot simultaneously extract a plurality of data streams from the broadcast signal, in order to simultaneously execute "audio and video reproduction" as well as "recording" two tuners become necessary. Therefore, in a terminal equipped with only one tuner, simultaneous execution of "audio and video reproduction" as well as "recording" is not possible.

In OCAP-DVR, there are cases where a plurality of Java applications is simultaneously executed. Each of the Java applications operate independently, and both aim to achieve the desired function realization using OCAP and OCAP-DVR stipulated API. For example, it is possible to assume a situation in which a Java application B requests "audio and video reproduction" close to the start time of a scheduled recording made by a Java application A. In such a case, if the terminal is equipped with two tuners, "audio and video reproduction" and "recording" can be executed simultaneously without any particular problems. However, in a terminal having only one tuner, both processes cannot be executed simultaneously as the absolute number of devices is insufficient. In this manner, "the condition in which a requested plurality of processes cannot be executed simultaneously as the absolute number or capacity of devices is insufficient" is generally referred to as "conflict". This condition does not occur only when there is one tuner. Even in a terminal equipped with two tuners, it is possible that "audio and video reproduction" as well as "recording" of two channels is requested, and indeed, in such case, "conflict" occurs as all processes cannot be executed simultaneously.

Intellectual property defining an algorithm for solving such a "conflict", particularly a conflict concerning a scheduled recording, already exists. Japanese Patent Application No. 2003-6445 is a patent relating to a device conflict policy in which "a scheduled recording is always prioritized, when a scheduled recording and chasing playback recording are simultaneously requested and device conflict occurs". By previously deciding on such a policy, the terminal can solve conflict and processing can be advanced with one of either processes being prioritized.

As in the Japanese Patent Application No. 2003-6445, by previously deciding on a policy for solving device conflict involving a scheduled recording, it is possible to determine which process to prioritize, and proceed with the processing. However, this is a terminal-unique policy which is applicable only in the case where device conflict solution is carried out freely and the process to be executed can be decided on within the terminal. A number of Java specifications, such as the OCAP specification and the OCAP-DVR specification, stipulate solution procedures. Here, as a typical example, two types of OCAP-stipulated device conflict solution procedures shall be introduced. It has already been mentioned that an OCAP specification-compliant terminal downloads and executes a Java application included in a broadcast signal. On this terminal, one or more Java applications are simultaneously executed and, as each make use of a Java API in order to realize a desired function; it is possible that a plurality of processes will be requested simultaneously in the terminal. When such a condition arises, and device conflict occurs as the absolute number of devices is insufficient, device conflict solution is carried out.

In the first procedure, device conflict solution is carried out using the priority level of a Java application. In the OCAP specification, each Java application has a unique priority level, and is ranked in such a way that a Java application having a higher priority level is considered as a more important application. As such, in the case where a plurality of Java applications requests a plurality of processes to be carried out simultaneously, the operation requested by the Java application having a higher priority level is preferentially operated.

In the second procedure, a special application decides on the Java application to be prioritized, regardless of the priority level of the Java applications. The OCAP specification defines an application having a particular privilege. This is referred to as a monitor application The monitor application can previously register in the terminal a "callback function for device conflict solution" which is called back by the terminal when device conflict occurs. In the case where this "callback function" is registered, when the terminal detects the occurrence of device conflict, the callback function is called, before the Java application priority level judgment is carried out. This callback function forwards, to the terminal, the identifier of the Java application to be prioritized, as a return value. The terminal executes the process requested by the Java application forwarded as the return value of the callback function, regardless of the priority level set in the Java application per se.

Particularly in the second procedure, the solution of device conflict is entirely left to the monitor application. The terminal only allocates the devices in accordance to the return value returned by the callback function of the monitor application. In other words, the solution policy during the occurrence of device conflict, in this case, can be understood to be controlled by the monitor application, and not by the terminal.

The aforementioned callback function for device conflict solution is implemented by the monitor application. In a certain installation, the Java application priority level may simply be determined within the callback function. Another installation, may present a selection dialog on a screen, and wait one minute for a user's input on which one to prioritize. Yet another installation may present a selection dialog on a screen, and wait indefinitely for a user's input on which one to prioritize. In other words, the terminal cannot predict when the callback function will make a return, and furthermore, the terminal cannot determine which process to prioritize and execute, until the callback function makes a return.

This is a crucial system defect for a scheduled recording. For example, considering the case where "scheduled recording" and "video and audio reproduction" are simultaneously requested by two Java applications and device conflict occurs. At this time, when a callback function for device conflict solution is registered, the terminal must call such callback function, in accordance to the OCAP or OCAP-DVR specification. However, if the callback function does not return a judgment result even at the scheduled recording start time, the terminal has no choice but to wait, neither able to reproduce nor record.

In view of this, the present invention is conceived in view of such problem and has as an object to provide a recording and reproduction apparatus which solves a resource conflict.

SUMMARY OF THE INVENTION

In order to achieve the aforementioned object, the broadcast receiving terminal in the present invention is a broadcast receiving terminal having a recording unit and a reproduction unit, the recording unit recording received video information and audio information into a recording medium, and the reproduction unit reproducing the received video information and audio information or the video information and the audio information recorded by the recording unit, said broadcast receiving terminal including a schedule registration unit which registers, according to a request from a first program executed in said broadcast receiving terminal, schedule information including a start time for executing recording and a duration for which the recording continues; a schedule holding unit which holds schedule information registered by said schedule registration unit; a privileged program which holds a criteria for solving a conflict, when the conflict occurs over a resource managed by a resource management unit; a resource conflict solution unit which examines whether or not it is possible to exclusively use a predetermined resource, in said broadcast receiving terminal, that should be reserved in order to execute the scheduled recording by the first program, and in the case where the predetermined resource is already reserved by a second program executed in said broadcast receiving terminal, performs a judgment process, according to the criteria held by said privileged program, which program should reserve the predetermined resource, the recording being performed by the recording unit; a solution time interval holding unit which holds a time interval indicating how far ahead of a start time said resource conflict solution unit starts to function, the start time being held by said schedule holding unit; and an execution unit which executes the first program, the second program, and said privileged program. Said privileged program is received and recorded after said broadcast receiving terminal is turned on, said resource conflict solution unit starts to function upon reaching a point in time, which is a time ahead of the start time for executing the recording, at which the time ahead corresponds to the time interval held by said solution time interval holding unit, the start time being held by said schedule holding unit, and the program, which said resource conflict solution unit judges should reserve the predetermined resource, reserves the predetermined resource, and executes a predetermined process, or a recording based on a schedule, using the reserved resource.

Accordingly, it is possible to solve a resource conflict between the predetermined process and the recording based on a schedule.

Furthermore, it is possible that the aforementioned broadcast receiving terminal further includes said resource management unit which manages a resource which is exclusively used according to a request from a program, in association with the program requesting use of the resource, the program being executed in said broadcast receiving terminal, and the resource being used, in said broadcast receiving terminal, for the predetermined process. Said resource conflict solution unit judges, by examining the resource managed by said resource management unit, whether or not the predetermined resource is already reserved by the first program executed in said broadcast receiving terminal.

Accordingly, it is possible to reliably examine whether or not exclusive use of the predetermined resource is possible.

Furthermore, it is possible that in the case where said resource conflict solution unit judges that the first program should reserve the predetermined resource, said resource management unit stops management of the predetermined resource in association with the second program, and manages, according to a request from the first program, the predetermined resource in association with the first program, the predetermined resource being exclusively used in said broadcast receiving terminal.

Accordingly, it is possible to accurately manage the association between the predetermined resource and the program reserving the predetermined resource.

Furthermore, it is possible that in the case where said resource conflict solution unit judges that the first program should reserve the predetermined resource, said resource management unit notifies the second program to release the reserved resource in said broadcast receiving terminal.

Accordingly, exclusive use of the resource can be ensured.

Furthermore, it is possible that the first program and the second program respectively have information indicating a priority level, and in the case where the judgment process by said resource conflict solution unit does not end by a start time of a time that is newly scheduled by the second program, said resource conflict solution unit terminates the judgment process, and judges that the program having a higher priority level should reserve the predetermined resource.

Accordingly, in the case where the process by said resource conflict solution unit does not end, a resource conflict solution using program priority levels becomes possible.

Furthermore, it is possible that in the case where the judgment process by said resource conflict solution unit does not end by a start time of a time that is newly scheduled by the second program, said resource conflict solution unit terminates the judgment process, and judges that the first program should reserve the predetermined resource.

Accordingly, in the case where the process by said resource conflict solution unit does not end, it is possible to start the recording process mandatorily.

Furthermore, it is possible that said privileged program specifies the time interval held by said solution time interval holding unit.

Accordingly, convenience can be improved.

Furthermore, it is possible that the aforementioned broadcast receiving terminal according to claim 1, further includes: a judgment policy registration unit which registers a judgment policy for said resource conflict solution unit to judge which request, among requests from the programs, to accept; and a judgment policy holding unit which holds the judgment policy registered by said judgment policy registration unit. Said privileged program registers the judgment policy using said judgment policy registration unit, and in the case where the judgment process by said resource conflict solution unit does not end by the start time in the schedule, said resource conflict solution unit terminates the judgment process, and judges which of the programs should reserve the predetermined resource, using the judgment policy held by said judgment policy holding unit.

Accordingly, in the case where the process by said resource conflict solution unit does not end, a resource conflict solution using a judgment policy becomes possible.

Furthermore, it is possible that said judgment policy holding unit holds, as the judgment policy, a flag indicating whether to prioritize the recording according to a request from the first program or to prioritize the predetermined process according to a request from the second program, and in the case where the judgment process by said resource conflict solution unit does not end by the start time in the schedule, said resource conflict solution unit terminates the judgment process, and judges which of the programs should reserve the predetermined resource, based on the flag.

Accordingly, in the case where the process by said resource conflict solution unit does not end, a resource conflict solution using flags becomes possible.

Furthermore, it is possible that said judgment policy holding unit holds, as the judgment policy, a time slot in which recording is prioritized, and in the case where the judgment process by said resource conflict solution unit does not end by the start time in the schedule, said resource conflict solution unit terminates the judgment process, and judges that the first program should reserve the predetermined resource, when the start time in the schedule is included in the time slot in which recording is prioritized.

Accordingly, in the case where the process by said resource conflict solution unit does not end, resource conflict solution on a per time slot basis becomes possible.

Furthermore, it is possible that said judgment policy holding unit holds, as the judgment policy, a time slot in which recording is prioritized, and in the case where the judgment process by said resource conflict solution unit does not end by the start time in the schedule, said resource conflict solution unit terminates the judgment process, and judges that the first program should reserve the predetermined resource, when a time slot of the schedule is included within the time slot held by said judgment policy holding unit.

Accordingly, in the case where the process by said resource conflict solution unit does not end, resource conflict solution on a per time slot basis becomes possible.

Furthermore, it is possible that said judgment policy holding unit holds, as the judgment policy, channel identifiers corresponding to video information and audio information for which recording is prioritized, and in the case where the judgment process by said resource conflict solution unit does not end by the start time in the schedule, said resource conflict solution unit terminates the judgment process, and judges that the first program should reserve the predetermined resource, when a channel identifier of a channel corresponding to audio information and video information to be recorded is included in the channel identifiers held by the judgment policy holding unit.

Accordingly, in the case where the process by said resource conflict solution unit does not end, resource conflict solution on a per channel basis becomes possible.

Furthermore, it is possible that said judgment policy holding unit holds, as the judgment policy, broadcast program identifiers of broadcast programs for which recording is prioritized, and in the case where the judgment process by said resource conflict solution unit does not end by the start time in the schedule, said resource conflict solution unit terminates the judgment process, and judges that the first program should reserve the predetermined resource, when a broadcast program identifier of a broadcast program corresponding to audio information and video information to be recorded is included in the broadcast program identifiers held by the judgment policy holding unit.

Accordingly, in the case where the process by said resource conflict solution unit does not end, resource conflict solution on a per broadcast program basis becomes possible.

Furthermore, it is possible that the broadcast program identifier specifies a plurality of broadcast programs.

Accordingly, in the case where the process by said resource conflict solution unit does not end, resource conflict solution on a per broadcast program series basis becomes possible.

Furthermore, it is possible that said judgment policy holding unit holds, as the judgment policy, resources, in said broadcast receiving terminal, for which recording is prioritized, and in the case where the judgment process by said resource conflict solution unit does not end by the start time in the schedule, said resource conflict solution unit terminates the judgment process, and judges that the first program should reserve the predetermined resource, when a resource reserved by the second program is included in the resources held by the judgment policy holding unit, the second program being executed in said broadcast receiving terminal.

Accordingly, in the case where the process by said resource conflict solution unit does not end, resource conflict solution on a per resource basis becomes possible.

Furthermore, it is possible that said schedule registration unit receives a flag indicating whether to prioritize recording or to prioritize the predetermined process, in the case where the conflict occurs over the predetermined resource, in said broadcast receiving terminal, that should be reserved in order to execute the recording by the recording unit, said schedule holding unit holds the flag in association with the schedule information, and in the case where the judgment process by said resource conflict solution unit does not end by the start time in the schedule, the recording unit terminates the judgment process by said resource conflict solution unit, and causes said resource conflict solution unit to judge which program should reserve the predetermined resource, based on the flag associated with the schedule information.

Accordingly, in the case where the process by said resource conflict solution unit does not end, a resource conflict solution using a flag managed on a per schedule information basis becomes possible.

Note that the present invention can be implemented as the aforementioned broadcast receiving terminal and recording and reproduction apparatus, a broadcast receiving method, a recording and reproduction method, a program, and a storage medium which stores such program.

FURTHER INFORMATION ABOUT TECHNICAL BACKGROUND TO THIS APPLICATION

The disclosure of U.S. Provisional Application No. 60/685,380 filed on May 31, 2005, including specification, drawings and claims, is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 2 is a diagram showing an example of how to use a frequency band used in communications between a system on the broadcast system side and a terminal apparatus, in a cable television system according to the present invention.

FIG. 3 is a diagram showing an example of how to use a frequency band used in communications between a system on the broadcast system side and a terminal apparatus, in a cable television system according to the present invention.

FIG. 4 is a diagram showing an example of how to use a frequency band used in communications between a system on the broadcast system side and a terminal apparatus, in a cable television system according to the present invention.

FIG. 6 is a schematic diagram of an MPEG-2 transport stream.

FIG. 7 is a diagram showing an example of division when a PES packet predefined by MPEG-2 specifications is carried in TS packets.

FIG. 8 is a diagram showing an example of division when an MPEG-2 section predefined by MPEG-2 specifications is carried in TS packets.

FIG. 9 is a configuration diagram of an MPEG-2 section predefined by MPEG-2 specifications.

FIG. 10 is a diagram showing an example of use of an MPEG-2 section predefined by MPEG-2 specifications.

FIG. 11 is a diagram showing an example of use of a PMT stipulated by MPEG-2 specifications.

FIG. 12 is a diagram showing an example of use of a PAT stipulated by MPEG-2 specifications.

FIG. 20 is a diagram showing an example of a record information management table according to the present invention.

FIG. 21 is a schematic diagram showing the details of an AIT stipulated in the DVB-MHP standard according to the present invention.

FIG. 24 is a diagram showing an example of an In-band receiving tuner management table according to the present invention.

FIG. 33 is diagram showing an example of the scheduled recording management table 3201.

FIG. 48 is a diagram representing information managed by the scheduled recording management table 3201 in the ninth embodiment.

DESCRIPTION OF THE PREFERRED EMBODIMENTS

Figure 1:
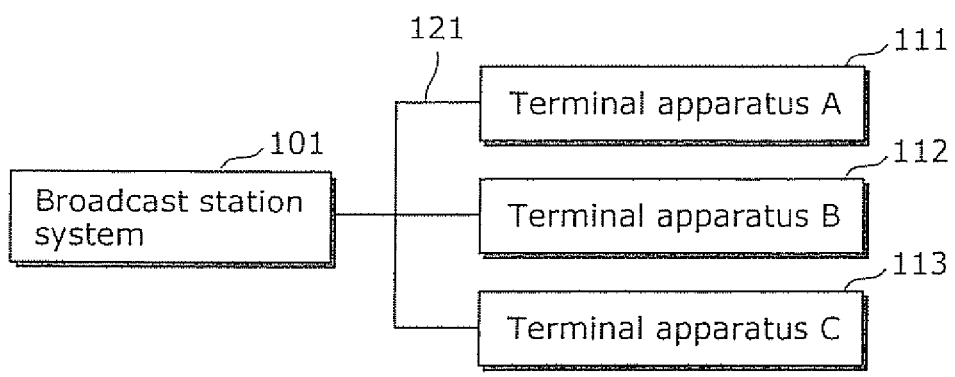
FIG. 1 is a configuration diagram of a broadcast system according to the present invention.

In the present invention, by including: a recording resource to be used in processes such as recording; a recording resource management unit which manages said recording resource; a scheduled recording holding unit which holds a scheduled recording; a scheduled recording registration unit which registers the scheduled recording into said scheduled recording holding unit; a recording resource conflict solution unit which examines whether or not the recording resource can be used and to perform, in the case where the recording resource is already being used by an other process, judgment of a process for which the recording resource should be used, by inquiring to a program; a solution interval holding unit which holds a solution interval indicating how far ahead of the scheduled recording the judgment performed by said recording resource conflict solution unit is to be performed; a solution interval registration unit which registers the solution interval into said solution interval holding unit; and a recording unit which starts recording based on the scheduled recording, resource conflict solution can be performed at the set amount of time ahead of the start of recording.

Furthermore, said recording resource management unit holds a priority level of a program which uses the recording resource for the other process, said scheduled recording holding unit holds a priority level of a program which registered the scheduled recording, and in the case where a resource solution processing by said recording resource conflict solution unit does not end by a recording start time of the scheduled recording, said recording unit instructs said recording resource conflict solution unit to terminate the solution processing, compares, as a judgment using program priority levels, a priority level 1 of the program using the recording resource for the other process and a priority level 2 of the program which registered the scheduled recording, and continues the other process when the priority level 1 is higher, and starts recording when the priority level 2 is higher. Therefore, in the case where the resource solution processing by said recording resource conflict solution unit is not finished, a resource conflict solution which uses the program priority levels becomes possible.

Furthermore, in the case where a resource solution processing by said recording resource conflict solution unit does not end by a recording start time of the scheduled recording, said recording unit instructs said recording resource conflict solution unit to terminate the solution processing, and mandatorily starts recording. Therefore, in the case where the resource solution processing by said recording resource conflict solution unit is not finished, it becomes possible to mandatorily start the recording.

Furthermore, by further including: a resource allotment policy holding unit which holds a resource allotment policy; a resource allotment policy registration unit which registers the resource allotment policy, wherein, in the case where a resource solution processing by said recording resource conflict solution unit does not end by a recording start time of the scheduled recording, said recording unit instructs said recording resource conflict solution unit to terminate the solution processing, and judges whether or not to start recording by performing resource solution using the resource allotment policy, it becomes possible to perform a resource conflict solution which uses the resource allotment policy in the case where the resource solution processing by said recording resource conflict solution unit is not finished.

Furthermore, said resource allotment policy holding unit holds a flag indicating whether the recording is prioritized or the other process is prioritized, as the resource allotment policy, and in the case where the resource solution processing by said recording resource conflict solution unit does not end by the recording start time of the scheduled recording, said recording unit instructs said recording resource conflict solution unit to terminate the solution processing, and starts the recording when the flag is TRUE, and continues the other process when the flag is FALSE. Therefore, in the case where the resource solution processing by said recording resource conflict solution unit is not finished, a resource conflict solution which uses the resource allotment policy becomes possible.

Furthermore, said resource allotment policy holding unit holds a time slot in which the recording is prioritized, as the resource allotment policy, and in the case where the resource solution processing by said recording resource conflict solution unit does not end by the recording start time of the scheduled recording, said recording unit instructs said recording resource conflict solution unit to terminate the solution processing, and starts the recording when the recording start time is included in the time slot, and continues the other process when not included. Therefore, in the case where the resource solution processing by said recording resource conflict solution unit is not finished, resource conflict solution on a per time slot basis becomes possible.

Furthermore, said resource allotment policy holding unit holds a time slot in which the recording is prioritized, as the resource allotment policy, and in the case where the resource solution processing by said recording resource conflict solution unit does not end by the recording start time of the scheduled recording, said recording unit instructs said recording resource conflict solution unit to terminate the solution processing, and starts the recording when a recording time slot is completely included within the time slot, and continues the other process when not completely included. Therefore, in the case where the resource solution processing by said recording resource conflict solution unit is not finished, resource conflict solution on a per time slot basis becomes possible.

Furthermore, said resource allotment policy holding unit holds channel identifiers for which the recording is prioritized, as the resource allotment policy, and in the case where the resource solution processing by said recording resource conflict solution unit does not end by the recording start time of the scheduled recording, said recording unit instructs said recording resource conflict solution unit to terminate the solution processing, and starts the recording when a channel identifier of a channel to be recorded is included in the channel identifiers, and continues the other process when not included. Therefore, in the case where the resource solution processing by said recording resource conflict solution unit is not finished, resource conflict solution on a per channel basis becomes possible.

Furthermore, said resource allotment policy holding unit holds broadcast program identifiers for which the recording is prioritized, as the resource allotment policy, and in the case where the resource solution processing by said recording resource conflict solution unit does not end by the recording start time of the scheduled recording, said recording unit instructs said recording resource conflict solution unit to terminate the solution processing, and starts the recording when a broadcast program identifier of a broadcast program to be recorded is included in the broadcast program identifiers, and continues the other process when not included. Therefore, in the case where the resource solution processing by said recording resource conflict solution unit is not finished, resource conflict solution on a per broadcast program basis becomes possible.

Furthermore, the broadcast program identifier further contains a plurality of identifiers, and therefore, in the case where the resource solution processing by said recording resource conflict solution unit is not finished, resource conflict solution on a per broadcast program series basis becomes possible.

Furthermore, said resource allotment policy holding unit holds the recording resource which prioritizes the recording, as the resource allotment policy, and in the case where the resource solution processing by said recording resource conflict solution unit does not end by the recording start time of the scheduled recording, said recording unit instructs said recording resource conflict solution unit to terminate the solution processing, and starts the recording when what is in conflict is the recording resource, and continues the other process when not. Therefore, in the case where the resource solution processing by said recording resource conflict solution unit is not finished, resource conflict solution on a per recording resource basis becomes possible.

Furthermore, in the case where a conflict over the recording resource occurs, said scheduled recording registration unit receives, together with the scheduled recording, a flag indicating whether the recording is prioritized or the other process is prioritized, said scheduled recording holding unit holds the flag, together with the scheduled recording, and in the case where a resource solution processing by said recording resource conflict solution unit does not end by a recording start time of the scheduled recording, said recording unit instructs said recording resource conflict solution unit to terminate the solution processing, and starts the recording when the flag is TRUE, and continues the other process when the flag is FALSE, the flag being recorded together with the scheduled recording. Therefore, in the case where the resource solution processing by said recording resource conflict solution unit is not finished, resource conflict solution becomes possible through flags managed on a per scheduled recording basis.

Furthermore, by further including: a timeout callback holding unit which holds a timeout callback; and a timeout callback registration unit which stores the timeout callback, wherein, in the case where the resource solution processing by said recording resource conflict solution unit does not end by the recording start time of the scheduled recording, said recording unit calls the timeout callback, a resource conflict solution through the calling of the callback becomes possible, in the case where the resource solution processing by said recording resource conflict solution unit is not finished.

Furthermore, in the case where the resource solution processing by said recording resource conflict solution unit does not end by the recording start time of the scheduled recording, said recording unit calls the timeout callback, and when a result of the call is TRUE, waits again only for the interval held by the interval holding unit. Therefore, it becomes possible to extend the waiting time for the resource solution processing by said recording resource conflict solution unit.

Furthermore, the other process is continued when the result of the call to the timeout callback is false, and therefore, in the case where the resource solution processing by said recording resource conflict solution unit is not finished, it becomes possible to call the callback and, depending on the value returned by the callback, to continue the other process.

Furthermore, the recording is started when the result of the call to the timeout callback is false, and therefore, in the case where the resource solution processing by said recording resource conflict solution unit is not finished, it becomes possible to call the callback and, depending on the value returned by the callback, to immediately start the recording.

Furthermore, the judgment using program priority levels is performed when the result of the call to the timeout callback is false, and therefore, in the case where the resource solution processing by said recording resource conflict solution unit is not finished, it becomes possible to call the callback and, depending on the value returned by the callback, to select the resource conflict solution which uses priority levels.

Furthermore, the judgment using a resource solution policy is performed when the result of the call to the timeout callback is false, and therefore, in the case where the resource solution processing by said recording resource conflict solution unit is not finished, it becomes possible to call the callback and, depending on the value returned by the callback, to select the resource conflict solution which uses the resource solution policy.

Furthermore, in the case where the resource solution processing by said recording resource conflict solution unit does not end by the recording start time of the scheduled recording, said recording unit calls the timeout callback, and when a result of the call is a positive value, waits again only for a time indicated by the positive value received as the result. Therefore, it becomes possible to extend the waiting time for the resource solution processing by said recording resource conflict solution unit.

Furthermore, the other process is prioritized when the result of the call to the timeout callback is zero or lower, and therefore, in the case where the resource solution processing by said recording resource conflict solution unit is not finished, it becomes possible to call the callback and, depending on the value returned by the callback, to prioritize the other process.

Furthermore, the recording is started when the result of the call to the timeout callback is zero or lower, and therefore, in the case where the resource solution processing by said recording resource conflict solution unit is not finished, it becomes possible to call the callback and, depending on the value returned by the callback, to prioritize the start of the recording.

Furthermore, judgment using program priority levels is performed when the result of the call to the timeout callback is zero or lower, and therefore, in the case where the resource solution processing by said recording resource conflict solution unit is not finished, it becomes possible to call the callback and, depending on the value returned by the callback, to select the judgment according to program priority levels.

Furthermore, the judgment using the resource allotment policy is performed when the result of the call to the timeout callback is zero or lower, and therefore, in the case where the resource solution processing by said recording resource conflict solution unit is not finished, it becomes possible to call the callback and, depending on the value returned by the callback, to select the judgment according to the resource allotment policy.

First Embodiment

Hereafter, an apparatus and a method according to the first embodiment of the present invention are described with reference to the drawings. The present invention is aimed at recording and reproduction of sent and received contents with an arbitrary medium; however, in the present embodiment, a cable television broadcast system is described as an example. In the cable television broadcast system, the broadcast recording and receiving apparatus (broadcast receiving terminal) is generally called a terminal apparatus.

FIG. 1 is a block diagram showing a relationship of apparatuses that make up a broadcast system; the broadcast system is made up of a broadcast station system 101, and three terminal apparatuses: a terminal apparatus A 111, a terminal apparatus B 112, and a terminal apparatus C 113. A coupling 121 between the broadcast station system and each terminal apparatus is, in the cable system, a wired coupling such as a coaxial cable, a fiber-optic cable, and the like. In FIG. 1, one broadcast station system is coupled with three terminal apparatuses, but the number of terminal apparatuses is arbitrary.

The broadcast station system 101 sends information such as video/audio/data for data broadcast in a broadcast signal to a plurality of terminal apparatuses. The broadcast signal is sent using a frequency within a frequency band set by operational regulations of the broadcast system, the laws of a region/country in which the broadcast system is operated, and so on.

With the cable system in the present embodiment, the frequency band used in broadcast signal transmission is divided for each data detail and transmission direction (inbound, outbound) and assigned thereto. FIG. 2 is a chart indicating an example of the division of the frequency band. The frequency band is roughly divided into two types: Out Of Band (abbr. OOB) and In-Band. 5 MHz to 130 MHz is assigned as OOB, and is mainly used in inbound/outbound data exchange between the broadcast station system 101 and the terminal apparatus A 111, the terminal apparatus B 112, and the terminal apparatus C 113. 130 MHz to 864 MHz is assigned as In-Band, and is mainly used in an outbound-only broadcast channel that includes video/audio. QPSK modulation format is used with OOB, and QAM64 or QAM256 modulation format is used with In-Band. Modulation format technology is generally known technology and is of little concern to the present invention, and therefore detailed descriptions are omitted.

FIG. 3 is an example of a more detailed use of the OOB frequency band. 70 MHz to 74 MHz is used in outbound data sending from the broadcast station system 101, and all of the terminal apparatus A 111, the terminal apparatus B 112, and the terminal apparatus C 113 receive the same data from the broadcast station system 101. On the other hand, 10.0 MHz to 10.1 MHz is used in inbound data sending from the terminal apparatus A 111 to the broadcast station system 101; 10.1 MHz to 10.2 MHz is used in inbound data sending from the terminal apparatus B 112 to the broadcast station system 101; and 10.2 MHz to 10.3 MHz is used in inbound data sending from the terminal apparatus C 113 to the broadcast station system 101. Through this, it is possible to independently send unique data from each terminal apparatus A 111, B 112, and C 113 to the broadcast station system 101. FIG. 4 is an example of use of an In-Band frequency band. 150 MHz to 156 MHz and 156 MHz to 162 MHz are assigned to a TV channel 1 and a TV channel 2 respectively, and thereafter, TV channels are assigned at 6 MHz intervals. Radio channels are assigned in 1 MHz units from 310 MHz on. Each of these channels may be used as analog broadcast or as digital broadcast. Digital broadcast is sent in TS packet format based on MPEG-2 specifications, and it is also possible to send, in addition to audio and video, data for each kind of data broadcast and broadcast program organization information for configuring EPG, in addition to audio and video.

The broadcast station system 101 uses the frequency bands described above to send an appropriate broadcast signal to the terminal apparatuses, and therefore has a QPSK modulation unit, a QAM modulation unit, and so on. In addition, the broadcast station system has a QPSK demodulator for receiving data from the terminal apparatuses. Moreover, the broadcast station system 101 can be thought of as having various devices related to the modulation unit and the demodulation unit. However, the present invention relates mainly to the terminal apparatuses, and therefore detailed descriptions are omitted.

Meanwhile, the terminal apparatuses A 111, B 112, and C 113 each have a QAM demodulation unit and a QPSK demodulation unit in order to receive and reproduce a broadcast signal from the broadcast station system 101. In addition, each terminal apparatus has a QSPK modulation unit in order to send its unique data to the broadcast station system side 101. In the present invention, the terminal apparatuses are broadcast recording and reproduction apparatuses, and detailed configurations are described later.

The broadcast station system 101 modulates an MPEG-2 transport stream and transmits the stream within the broadcast signal. A broadcast receiving apparatus receives the broadcast signal, demodulates and reproduces the MPEG-2 transport stream, and from the stream, extracts and uses necessary information. In order to describe a device function and connection structure present in the terminal apparatus, the structure of the MPEG-2 transport stream is first described in a simple manner.

Figure 5:
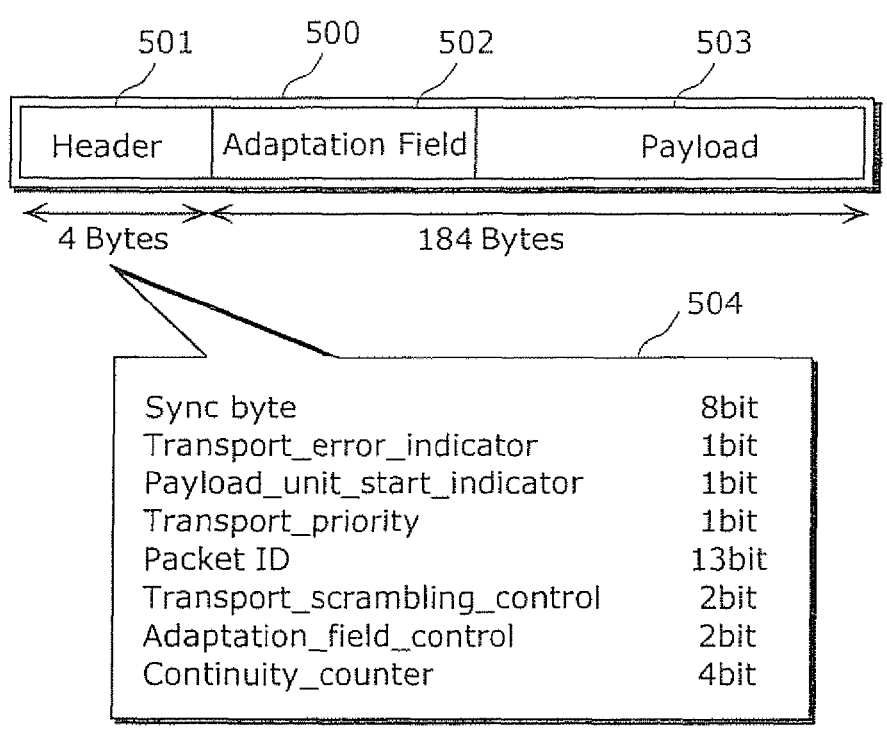
FIG. 5 is a configuration diagram of a TS packet predefined by MPEG-2 specifications.

FIG. 5 is a diagram showing the structure of a TS packet. A TS packet 500 has a length of 188 bytes, and is composed of a header 501, an adaptation field 502, and a payload 503. The header 501 holds control information of the TS packet. The header has a length of 4 bytes, and has the structure shown in 504. In the header 501 there is a field denoted as "Packet ID" (hereafter, PID), and the TS packet is identified through the value of this PID. The adaptation field 502 holds additional information such as time information. The adaptation field 502 does not necessarily have to be present, and there are cases where the adaptation field 502 is not present. The payload 503 holds information carried in the TS packet, such as video, audio, and data broadcast data.

FIG. 6 is a schematic diagram of an MPEG-2 transport stream. The TS packet holds various information in the payload, such as video, audio, data used for data broadcast, and the like. A TS packet 601 and a TS packet 603 hold a PID 100 in the header, and hold information regarding video 1 in the payload. A TS packet 602 and a TS packet 605 hold a PID 200 in the header, and hold information regarding data 1 in the payload. A TS packet 604 holds a PID 300 in the header, and holds information regarding audio 1 in the payload. Mixing TS packets which hold various types of data in the payloads and transferring these as a series in sequence is called multiplexing. An MPEG-2 transport stream 600 is one example of a configuration in which the TS packets 601 to 605 are multiplexed.

TS packets that have identical PIDs hold identical types of information. Therefore, the terminal apparatus reproduces video and audio, and reproduces data such as broadcast program organization information, by receiving multiplexed TS packets and extracting, per PID, the information that the TS packets hold. In FIG. 6, the TS packet 601 and the TS packet 603 each carry information regarding the video 1, and the TS packet 602 and the TS packet 605 each carry information regarding the data 1.

Here, description is given regarding a format of each type of data contained in the payload. Video and audio are represented by a format called a Packetized Elementary Stream (PES) packet. The PES packet includes video information or audio information of a certain time period, and by receiving the PES packet, the broadcast recording and reproduction apparatus can output the video and audio information contained in that PES packet to a screen and speaker. The broadcast station transmits the PES packets without pause, and therefore it is possible for the broadcast recording and reproduction apparatus to continuously reproduce the video and audio without pause. When the PES packet is actually transmitted, the PES packet is divided and stored in the payloads of a plurality of TS packets in the case where the PES packet has a size larger than the payload of one TS packet. FIG. 7 shows an example of division when a PES packet is transmitted. A PES packet 701 is too large to be stored and transmitted in a payload of a single TS packet, and therefore the PES packet 701 is divided into a PES packet division A 702a, a PES packet division B 702b, and a PES packet division C 702c, and is transmitted through three TS packets 703 to 705 which have identical PIDs. In actuality, the video and audio is obtained as an elementary stream (ES) that is obtained by concatenating data contained in the payloads of a plurality of PES packets. The format of this elementary stream is digitalized video and audio, such as defined by the MPEG-2 Video standard, the MPEG-1 and 2 Audio standard, and the like.

On the other hand, information such as the broadcast program organization information and data used for data broadcast is expressed using a format called MPEG-2 section. When the MPEG-2 section is actually transferred, the MPEG-2 section is divided and stored in the payloads of a plurality of TS packets in the case where the MPEG-2 section has a size larger than the payload of one TS packet. FIG. 8 shows an example of division when the MPEG-2 section is transferred. As an MPEG-2 section 801 is too large to be stored and transferred in a payload of a single TS packet, the MPEG-2 section 801 is divided into a section division A 802a, a section division B 802b, and a section division C 802c, and is transferred by three TS packets 803 to 805 which have identical PIDs.

FIG. 9 expresses a structure of the MPEG-2 section. An MPEG-2 section 900 is configured of a header 901 and a payload 902. The header 901 holds control information of the MPEG-2 section. That configuration is expressed by a header configuration 903. The payload 902 holds data carried in the MPEG-2 section 900. A table_id present in the header configuration 903 expresses the type of the MPEG-2 section, and a table_id_extension is an extension identifier used when further distinguishing between MPEG-2 sections with an identical table_id. The case where the broadcast program organization information is transmitted, as in FIG. 10, can be given as an example of use of the MPEG-2 section. In this example, as denoted in row 1004, information necessary for demodulating the broadcast signal is denoted in the MPEG-2 section which has a table_id of 64 in the header structure 903, and in addition, this MPEG-2 section is carried in a TS packet with a PID of 16 assigned.

The PES format does not exist in the case of the MPEG-2 section. For that reason, the elementary stream (ES) is the concatenation of the payloads of TS packets identified by identical PIDs within the MPEG-2 transport stream. For example, in FIG. 8, the TS packets 803 to 805, in which the MPEG-2 section 801 is divided and transferred, all are identified with the PID of 200. It can be said that this is the ES which carries the MPEG-2 section 801.

A concept called a program further exists in the MPEG-2 transport stream. The program is expressed as a collection of ESs, and is used in the case where handling a plurality of ESs all together is desirable. When the program is used, it is possible to handle video/audio, as well as accompanying data broadcast data, all together. For example, in the case of simultaneously handling the video/audio to be reproduced, by grouping the video ES and the audio ES as a program, it is understood that the broadcast recording and reproduction apparatus should simultaneously reproduce these two ESs as one broadcast program.

To express the program, two tables, called a Program Map Table (PMT) and a Program Association Table (PAT) are used in MPEG-2. Detailed descriptions can be found in the specifications of ISO/IEC 13818-1, "MPEG-2 Systems". The PMT and the PAT are described hereafter in simple terms.

The PMT is a table included in the MPEG-2 transport stream, in the same number as there are programs. The PMT is configured as an MPEG-2 section, and has a table_id of 2. The PMT holds a program number used in identifying the program and additional information of the program, as well as information regarding an ES belonging to the program. An example of the PMT is given in FIG. 11. 1100 is a program number. The program number is assigned uniquely to programs in the same transport stream, and is used in identifying the PMT. Rows 1111 to 1114 express information regarding individual ESs. A column 1101 is the type of the ES, in which "video", "sound", "data", and so on are specified. A column 1102 is the PID of the TS packets that make up the ES. A column 1103 is additional information regarding the ES. For example, the ES shown in the row 1111 is an audio ES, and is carried in TS packets with a PID of 5011.

The PAT is a table, of which only one is present, in the MPEG-2 transport stream. The PAT is configured as an MPEG-2 section, has a table_id of 0, and is carried by a TS packet with a PID of 0. The so PAT holds a transport_stream_id used in identification of the MPEG-2 transport stream, and information regarding all PMTs that represent a program existing in the MPEG-2 transport stream. An example of the PAT is given in FIG. 12. 1200 is a transport_stream_id. The transport_stream_id is used in identifying the MPEG-2 transport stream. Rows 1211 to 1213 express information regarding the program. A column 1201 is the program number A column 1202 is the PID of the TS packet which sends the PMT that corresponds to the program. For example, the PMT of the program shown in row 1211 has a program number of 101, and the corresponding PMT is carried in the TS packet with a PID of 501.

In the case where the terminal apparatus reproduces a certain program, the terminal apparatus uses the PAT and the PMT and specifies the video and audio which make up a program, and reproduces that video and audio. For example, in regards to the MPEG-2 transport stream that transmits the PAT in FIG. 12 and the PMT in FIG. 11, the following procedure is adopted in the case where the video and sound belonging to the program with a program number of 101 are reproduced. First, a PAT transmitted as an MPEG-2 section with a table_id of "0" is obtained from a TS packet with a PID of "0". The PAT is searched for a program with the program number "101", and the row 1211 is obtained. From the row 1211, the PID "501" of the TS packet which carries the PMT of the program with a program number "101", is obtained. Next, the PMT transferred as the MPEG-2 section with a table_id of "2" is obtained from the TS packet with the PID of "501". A row 1111 which is audio ES information, and a row 1112 which is video ES information, are obtained from the PMT. A PID "5011" of the TS packet which carries the audio ES is obtained from the row 1111. In addition, a PID "5012" of the TS packet which carries the audio ES is obtained from the row 1112. Next, an audio PES packet is obtained from the TS packet with a PID "5011", and a video PES packet is obtained from the TS packet with a PID of "5012". Through this, it becomes possible to obtain the PES packets of the video and audio to be reproduced, and the video and audio configuring the program number 101 can be reproduced.

Note that there are cases where the MPEG-2 transport stream is scrambled. This is a setup called conditional access system. For example, by scrambling the PES packets which carry a certain video and audio, only specified viewers who can descramble them are able to view that video and audio. In order to descramble and view the video and audio, a viewer must descramble them using a device called a descrambler. For example, in an OCAP-compatible terminal apparatus, a card-type adapter with a built-in descrambler is used. A cable television operator distributes, to each viewer, an adapter set to be able to descramble a specified program, and the viewer inserts that adapter into the terminal apparatus. Upon doing so, the adapter descrambles the specified program based on descrambling information such as a descrambling key and contract information of each contract holder. The method of descrambling, the method of obtaining the descrambling key, and the like are dependent on the adapter, and have no influence on the implementation of the present invention.

Thus far, simple descriptions regarding the MPEG-2 specifications have been given, and hereafter, detailed definitions of terminology are given. In the present invention, two types of the term "program" exist. One is a "program" which appears in the MPEG-2 specifications, and the other is a "program" referring to an assemblage of code executed by a CPU. As the former is synonymous with the term "service" used in the operation regulations, hereafter, to avoid confusion, the former is called "service" and the latter is simply called "program". Furthermore, concerning the latter, a "program" particularly written in the Java language is called a "Java program".

Description has been given regarding several kinds of general information specified in the MPEG-2 specifications according to the present invention. Hereafter, the broadcast recording and reproduction terminal used in the present embodiment is described in detail.

Figure 13A:
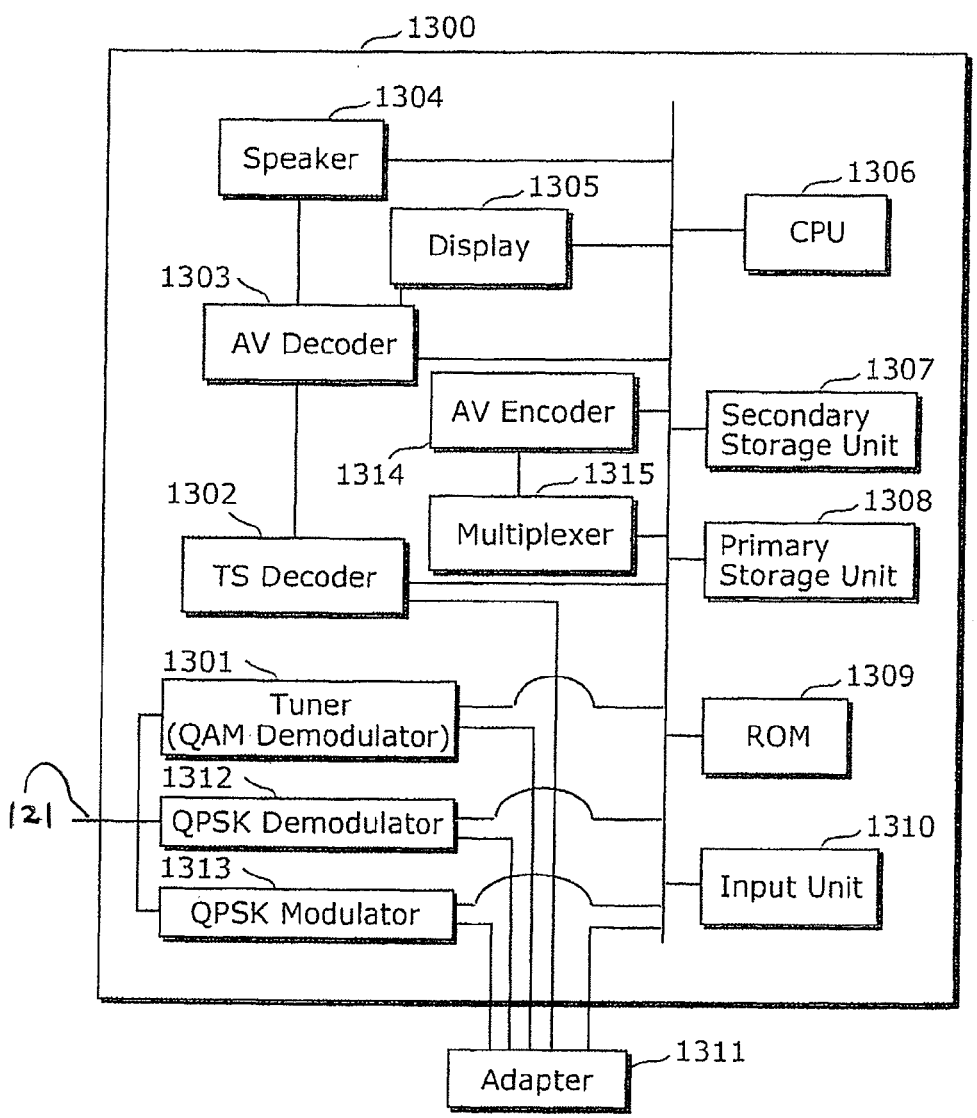
FIG. 13A is a diagram showing a configuration example of a hardware configuration of a broadcast recording and reproduction apparatus according to the present invention.

FIG. 13A is a block diagram showing a general hardware configuration of the broadcast recording and reproduction apparatus according to the present embodiment; in other words, a specific internal configuration of the terminal apparatuses 111, 112, and 113 shown in FIG. 1. 1300 is a broadcast recording and reproduction apparatus, which is configured of: an In-Band tuner 1301; a TS decoder (TS Demultiplexer) 1302; an AV decoder 1303; a speaker 1304; a display 1305; a CPU 1306; a secondary storage unit 1307; a primary storage unit 1308; a ROM 1309; an input unit 1310; an adapter 1311; an AV encoder 1314; and a multiplexer (MPEG-2 Transport Stream Multiplexer or the like) 1315. Note that the present embodiment is obtained by expanding a broadcast recording and reproduction terminal realized by the OCAP-DVR specifications, and the basic hardware configuration is nearly identical to that required by the OCAP-DVR specifications.

The tuner 1301 is a device which demodulates a modulated broadcast signal transmitted from the broadcast station system 101, in accordance with tuning information including a frequency prescribed by the CPU 1306. An MPEG-2 transport stream obtained as a result of demodulation by the tuner 1301 is sent to the TS decoder 1302 via the adapter 1311 with a descrambling function.

The TS decoder 1302 is a device which has a function for segregating, from the MPEG-2 transport stream, PES packets and MPEG-2 sections which comply with specified conditions, based on a PID, a section filter condition, and so on prescribed by the CPU 1306.

In the case where a broadcast is received and a service is reproduced without recording, the MPEG-2 transport stream which the adapter 1311 outputs is inputted to the TS decoder 1302. On the other hand, in the case of reproducing a service recorded in the secondary storage unit 1307, the MPEG-2 transport stream which the secondary storage unit 1307 outputs is inputted to the TS decoder 1302. The CPU 1306 controls which input to receive. The direct reproduction of a service from a received broadcast, without recording, is also referred to as "play", and reproduction of a recorded service is also referred to as "playback".

The PES packets of the video and audio which the TS decoder 1302 segregated are outputted to the AV decoder 1303. In addition, the MPEG-2 section segregated by the TS decoder 1302 is transferred to the primary storage unit 1308 through Direct Memory Access (DMA), and is used by a program executed by the CPU 1306.

The AV decoder 1303 is a device with a function for decoding the encoded video ES and audio ES. The AV decoder fetches the ES from the PES packet that carries the audio and video information transferred from the TS decoder, and decodes the ES. An audio signal and a video signal obtained through the decoding performed by the AV decoder 1303 are outputted to the speaker 1304 and the display 1305 at the time of service reproduction, but are outputted to the AV encoder 1314 at the time of service recording. The output route to take is controlled by the CPU 1306, according to an instruction from a user.

The speaker 1304 reproduces audio outputted from the AV decoder 1303.

The display 1305 reproduces video outputted from the AV decoder 1303.

The CPU 1306 executes a program that operates in the broadcast recording and reproduction apparatus. The CPU 1306 executes a program contained in the ROM 1309. Alternatively, the CPU 1306 executes a program downloaded from a broadcast signal or a network and held in the primary storage unit 1308.

Alternatively, the CPU executes a program downloaded from a broadcast signal or a network and held in the secondary storage unit 1308. The tuner 1301, TS decoder 1302, AV decoder 1303, speaker 1304, display 1305, secondary storage unit 1307, primary storage unit 1308, ROM 1309, input unit 1310, adapter 1311, AV encoder 1314 and multiplexer 1315 are controlled in accordance with the directions of the executed program. In addition, the CPU 1306 is not only a device present within the terminal apparatus 1300, but can also communicate with the devices within the adapter 1311 and control the adapter 1311.

The secondary storage unit 1307 is a memory apparatus, the memory of which is not deleted even if the power supply to the device is interrupted. The secondary storage unit 1307 is configured of a device where information is not deleted even when the power to the terminal apparatus 1300 is turned off; for example, a nonvolatile memory such as a FLASH-ROM, a Hard Disk Drive (HDD), a rewritable media such as a CD-R and a DVD-R. The secondary storage unit 1307 saves information based on an instruction from the CPU 1306.

The primary storage unit 1308 is a device which has a function for temporarily saving information in accordance with an instruction from the CPU 1306, a DMA transfer-capable device, and so on, and is configured of a RAM or the like.

The ROM 1309 is a non-rewritable memory device, and to be more specific, is configured of a ROM, a CD-ROM, a DVD, and the like. The program which the CPU 1306 executes is stored in the RON 1309.

Figure 13B:
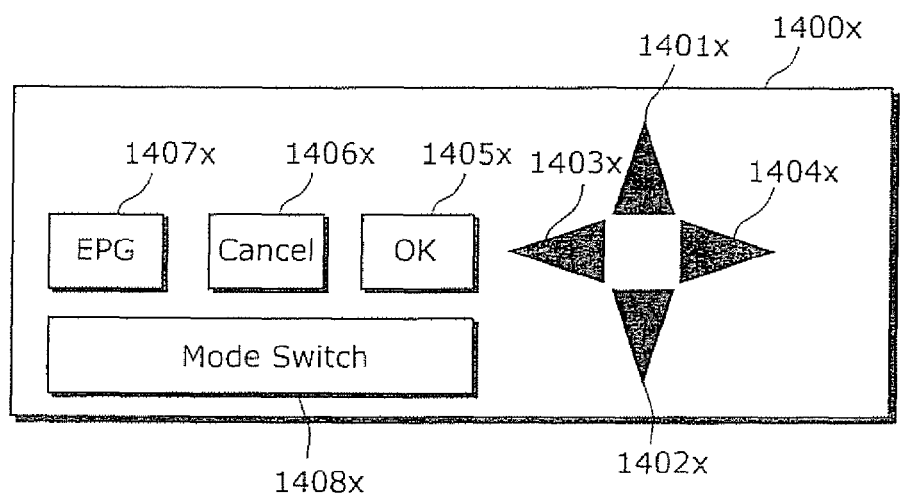
FIG. 13B is a diagram showing an example of the case where the input unit is configured as a front panel, according to the present invention.

The input unit 1310 is, to be more specific, configured of a front panel or a remote control receiver, and accepts an input from the user. FIG. 13B is an example of a case where the input unit 1310 is configured of the front panel. A front panel 1400x has seven buttons: an up cursor button 1401x, a down cursor button 1402x, a left cursor button 1403x, a right cursor button 1404x, an OK button 1405x, a cancel button 1406x, an EPG button 1407x, and a mode switch button 1408x. When the user presses a button, an identifier of the pressed button is notified to the CPU 1306.

The adapter 1311 is a device for descrambling a scrambled MPEG-2 transport stream carried in the In-band frequency range, and includes one or more descramblers. The MPEG-2 transport stream outputted by the tuner 1301 is inputted into the adapter 1311, and descrambling is carried out on the TS packet that has the PID specified by the CPU 1306. The adapter 1311 outputs the descrambled MPEG-2 transport stream to the TS decoder 1302.

Furthermore, the adapter 1311 also carries out format conversion of data sent in an OOB frequency range. Information that is sent in OOB is modulated in the QPSK modulation format. Regarding outbound transmission, the QPSK demodulator 1312 demodulates the outbound signal sent from the broadcast station system 101, and inputs a generated bit stream into the adapter 1311. The adapter 1311 extracts information specified by the CPU 1306 from among various information included in the bit stream, converts the information to a format that can be interpreted by a program that operates in the CPU 1306, and provides this to the CPU 1306. On the other hand, regarding inbound transmission, the CPU 1306 inputs information to be sent to the broadcast station system 101, into the adapter 1311. The adapter 1311 converts the information inputted from the CPU 1306 to a format that can be interpreted by the broadcast station system 101, and inputs this to the QPSK modulator 1313. The QPSK modulator 1313 QPSK-modulates the information inputted from the adapter 1311, and sends this to the broadcast station system.

A CabieCARD, formerly called Point of Deployment (POD), used in the U.S. cable system, can be given as a specific example of the adapter 1311.

The AV encoder 1314 encodes the audio signal decoded by the AV decoder 1303 into audio in the MPEG audio format, and encodes the video signal into video in the MPEG video format. The AV encoder 1314 outputs the encoded video and audio to the multiplexer 1315.

The multiplexer 1315 is a device with a function for multiplexing video and audio inputted from the AV encoder 1314, into the MPEG-2 transport stream.

A process in which the broadcast recording and reproduction apparatus described above records a service contained in a broadcast signal into the secondary storage unit 1307, and a process where the broadcast recording and receiving apparatus consecutively reads out the service from the secondary storage unit 1307 and reproduces it, are hereafter described in detail.

First, the process in which the service contained in the broadcast signal is recorded into the secondary storage unit 1307 is described.

Figure 14:
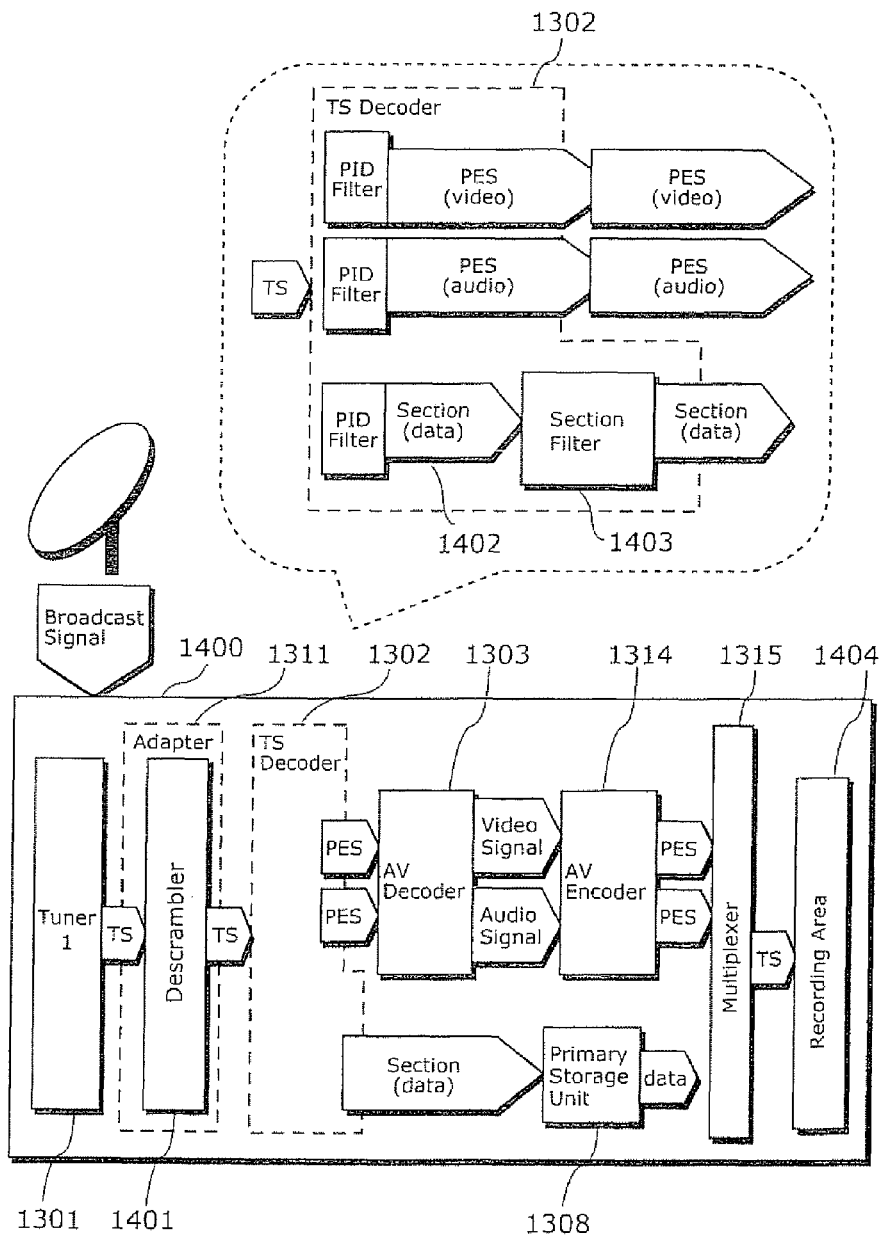
FIG. 14 is a diagram showing an example of a device connection at the time of recording, in the recording and reproduction apparatus according to the present invention.

FIG. 14 shows a conceptual diagram which represents the physical connection sequence, processing details, and input/output data format of each device during recording of the service. 1400 is a terminal apparatus, which has: the tuner 1301; the adapter 1311; a descrambler 1401; the TS decoder 1302; a PID filter 1402; a section filter 1403; the AV decoder 1303; the primary storage unit 1308; the AV encoder 1314; the multiplexer 1315; and a recording area 1404. Constituent elements in FIG. 14 that have the same reference numbers as in FIG. 13A have the same functions and thus description is omitted.

First, the tuner 1301 performs tuning on the broadcast signal in accordance with a tuning instruction provided by the CPU 1306. The tuner 1301 demodulates the broadcast signal and inputs the MPEG-2 transport stream into the adapter 1311.

The descrambler 1401, which is included in the adapter 1311, descrambles the MPEG-2 transport stream based on conditional access information for each viewer. The descrambled MPEG-2 transport stream is inputted into the TS decoder.

Two types of devices that process the MPEG-2 transport stream are present within the TS decoder 1302: the PID filter 1402 and the section filter 1403.

The PID filter 1402 extracts, from the inputted MPEG-2 transport stream, a TS packet that has a PID specified by the CPU 1306, and then extracts a PES packet and an MPEG-2 section present in that payload. For example, when the MPEG-2 transport stream in FIG. 6 is inputted in the case where the CPU 1306 has instructed PID filtering which extracts the TS packet with a PID=100, packets 601 and 603 are extracted, then concatenated, and thus a PES packet of a video 1 is reconfigured. Alternatively, when the MPEG-2 transport stream in FIG. 6 is inputted in the case where the CPU 1306 has instructed PID filtering which extracts the TS packet with a PID=200, packets 602 and 605 are extracted, then concatenated, and thus an MPEG-2 section of data 1 is reconfigured.

The section filter 1503 extracts, from among the inputted MPEG-2 sections, the MPEG-2 section which conforms to a section filter condition specified by the CPU 1306, and DMA-transfers this MPEG-2 section to the primary storage unit 1308. For example, it is assumed that the CPU 1306 specifies, to the section filter 1403, PID filtering which extracts the TS packet with a PID=200, and section filtering which extracts a section with a table_id of 64. As mentioned earlier, after the MPEG-2 section of the data 1 is reconfigured, the section filter 1403 extracts only the section with a table_id of 64 from among those MPEG-2 sections, and DMA-transfers this to the primary storage unit 1308.

The MPEG-2 section that is inputted into the primary storage unit 1308 is inputted into the multiplexer 1315.

A video PES packet and an audio PES packet extracted by the TS decoder 1302 are inputted into the AV decoder 1303.

The AV decoder decodes the video PES packet so as to convert it into the video, and inputs this into the AV encoder 1314; Furthermore, the AV decoder decodes the audio PES packet so as to convert it into the audio, and inputs this into the AV encoder 1314.

The AV encoder 1314 converts the video into MPEG video and inputs this into the multiplexer 1315. Furthermore, the AV encoder 1314 converts the audio into MPEG audio and inputs this into the multiplexer 1315.

The multiplexer 1315 multiplexes the MPEG video and MPEG audio inputted from the AV encoder onto the MPEG-2 section inputted from the primary storage unit 1308, and thus generates an MPEG-2 transport stream. The generated MPEG-2 transport stream is recorded into the recording area 1404.

The recording area 1404 is made up of all or a part of the secondary storage unit 1307, or an other recording area, and records the MPEG-2 transport stream that makes up a service.

Next, a process is described in which the service is consecutively read out from the secondary storage unit 1307 and reproduced.

Figure 15:
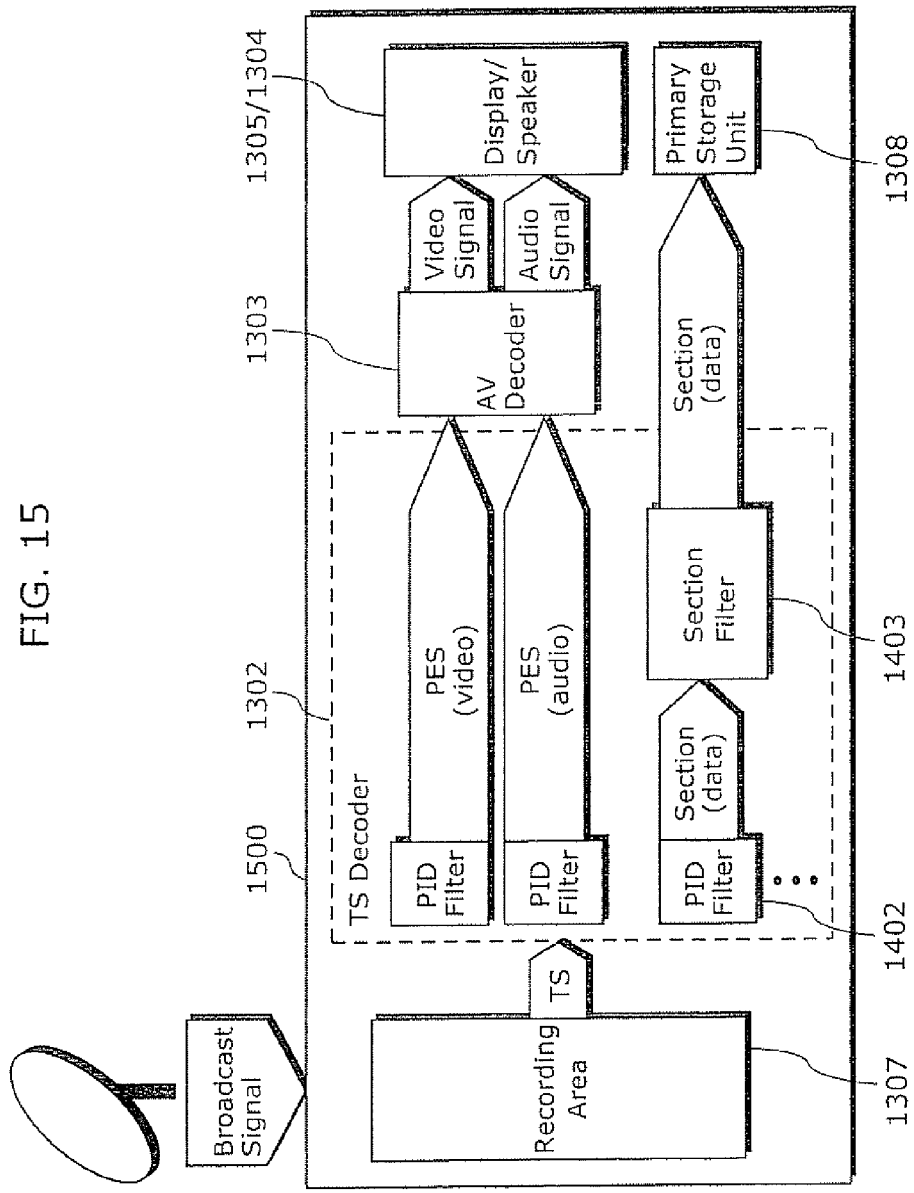
FIG. 15 is a diagram showing an example of a device connection at the time of reproduction, in a recording and reproduction apparatus according to the present invention.

FIG. 15 shows a conceptual diagram which represents the physical connection sequence, processing details, and input/output data format of each device during recording of the service. 1500 is a terminal apparatus, which has: the recording area 1404; the TS decoder 1302; the PID filter 1402; the section filter 1403; the AV decoder 1303; the speaker 1304; the display 1305; and the primary storage unit 1308. Constituent elements in FIG. 15 that have the same reference numbers as in FIG. 13A have the same functions, and thus description in omitted.

The MPEG-2 transport stream recorded in the recording area 1404 in the procedure described in FIG. 14 is inputted into the TS decoder 1302.

Subsequently, a video PES and an audio PES that have a PID specified by the CPU 1306 are extracted by the PID filter 1402 within the TS decoder 1302. The extracted PES packets are inputted into the AV decoder 1303. Alternatively, the MPEG-2 section that has a PID and a table_id specified by the CPU 1306 is extracted by the PID filter 1402 and the section filter 1403 within the TS decoder 1302. The extracted MPEG-2 section is DMA-transferred to the primary storage unit 1308.

The video PES and the audio PES inputted into the AV decoder 1303 are decoded and outputted as an audio signal and a video signal. After that, the audio signal and the video signal are inputted into the display 1305 and the speaker 1304, thus reproducing the audio and the video.

The MPEG-2 section inputted into the primary storage unit 1308 is inputted into the CPU 1306 as appropriate.

Thus far, an example of a hardware configuration regarding the present invention has been described. Hereafter, control of recording of the service via a Java program, which serves as the premise the present invention, is described.

Recording of the service in the present invention refers to recording video, audio, a Java program, synchronization information of the Java program, and so on that are contained in the service, into a recording medium such as a hard disk, a Blu-ray Disc (BD), a Digital Versatile Disc (DVD), and a Secure Digital (SD) memory card. Reproduction of the service refers to reproduction and execution of the video, audio, and Java program recorded in the recording medium, based on the synchronization information. A reproduction result of a recorded service is required to be approximately equivalent to a result of directly reproducing the service upon receiving a broadcast signal.

Figure 16:
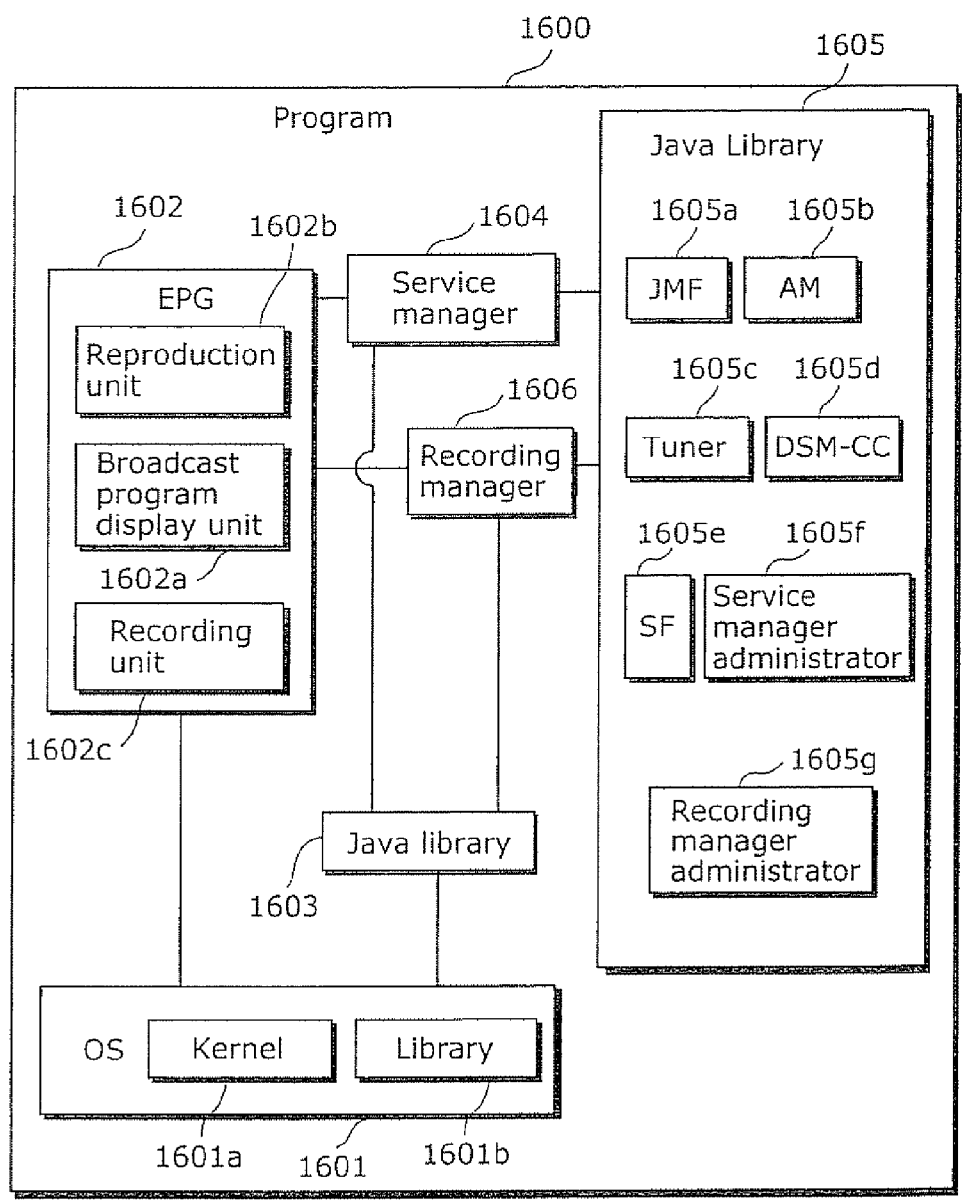
FIG. 16 is a configuration diagram of a program configuration stored by a terminal apparatus according to the present invention.

FIG. 16 is a configuration diagram of a program necessary for recording and reproduction of the service, and is software recorded into the ROM 1309.

A program 1600 is made up of an OS 1601, an EPG 1602, a Java VM 1603, a service manager 1604, a Java library 1605, and a recording manager 1606, which are sub-programs.

The OS 1601 is an Operating System of which, Linux, Windows, and the like are examples. The OS 1601 is made up of: a kernel 1601*a* for executing other sub-programs such as the EPG 1602 and the Java VM 1603; and a library 1601*b* which the sub-programs use to control the constituent elements of the terminal apparatus 1300. The kernel 1601*a* is publicly-known technology and therefore detailed description is omitted.

The library 1601*b* provides, for example, a tuning function for controlling the tuner. The library 1601*b* accepts, from another sub-program, tuning information that includes a frequency, and supplies this to the tuner 1301. The tuner 1301 performs demodulation processing based on the provided tuning information, and can pass the demodulated MPEG-2 transport stream to the TS decoder 1302. As a result, other sub-programs can control the tuner 1301 through the library 1601*b*.

Figure 19:
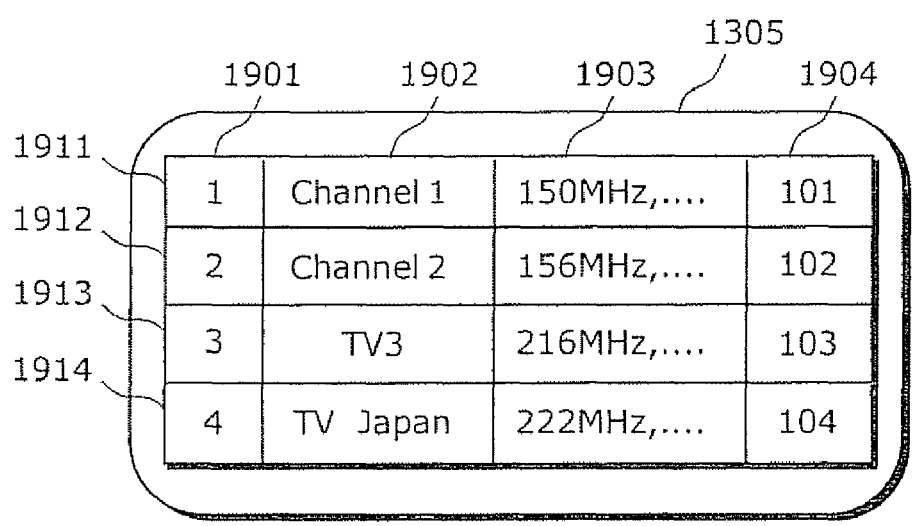
FIG. 19 is a diagram showing an example of information stored by a secondary storage unit according to the present invention.

Furthermore, the library 1601*b* provides channel information for uniquely identifying a channel. An example of the channel information is shown in FIG. 19. The channel information is sent using an OOB or an In-band frequency range, is converted into a chart format by the adapter 1311, and is stored in a temporary memory unit accessible by the library. A column 1901 is a channel identifier, and is equivalent to, for example, a source_ID as defined by SCTE65 Service Information Delivered Out-Of-Band For Digital Cable Television. A column 1902 is a channel name, and is equivalent to a source_name, from the same SCTE65 standard. A column 1903 is tuning information, and is information such as a frequency, a transfer rate, a modulation scheme, and the like that is given to the tuner 1301. A column 1904 is a program number for specifying the PMT. For example, a row 1911 is a group of service information including a channel identifier of "1", a channel name of "channel 1", a frequency of "150 MHz" in the tuning information, and a program number of "101".

The Java VM 1603 is a Java virtual machine that sequentially analyzes and executes one or more programs written in the Java (TM) language. Programs written in the Java language are compiled into intermediate code which is not dependent on the hardware, called bytecode. The Java virtual machine is an interpreter which executes this bytecode. The Java VM 1603 executes the Java library 1605 that is written in the Java language. Details of the Java language and Java VM are explained in publications such as "Java Language Specification" (ISBN 0-201-63451-1) and "Java Virtual Machine Specification" (ISBN 0-201-63451-X), and so on. In addition, it is possible to call or be called by other sub-programs not written in the Java language through a Java Native Interface (JNI). Details regarding the JNI can be found in the book "Java Native Interface" and so on.

Furthermore, parallel execution of a plurality of programs is possible through multi-thread management.

The Java library 1605 is a library written in the Java language and which is called by the Java program in order to control functions of the broadcast recording and reproduction apparatus. However, there are also situations where a sub-program written in non-Java language, such as the library 1601*b* of the OS 1601, is used as necessary. The Java program can use a function provided by the Java library 1605 by calling a Java Application Programming Interface (API) held in the Java library 1605.

A tuner 1605*c* is a Java library for controlling the In-band receiving tuner 1301 in the broadcast recording and reproduction terminal. When the Java program passes tuning information to the tuner 1605*c*, the tuner 1605*c* uses that information to call a tuning function of the library 1601*b*, and as a result, it is possible to control operation of the In-band receiving tuner 1301 of the broadcast recording and reproduction terminal.

An SF 1605*e* is a Java library for controlling a function of the PID filter 1402 and the section filter 1403 of the broadcast recording and reproduction terminal. When the Java program passes filtering conditions such as a PID, table_id, and the like to the SF 1605*e*, the SF 1605*e* uses a function of the library 1601*b* and the like based on those conditions, so as to control the PID filter 1402 and the section filter 1403, obtains an MPEG-2 section that fulfills desired filter conditions, and passes the MPEG-2 section to the Java program that set the filter conditions.

A DSM-CC 1605*d* is a Java library for accessing a file system of a DSM-CC object carousel. The DSM-CC object carousel is included in the MPEG-2 section obtained by the SF 1605*e*. The DSM-CC is defined by the ISO/IEC 13818-6 standard, and is a mechanism for using the MPEG-2 section to transmit an arbitrary file. By using this, it is possible to send a file from a broadcast station to a terminal. A detailed method for implementing the DSM-CC is of no relation to the present invention, and therefore descriptions are omitted.

A service manager administrator 1605*f* is a Java library for requesting reproduction of a service to the service manager 1604. The Java program executed by the Java VM 1603 requests the reproduction of a service to the service manager 1604, by using the service manager administrator 1605*f*.

A recording manager administrator 1605*g* is a Java library for instructing a scheduled recording to the recording manager. The Java program executed by the Java VM 1603 instructs a scheduled recording to the recording manager, by using the recording manager administrator 1605*g*. Note that, the scheduled recording is the essence of the present invention and, although details shall be described later, at least a recording start time, a recording duration, and a channel identifier indicating the service to be recorded are required when instructing a scheduled recording.

An AM 1605*b* is an application manager that provides a function for managing the execution and termination of the Java application contained in the service. The AM 1605*b* extracts a Java program multiplexed onto a specified channel of a specified MPEG-2 transport stream, and causes the execution or termination of that extracted Java program in accordance with separately-multiplexed synchronization information. A Java class file of the Java program is multiplexed onto the MPEG-2 transport stream in the aforementioned DSM-CC format. In addition, the synchronization information of the Java program is multiplexed onto the MPEG-2 transport stream in a format called AIT. AIT is an acronym of Application Information Table, as defined in section 10 of the DVB-MHP specification (ETSITS 101812 DVB-MHP specification V1.0.2, and is an MPEG-2 section with a table_id of "0x74".

The inputs of the AM 1605*b* are the MPEG-2 transport stream and the channel identifier. First, the AM 1605*b* searches for channel information in the library 1601*b* with a specified channel identifier as a key, and obtains the program number. Next, using the SF 1605*e* and the like, a PAT is obtained from the MPEG-2 transport stream. Then, the PID of the PMT that corresponds to the obtained program number is obtained from the information of the PMT. Once again, using the SF 1605*e*, the actual PMT is obtained. The obtained PMT is in a format as shown in FIG. 11, and has the PIDs of elementary streams that have "video" and "sound" written as the stream types. In addition, when the PID of the AIT obtained now and table_id "0x74" are given to the SF 1605*e* as filtering conditions, the substance of the AIT can be obtained.

FIG. 21 is a chart that schematically shows an example of the AIT information. An AIT version number 2100 expresses the version of that AIT. The higher the version of the AIT, the newer the AIT is. Although an AIT having the same AIT version is repeatedly received, the AM 1605*b* does not analyze an AIT with the same AIT version as an AIT that has already been analyzed, and only analyzes an AIT that is newer than the already-analyzed AIT and performs the corresponding processing. A column 2101 is an identifier of the Java program. A column 2102 is control information of the Java program. In the control information, there is "autostart", "present", "kill", and the like; "autostart" means that the terminal apparatus 1300 automatically executes the Java program immediately, "present" means automatic execution is not performed, and "kill" means terminating the Java program. A column 2103 is a DS-MCC identifier for extracting the PID that includes the Java program in the DS-MCC format.

A column 2104 is a program name of the Java program. Rows 2111, 2112, 2113, and 2114 are a group of the information of the Java program. The Java program defined in the row 2111 is a group including a Java program identifier "301", control information "autostart", a DSMCC identifier "1", and a program name "a/TopXlet". Similarly, the Java program defined in the row 2112 is a group including a Java program identifier "302", control information "present", a DSMCC identifier "1", and a program name "a/GameXlet". Here, the three Java programs defined by the rows 2111, 2112, and 2114 have the same DSMCC identifier. This indicates that three Java programs are included in one file system encoded in the DSMCC format. Here, four types of information are prescribed for the Java program, but in reality, more types of information are defined. Details can be found in the DVB-MHP specifications.

The AM 1605*b* finds out a Java program with "autostart" from within the AIT, and extracts the corresponding DSMCC identifier and Java program name. Referring to FIG. 21, the AM 1605*b* extracts the Java program from the row 2111 and obtains the DSMCC identifier "1" and the Java program name "a/TopXlet". Next, the AM 1605*b* uses the DSMCC identifier obtained from the AIT to obtain, from the PMT, the PID of the TS packet storing the Java program in the DSMCC format. Specifically, the PID of the elementary stream with a conforming DSMCC identifier in the supplementary information and which has a stream type as "data", within the PMT, is obtained. At this time, assuming that the DSMCC identifier is "1" and the PMT is as in FIG. 11, the elementary stream of the row 1114 conforms, and the PID "5014" is fetched.

The AM 1605*b* prescribes, to the SF 1605*e*, the section filter conditions, and the PID of the TS packet which sends the MPEG-2 section embedded with data in the DSMCC format. Here, the PID "5014" is given. As a result, the AM 1605*b* can collect the necessary DSMCC MPEG-2 sections. The AM 1605*b* reconstitutes the file system from the collected MPEG-2 sections in accordance with the DSMCC format, and saves the file system into the primary storage unit 1308. Fetching data such as the file system from the TS packet in the MPEG-2 transport stream and saving the data into a storage means, such as the primary storage unit 1308 and the secondary storage unit 1307, is hereafter called downloading.

Figure 22:
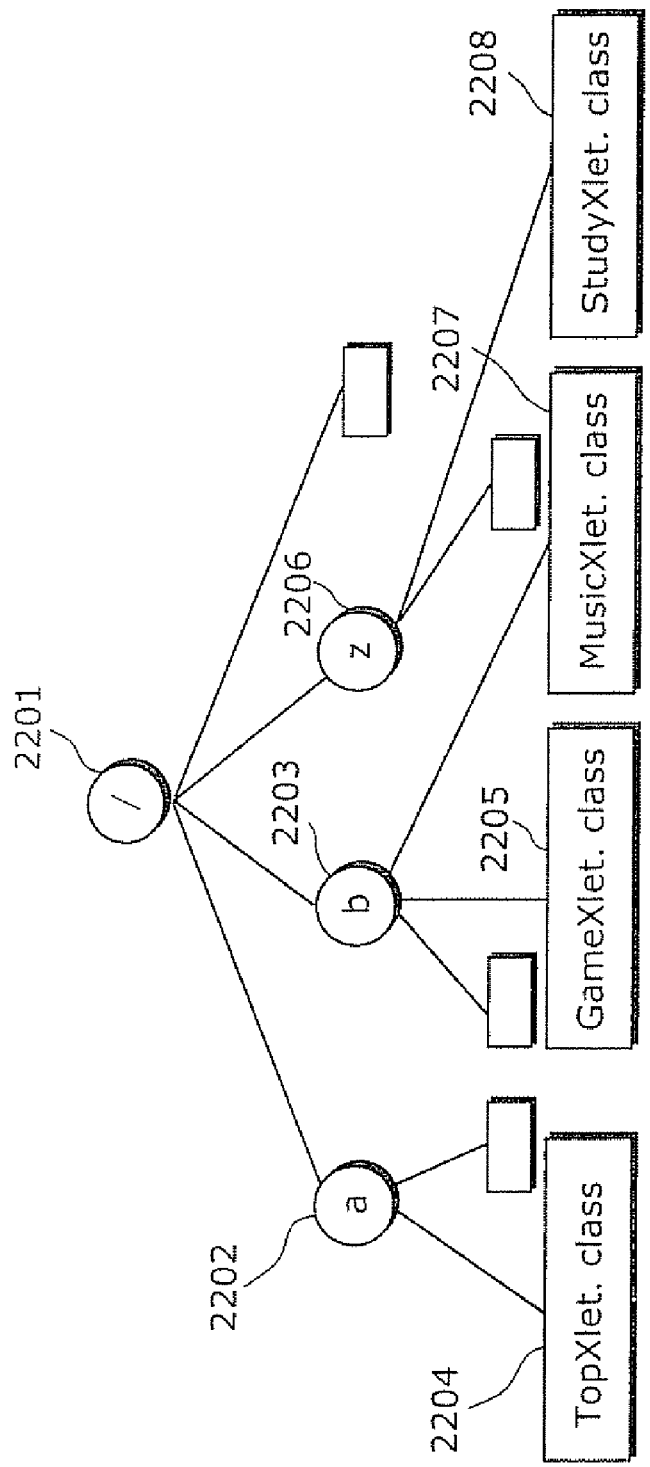
FIG. 22 is a schematic diagram of a download application according to the present invention.

FIG. 22 is an example of a downloaded file system. In the diagram, a circle represents a directory and a square represents a file. 2201 is a root directory, 2202 is a directory "a", 2203 is a directory "b", 2204 is a file "TopXlet.class", 2205 is a file "GameXlet.class", 2206 is a directory "z", 2207 is a file "MusicXlet.class", and 2208 is a file "StudyXlet.class".

Next, from among the downloaded file systems in the primary storage unit 1308, the AM 1605*b* passes the Java program to be executed to the Java VM 1603. Here, when the name of the Java program to be executed is "A/TopXlet", the file "a/TopXlet.class", having ".class" added to the end of the Java program name, is the file to be executed. "/" is a division of a directory and file name, and with reference to FIG. 22, the file 2204 is the Java program which should be executed. Next, the AM 1605*b* passes the file 2204 to the Java VM 1603, and the file is executed, as a Java program, on the Java VM.

Every time receiving an AIT with a new AIT version, the AM 1605*b* analyzes the AIT and changes the execution status of the Java program. Here, in the case where "kill" is specified in the control information, the AM 1605*b* terminates the Java program.

A JMF 1605*a* handles control of reproduction of the video and audio contained in the service. To be more specific, the JMF 1605*a* inputs the video ES and audio ES multiplexed on the specified channel of the specified MPEG-2 transport stream, into the AV decoder for reproduction. In the case where the service is reproduced directly from the received broadcast signal, it is directed to reproduce the MPEG-2 transport stream outputted from the adapter 1311. On the other hand, in the case where the service which has been stored once in the secondary storage unit 1307 is reproduced, it is directed to reproduce the MPEG-2 transport stream outputted from the recording area 1404 in the secondary storage unit 1307.

First, the JMF 1605*a* searches for channel information in the library 1601*b* with a specified channel identifier as a key, and obtains the program number. Next, using the SF 1605*e* and the like, a PAT is obtained from the MPEG-2 transport stream. Then, the PID of the PMT that corresponds to the obtained program number is obtained from the information of the PMT. One again, using the SF 1605*e*, the actual PMT is obtained. The obtained PMT is in a format as shown in FIG. 11, and has the PIDs of elementary streams that have "video" and "sound" written as the stream types. When the JMF 1605*a* sets these PIDs to the PID filter 1402 of the TS decoder 1302, the video ES and audio ES multiplexed with these PIDs are reproduced through the AV decoder 1303, as shown in FIG. 14 or FIG. 15.

Having a channel identifier, start time, and end time as inputs, the recording manager 1606 records the service into the secondary storage unit 1307, only for the period of time between the specified start time and end time. For example, when the EPG 1602 specifies the channel identifier, start time, and end time, the recording manager 1704*h* stands by until the start time. Subsequently, it starts recording the specified service at the start time, and stops recording when the end time is reached. Details are described below. Upon reaching the recording start time, the recording manager 1606 first secures, within the secondary storage unit 1307, a recording area 1404 for recording the MPEG-2 transport stream from the start time to the end time specified in the secondary storage unit 1307. A media identifier is supplied to the secured recording area. Next, a channel identifier is supplied to the tuner 1704*c*. Then, the tuner 1704*c* obtains the tuning information referring to the channel information via the library 1701*b*, and starts tuning. Then, as shown in FIG. 14, the MPEG-2 transport stream is inputted into the TS decoder via the adapter 1311.

Meanwhile, using the SF 1605*e*, the recording manager 1606 obtains the PAT from the MPEG-2 transport stream obtained through the tuning. Furthermore, it searches the library 1601b for the program number corresponding to the specified channel identifier, and searches the PAT for the PID of the PMT corresponding to the obtained program number. After that, using the SF 1605e, it obtains the actual PMT so as to obtain all the PIDs of the ES which make up the specified channel. The recording manager 1606 sets the obtained PIDs for the PID filter 1402 of the TS decoder. Then, in accordance with the flow explained in FIG. 14, all ESs that make up a desired channel are recorded into the just-recently secured recording area 1404.

Subsequently, when the specified end time is reached, the recording manager 1606 terminates the tuning process of the Tuner 1704c, and causes the writing of the MPEG-2 transport stream into the recording area 1504 to end. In addition, a record information management table as shown in FIG. 20 is created as management information of the just-recently recorded MPEG-2 transport stream.

FIG. 20 is an example of the record information management table for managing the record information recorded into the recording area 1404 of the secondary storage unit 1307 and the like. The record information is recorded in chart format. A column 2001 is a record identifier. A column 2002 is a channel identifier. A column 2003 is a program number. A column 2004 is the record start time for the service, and a column 2005 is the record end time for the service. A column 2006 is a media identifier that identifies the MPEG-2 transport stream that is recorded as a service. Each of the rows 2011 to 2012 is a group of each record identifier, channel identifier, program number, start time, end time, and media identifier. For example, the row 2011 shows a record identifier "000", a channel identifier "2", a program number "102", a start time "2005/03/30 11:00", an end time "2005/03/30 12:00", and a media identifier "TS_001".

The service manager 1604 manages reproduction of the service within the MPEG-2 transport stream that has been recorded into the secondary storage unit 1307, or the service within the MPEG-2 transport stream inputted from the adapter 1311.

Hereafter, a process in the case of managing reproduction of the service within the MPEG-2 transport stream which has been recorded in the secondary storage unit 1307 is described. This is equivalent to reproduction of an already-recorded service. In this case, the service manager 1604 has the record identifier as an input. The service already recorded in the secondary storage unit 1307 and specified by that record identifier is the object for reproduction.

First, referring to the record information management table created by the recording manager 1606, the service manager 1604 obtains the identifier and the media identifier of the channel to be reproduced, using the specified record identifier. Then, through the library 1601b, the service manager 1604 instructs the secondary storage unit 1307 to output, to the TS decoder 1302, the MPEG-2 transport stream specified by the obtained media identifier After that, the secondary storage unit 1307 is provided to the JMF 1605a as the location of the MPEG-2 transport stream and in addition, the identifier of the channel to be reproduced is provided. Then, through the process described above, the JMF 1605a starts reproduction of the audio and video multiplexed onto the MPEG-2 transport stream outputted from the secondary storage unit 1307.

Furthermore, the secondary storage unit 1307 is also provided to the AM 1605b as the location of the MPEG-2 transport stream and in addition, the identifier of the channel to be reproduced is provided. Then, in accordance with the AIT multiplexed onto the MPEG-2 transport stream outputted from the secondary storage unit 1307, the AM 1605b starts execution and termination of the Java program multiplexed onto the MPEG-2 transport stream outputted from the secondary storage unit 1307. After that, reproduction of the above-mentioned service is continued until the end of the MPEG-2 transport stream outputted from the secondary storage unit 1307.

On the other hand, the case of managing reproduction of the service within the MPEG-2 transport stream inputted from the adapter 1311 is described hereafter. This is equivalent to reproducing the service directly from the broadcast signal. In this case, the service manager 1604 has the channel identifier of the service to be reproduced as an input.

The service manager 1604 instructs, via the library 1601b, that the MPEG-2 transport stream outputted from the adapter 1311 in FIG. 14 is to be outputted to the TS decoder 1302. After that, the adapter 1311 is provided to the JMF 1605a as the location of the MPEG-2 transport stream, and the identifier of the channel to be reproduced is provided. Then, through the process described above, the JMF 1605a starts reproduction of the audio and video multiplexed within the MPEG-2 transport stream outputted from the adapter 1311. Furthermore, the adapter 1311 is also provided to the AM 1605b as the location of the MPEG-2 transport stream, and the identifier of the channel to be reproduced is provided. Then, in accordance with the AIT multiplexed onto the MPEG-2 transport stream outputted from the adapter 1311, the AM 1605b starts execution and termination of the Java program multiplexed onto the MPEG-2 transport stream outputted from the secondary storage unit 1307. After that, reproduction of the service is continued until the end of the MPEG-2 transport stream outputted from the secondary storage unit 1307.

The EPG 1602 is an Electronic Program Guide, and is a function which prompts a user to choose a broadcast program to be recorded and reproduced. Normal reproduction through receiving a broadcast signal is out of the scope of the present invention and thus description is omitted.

Figure 18:
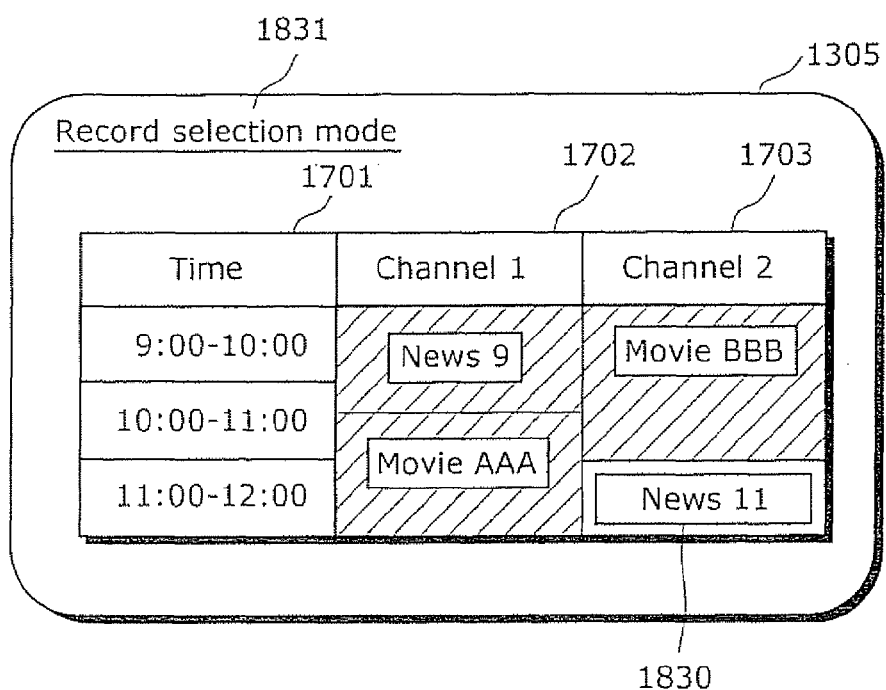
FIG. 18 is a diagram showing an example of an EPG executed by a terminal apparatus according to the present invention.

In the case of recording the broadcast program, the EPG 1602 displays a list of broadcasted broadcast programs, and prompts the user to choose a desired broadcast program. FIG. 18 is an example of a screen display for causing selection of a broadcast program to be recorded. A time 1701 and channels 1702 and 1703 are displayed in a grid, and it is possible to check the broadcast program of each recordable channel at each time. It is possible for the user to move a focus 1830 within the screen by using the top, bottom, right, and left cursor buttons 1401 to 1404 which are included in the input unit 1310 of the terminal apparatus 1300. Furthermore, when the OK button 1405 is pushed, the broadcast program which is currently highlighted by the focus is selected to be recorded. The EPG 1602 obtains the channel identifier of the broadcast program from the library and, when the broadcast program to be recorded is selected by the user, notifies the channel identifier, start time, and end time of the broadcast program to the recording manager 1606. Based on that information, the recording manager 1606 records the broadcast program into the secondary storage unit 1307.

Figure 17:
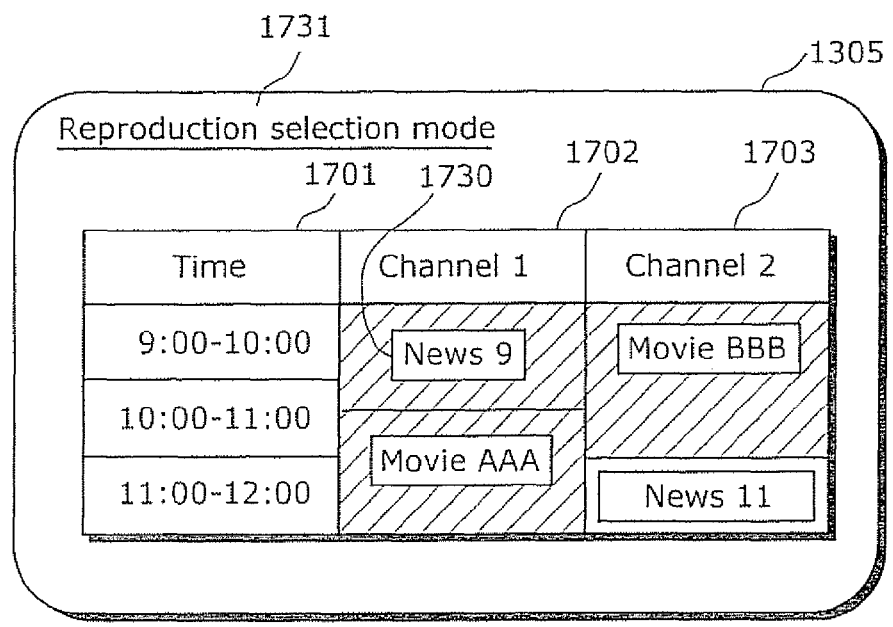
FIG. 17 is a diagram showing an example of an EPG executed by a terminal apparatus according to the present invention.

On the other hand, in the case of reproducing an already-recorded broadcast program, the EPG 1602 displays a list of the already-recorded broadcast programs, and prompts the user to choose a desired broadcast program. FIG. 17 is an example of a screen display for causing selection of an already-recorded broadcast program. All broadcast programs stored in the secondary storage unit 1307 at that point in time are listed. It is possible for the user to move a focus 1730 within the screen by using the top and bottom cursor buttons 1401x and 1402x, which are included in the input unit 1310 of the terminal apparatus 1300. Furthermore, when the OK button 1405*x* is pushed, the broadcast program which is currently highlighted by the focus is selected to be reproduced. The EPG 1602 obtains the record identifier of the broadcast program from the recording manager 1606, and when the broadcast program to be reproduced is selected by the user, it notifies the service manager 1604 of the record identifier of that broadcast program. Based on that information, the service manager 1604 reads out the broadcast program from the secondary storage unit 1307 and reproduces it.

Furthermore, here, reference is also made regarding to the abstract service stipulated in the OCAP and OCAP-DVR environment. The abstract service is a special service which includes only a Java program, without including video and audio Information regarding the abstract service is described in a special AIT transmitted in the previously described OOB. This AIT is called XAIT in the OCAP specification and OCAP-DVR specification. Upon the application of power, the terminal obtains the XAIT from the OOB, using the SF 1605*e*, obtains the information regarding the abstract service, and initiates the Java program included in the abstract service. A Java program having information described in the XAIT is referred to, in the present invention, as a "privileged program". Moreover, in the OCAP specification and OCAP-DVR specification, the privileged program is also called a monitor application.

Thus far, the recording function which serves as the premise of the present invention has been elaborated. Hereinafter, device conflict, as well as a method for solving conflict when conflict occurs is described.

For example, in the case where there is only one In-band receiving tuner 1301 in the terminal, it is not possible to simultaneously execute "reproduction of video and audio included in an MPEG-2 transport stream received from a broadcast" and "recording of a broadcast program included in an MPEG-2 transport stream received from a broadcast". Therefore, there is a need to determine which process will make use of the In-band receiving tuner 1301. In this manner, "the condition in which a requested plurality of processes cannot be executed simultaneously as the absolute number or capacity of devices is insufficient" is referred to as a "device conflict" and in addition, "selection of a process to be preferentially executed, from among a plurality of processes requested" is referred to as "solution of device conflict" (device contention resolution).

During device conflict solution, the terminal in the present invention conforms to the device conflict solution procedures stipulated in the in the OCAP specification and OCAP-DVR specification. Hereinafter, the stipulated device conflict solution procedures are elaborated.

In the OCAP specification and OCAP-DVR specification, the types of devices for which conflict may possibly occur are identified in advance. One of these is the In-band receiving tuner 1301. In the present invention, this is called an "exclusive device".

Furthermore, a Java program which manipulates the exclusive device is called an "exclusive device manipulation library". This is equivalent to the tuner 1605*c*, with respect to the In-band receiving tuner 1301.

Figure 23:
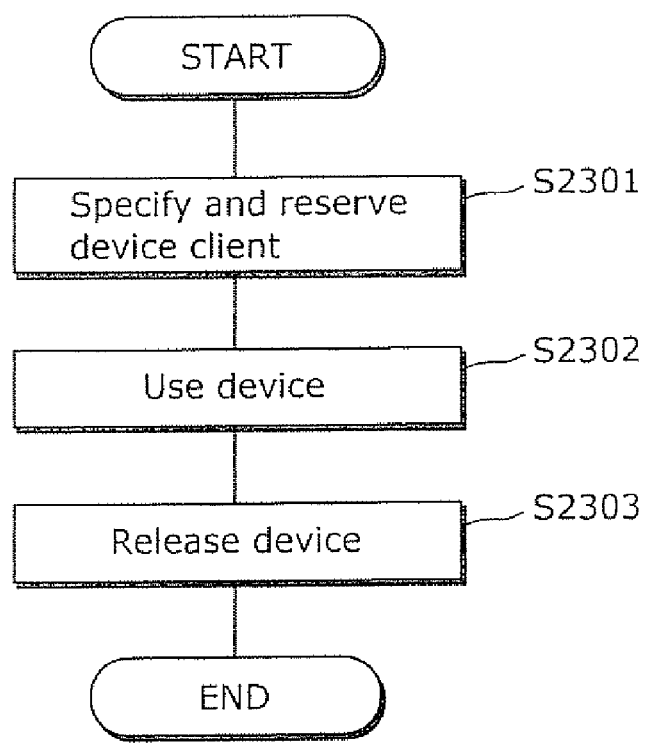
FIG. 23 is a sequence diagram describing device taking and release according to the present invention.

FIG. 23 is a sequence diagram describing an exclusive device use procedure stipulated in the OCAP specification and OCAP-DVR specification. All Java programs using the exclusive device must use the present sequence. First, in S2301, the exclusive device is reserved. At this time, a Java object referred to as a device client is registered with respect to the exclusive device. When reservation is successful, a desired function is executed using the exclusive device in S2302. When the desired process ends, the Java program releases the exclusive device, in S2303. In the case where the Java program does not follow the sequence in FIG. 23 and attempts to use that function without reserving the exclusive device, an error is notified to such Java program. As an example, in the tuner 1605*c*, a reserve, tune, and release method in the Network Interface Controller class are respectively equivalent to the reserve, use, and release.

The exclusive device manipulation library manages the reservation status of the exclusive device. For example, FIG. 24 is an In-band receiving tuner management table which is managed by the tuner 1605*c* in the primary storage unit 1308 or on the secondary storage unit 1307. A column 2411 is an identifier for identifying an In-band receiving tuner. In this example, description is carried out exemplifying a case where there are three units of the In-band receiving tuner which is an exclusive device (i.e. tuner 1, tuner 2 and tuner 3). A column 2412 is an identifier of a Java program using the In-band receiving tuner 1301. A column 2413 is a device client registered during reservation. Furthermore, lines 2401 to 2403 indicate information concerning an In-band receiving tuner. In FIG. 24, the tuner 1 which is one In-band receiving tuner 1301 is reserved by a program A, and a client C is registered as the device client. Furthermore, the tuner 2 is reserved by a program B, and a client D is registered as the device client. Furthermore, the tuner 3 is not reserved by any program.

Figure 25:
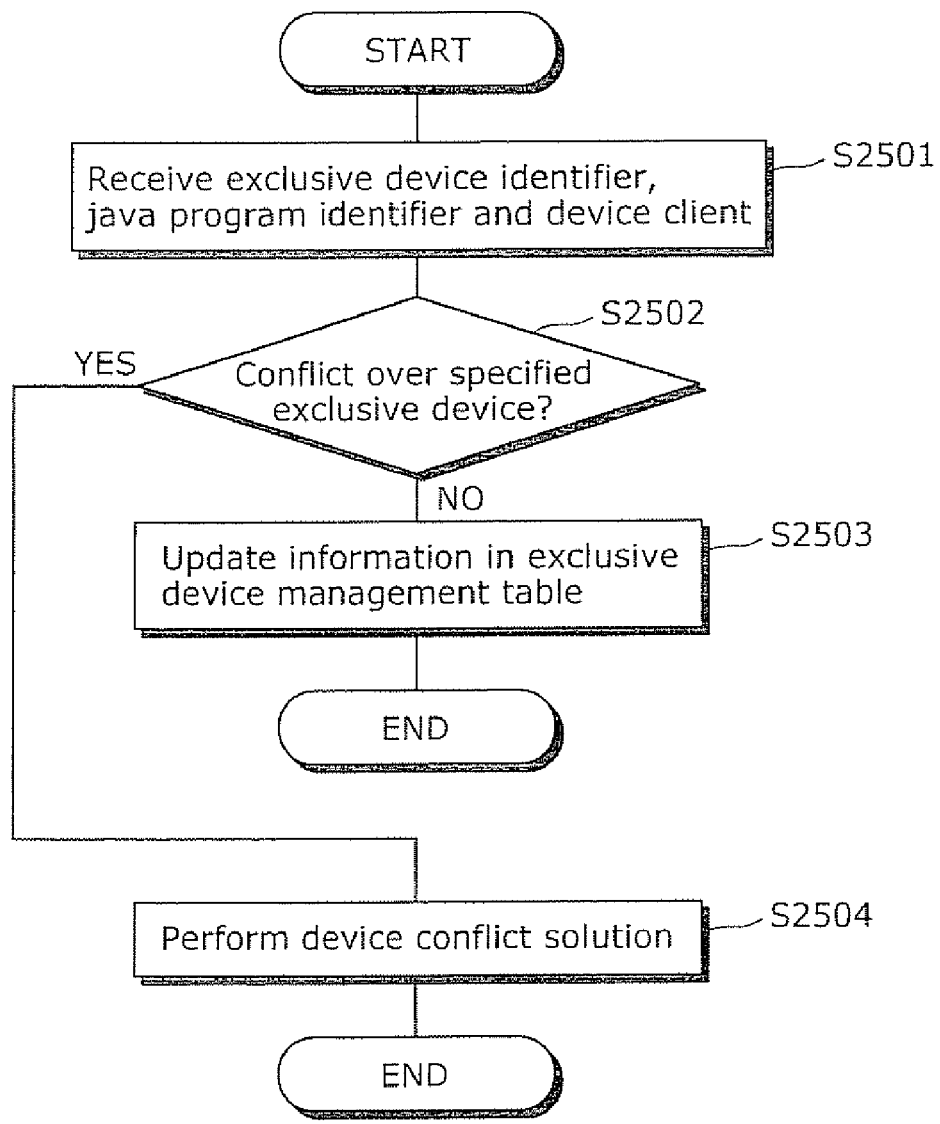
FIG. 25 is a sequence diagram describing the operation of an exclusive device reservation API according to the present invention.

FIG. 25 is a sequence diagram describing the operation of an exclusive device reservation APT used by a Java program. First, in S2501, the exclusive device identifier specified by the Java program, the Java program identifier, and the device client are received. In S2502, the exclusive device management table is referred to, and it is checked whether or not the identified exclusive device is already reserved by another Java program. In the case where it is not reserved, the process advances through NO to S2503, and the received Java program identifier and device client are set in the exclusive device management table. In the case where it is reserved, the process advances through YES to S2504, and device conflict solution is performed. The device conflict solution is described later.

The exclusive device manipulation library performs conflict solution for the exclusive device according to a device conflict solution algorithm stipulated in the OCAP specification and OCAP-DVR specification. As there are two general types of device conflict solution algorithms, they shall be distinguished by being referred to as a device conflict solution algorithm 1 and a device conflict solution algorithm 2.

Figure 26:
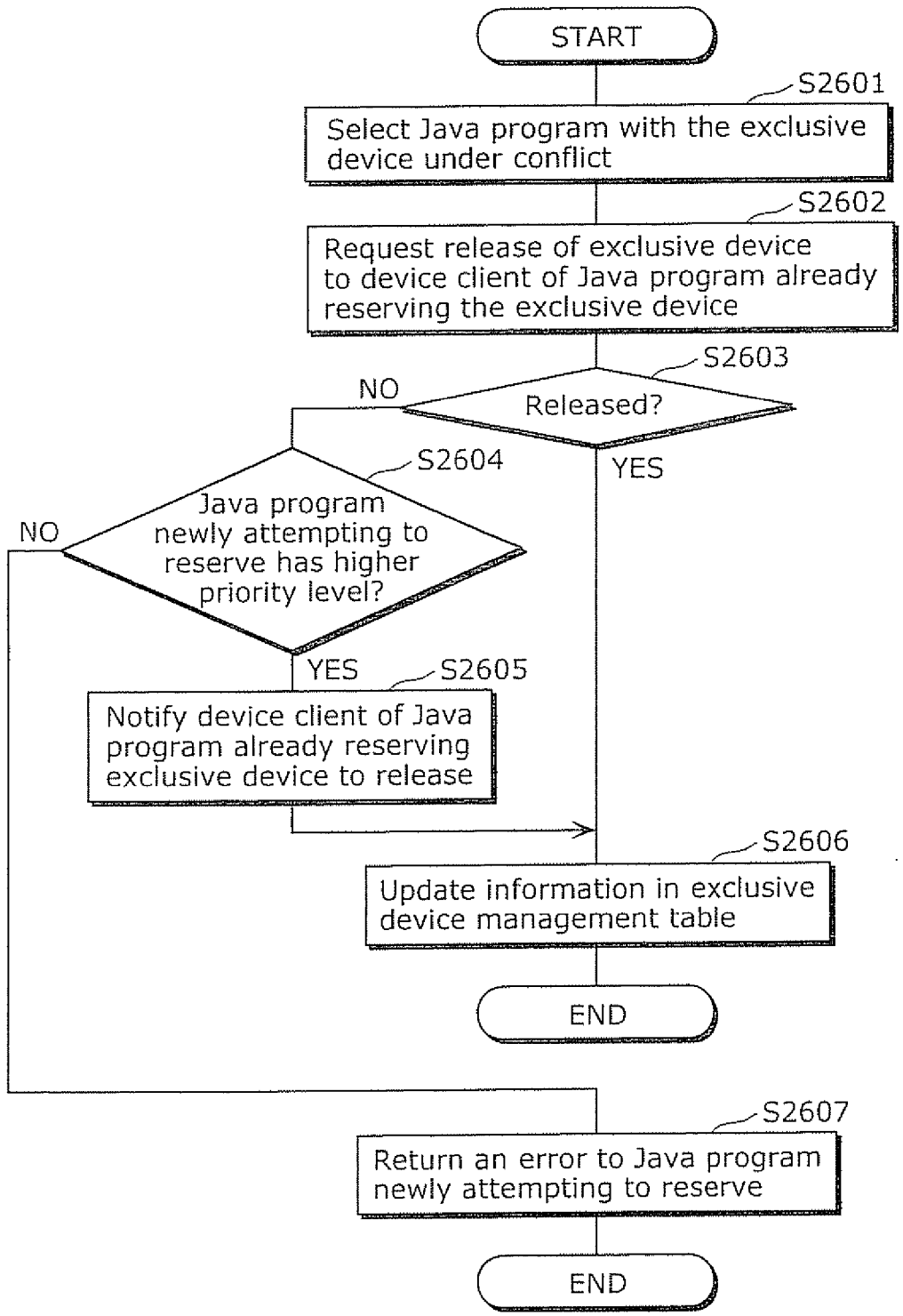
FIG. 26 is a sequence diagram of the device conflict solution algorithm 1 according to the present invention.

FIG. 26 is a sequence diagram showing the operating procedure of the device conflict solution algorithm 1. In S2601, the Java program already reserving the exclusive device, as well as the device client are obtained. Next, in S2606, release of the exclusive device is requested to the device client obtained in S2601. The device client to which the release of the exclusive device has been requested then judges whether or not to release the exclusive device, and returns the result to the exclusive device manipulation library. In S2603, the reply of the device client is evaluated. In the case where the release is agreed to, the process advances through YES to S2606, and an update is made with the identifier and the device client of the Java program newly attempting to reserve the exclusive device, and the process ends.

In the case where the release is not agreed to, the process advances through NO to S2604, and a priority level of the Java program already reserving the exclusive device and a priority level of the Java program newly attempting to reserve the exclusive device are obtained from the AM 1605*b* and compared. When the priority level of the Java program newly attempting to reserve the exclusive device is higher, the process advances through YES to S2605, and a mandatory-release notification is given to the device client of the Java program reserving the exclusive device. The process advances to S2606 where the exclusive device management table is updated with the identifier and the device client of the Java program newly attempting to reserve the exclusive device, and the process ends. In branch S2604, when the priority level of the Java program already reserving the exclusive device is higher or equal, an error is notified to the Java program newly attempting to reserve the exclusive device, and the process ends (S2607).

As shown in FIG. 26, the device conflict solution algorithm 1 solves device conflict based on the priority level of Java programs described in the AIT or XAIT. In the case where the device conflict solution algorithm 1 is used, a result which always favors a Java program having a higher priority level can be obtained.

On the other hand, in the device conflict solution algorithm 2, a privileged program solves device conflict. In this case, devices are allocated to each Java program based on a condition and order preferred by the privileged program, regardless of the priority level of the Java programs. In the device conflict solution algorithm 2, the privileged program implements the desired device conflict solution using two types of methods. One method is a "Java program filter" which selects a Java program having a right to reserve the exclusive device. For example, a Java program for which reservation of the In-band receiving tuner 1301 is not desired can be excluded by using the Java program filter. The other method is a "device conflict solution handler" which decides on an exclusive device reservation priority order within the Java programs for which reservation has been permitted through the Java program filter. For example, in a case where a conflict over the In-band receiving tuner 1301 occurs between a Java program 1 and Java program 2 which have been judged, through the Java program filter, as having the right to reserve the In-band receiving tuner 1301, the device conflict solution handler decides on which to prioritize. The device conflict solution algorithm 2 is used in cases where one or both of the Java program filter and device conflict solution handler are registered in the exclusive device manipulation library.

Figure 27:
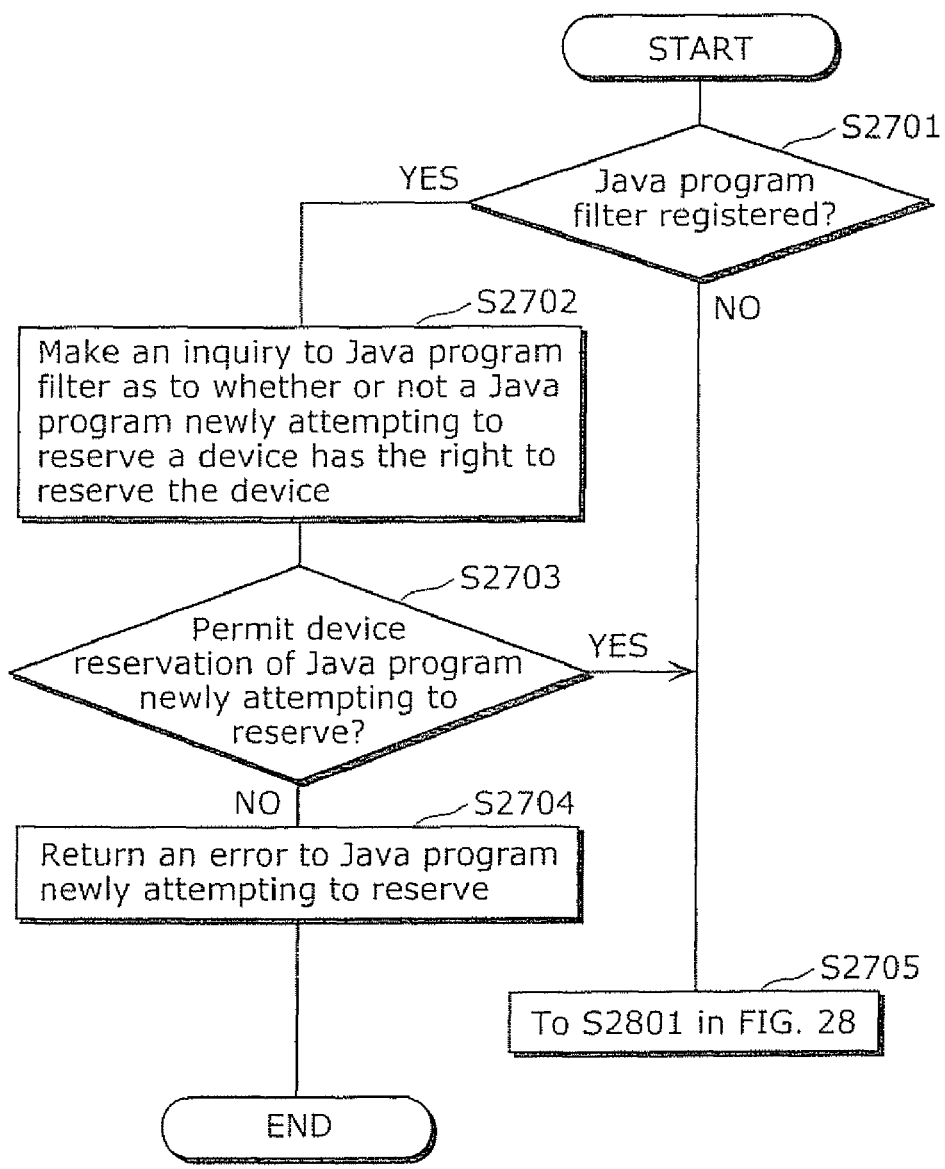
FIG. 27 is a sequence diagram of the device conflict solution algorithm 2 according to the present invention.
Figure 28:
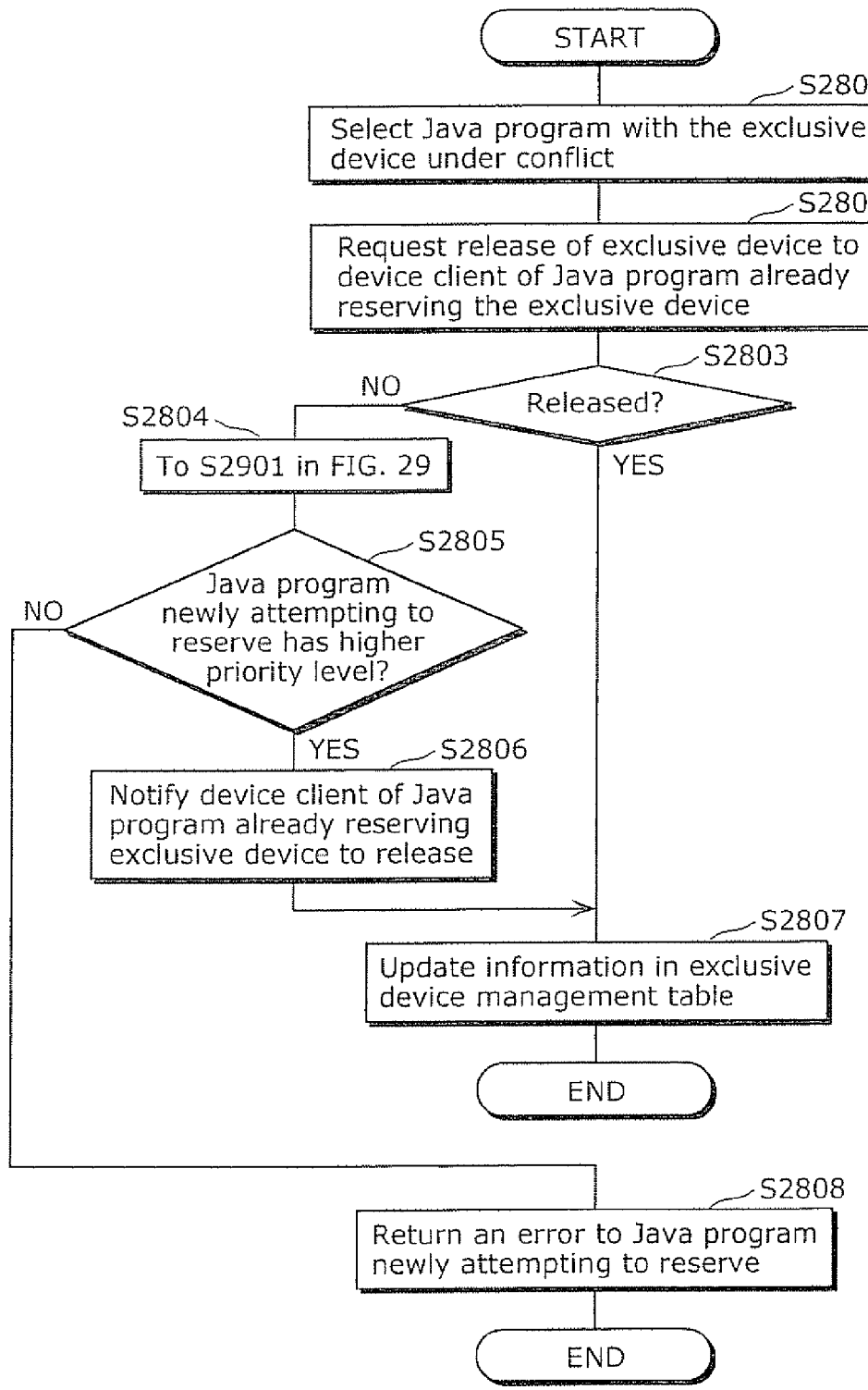
FIG. 28 is a sequence diagram of the device conflict solution algorithm 2 according to the present invention.
Figure 29:
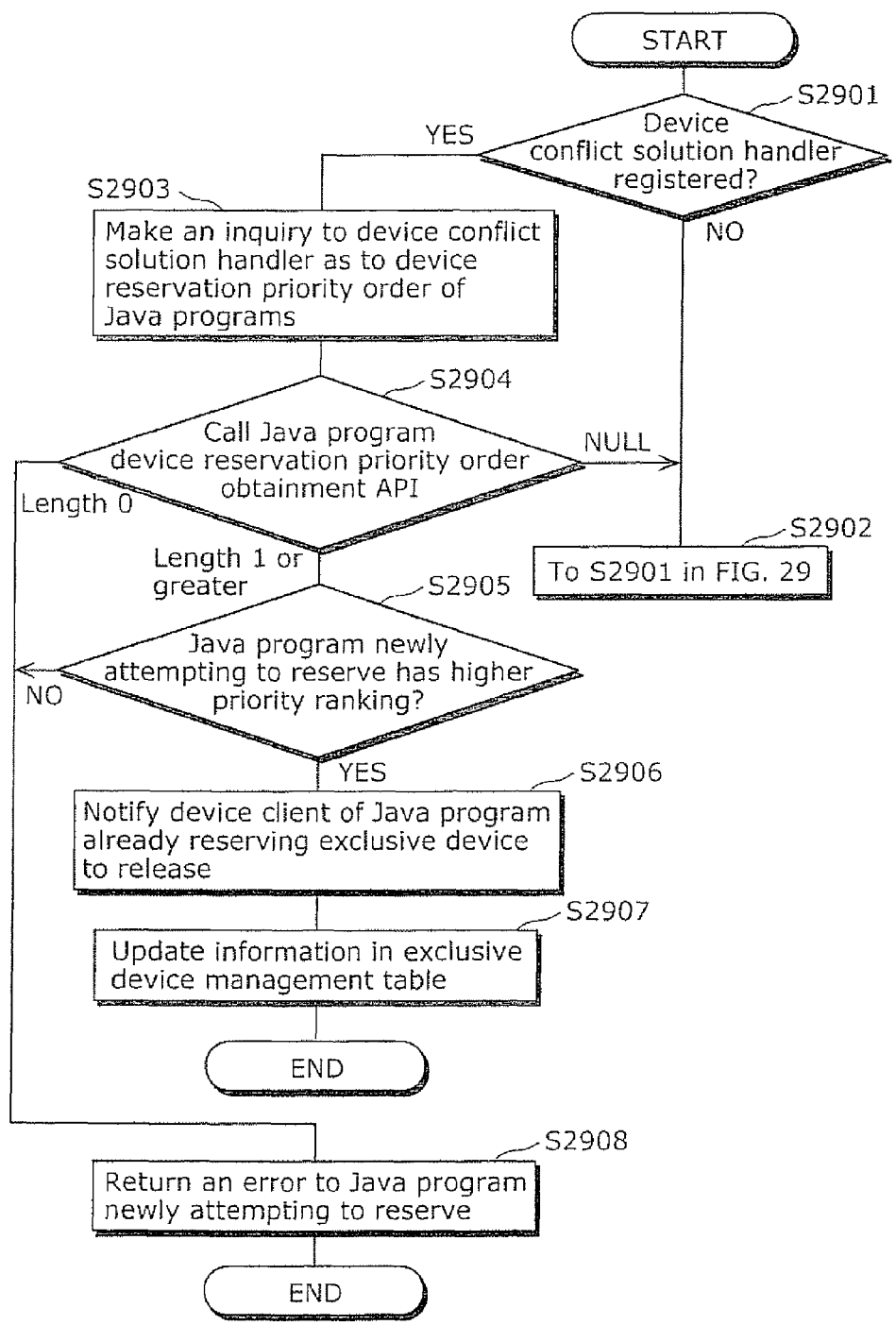
FIG. 29 is a sequence diagram of the device conflict solution algorithm 2 according to the present invention.

FIG. 27 to FIG. 29 are sequence diagrams describing operating procedures in the device conflict solution algorithm 2.

FIG. 27, the first diagram for the device conflict solution algorithm 2, is a sequence diagram describing the operating procedure with regard to the Java program filter In S2701, it is examined whether or not the Java program filter is already registered in the exclusive device manipulation library, and when not registered, the process advances through No to S2705, and connects with the sequence starting from S2801 in FIG. 28. When registered, the process advances through YES to S2702. An inquiry is made to the Java program filter as to whether or not a Java program has a right to reserve the exclusive device, and the Java program filter returns a judgment result to the exclusive device manipulation library. Next, in S2703, when that Java program has the right to reserve the exclusive device, the process advances through YES to S2705, and connects with the sequence starting from S2801 in FIG. 28. When the Java program does not have the right, the process advances through NO, to S2704. An error is returned to the Java program newly attempting to reserve the device, and the operating procedure ends.

FIG. 28, the second diagram for the device conflict solution algorithm 2, is a sequence diagram describing the operating procedure which performs priority level judgment based on the original priority level of Java programs. Apart from one point, the sequence diagram is the same as FIG. 26 which describes the device conflict solution algorithm 1, and thus details are omitted. The one point of difference is that, in S2805, the process connects to the sequence diagram represented in FIG. 29, before performing the device conflict solution based on the Java program priority levels.

FIG. 29, the third diagram for the device conflict solution algorithm 2, represents device conflict solution by a device conflict solution handler registered by a privileged program. In S2901, it is first examined whether or not the device conflict solution handler is registered, and when it is not registered, the process advances through NO to S2902. S2902 connects to S2805 in FIG. 28, and shifts to the device conflict solution process based on Java program priority levels. In branch S29701, in the case where the device conflict solution handler is registered, the process advances through YES to S2903. In S2903, an inquiry is made, to the device conflict solution handler, as to the device reservation priority order of the Java programs. The device conflict solution handler returns a matrix of Java program identifiers. The terminal solves the exclusive device conflict by analyzing the matrix returned by the present API, and prioritizing in the order of the Java program identifiers, included in the matrix. In S2904, the matrix returned by the device conflict solution handler is examined. When a matrix is not returned, the process advances through NULL to S2902, connects to S2805 in FIG. 28, and shifts to the device conflict solution process based on Java program priority levels. In branch S2904, when the length of the matrix is 0, the process advances through "Length 0" to S2908, an error is returned to the Java program newly attempting to reserve the device, and the process ends. In branch 2904, when the length is a positive value, the process advances through "Length 1 or greater" to S2905.

In S2905, judgment is made, based on the matrix obtained in S2903, as to which of the Java program newly attempting to reserve the device and the Java program already reserving the device has a higher priority order. When the priority order of the Java program newly attempting to reserve the device is lower, the process advances through NO to S2908, an error is returned to such Java program, and the device conflict solution process ends. In branch S2905, when the priority order of the Java program newly attempting to acquire the device is higher, the process advances through YES to S2906. In S2906, the device client of the Java program already reserving the device is obtained from the exclusive device management table, and the device client is notified to carry out mandatory release. In S2907, the exclusive device management table is updated with the identifier and the device client of the Java program newly attempting to reserve the device, and the process ends.

By using the device conflict solution algorithm 2 represented in FIG. 27 to FIG. 29, it is possible for the privileged program to perform a device conflict solution based a privileged program-unique judgment standard which is more effective than the Java program priority levels, using the Java program filter and the device conflict solution handler.

Furthermore, in the use of the exclusive device by the service manager 1604 and the recording manager 1606, the rule of using the three processes of reserving, using, and releasing, also has to be followed. In this case, a Java program requesting reproduction of a service to the service manager 1604, using the service manager administrator 1605*f*, as well as a Java program requesting recording of a service to the recording manager 1606, using a recording manager administrator 1605*g* are considered as attempting to reserve the exclusive device, and device conflict solution is carried out.

The device conflict solution algorithms described thus far are device conflict solution procedures that are used, without exception, in the OCAP and OCAP-DVR specifications. The amount of time taken in a solving device conflict in the device conflict solution algorithm 1 and the device conflict solution algorithm 2 is discussed.

Figure 30:
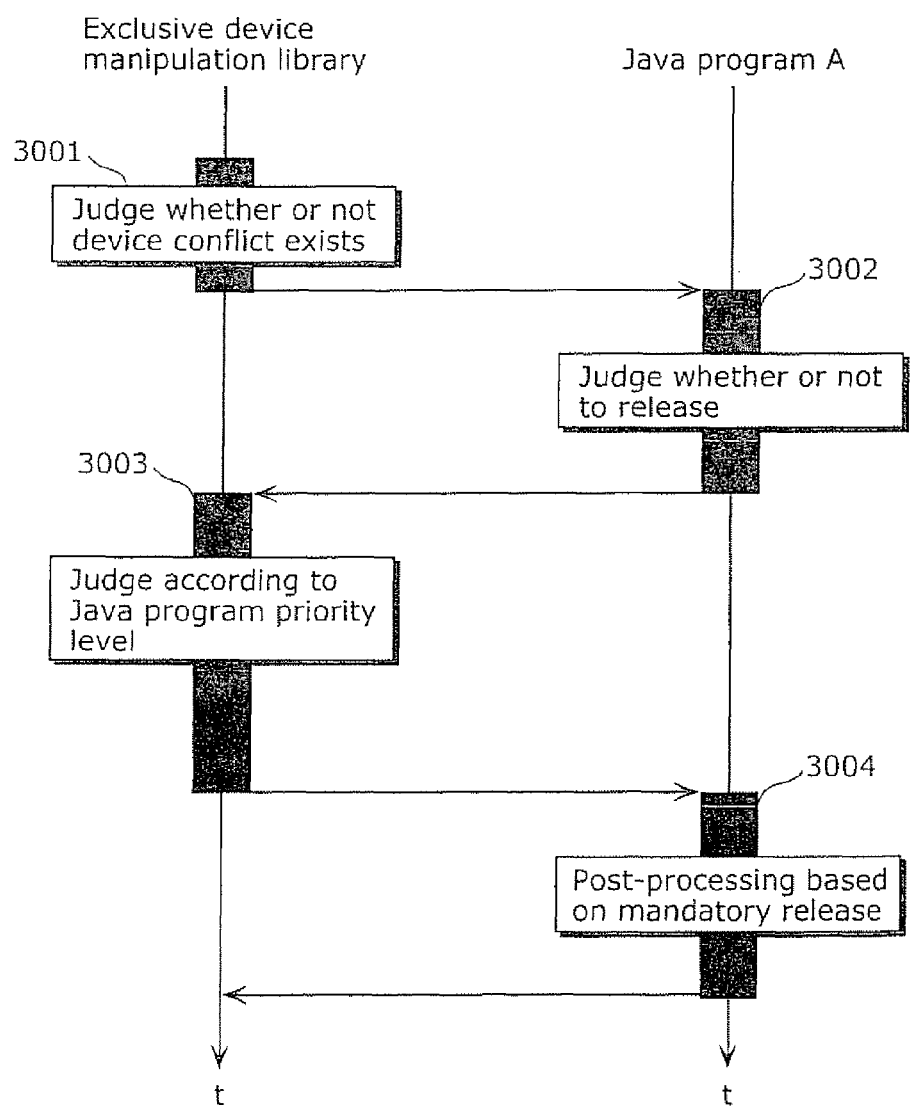
FIG. 30 is a sequence diagram representing the time consumption during the use of the device conflict solution algorithm 1 according to the present invention.

FIG. 30 is a sequence diagram describing who consumed time in which type of operation, in the case where the device conflict solution algorithm 1 is used. First, it is assumed that a Java program B newly requests reservation of the exclusive device to the exclusive device manipulation library. Then, the exclusive device manipulation library first judges whether or not there will be a conflict over the device to be reserved (3001). In the case of conflict, the exclusive device manipulation library requests the release of the device to a Java program A already reserving such device. The Java program A judges whether it is possible to stop the process being performed at that time so as to release the device (3002). Here, when it is judged that the device cannot be released, the exclusive device manipulation library, upon receiving such result, performs a comparison of priority levels between the Java program A and the Java program newly attempting to reserve the device (3003). When the Java program newly attempting to reserve the device has a higher priority, a mandatory release notification is given to the Java program A. Upon receiving the mandatory release notification, the Java program A carries out mandatory release-based post-processing (3004) and notifies the exclusive device manipulation library of the end of the post-processing.

Figure 31:
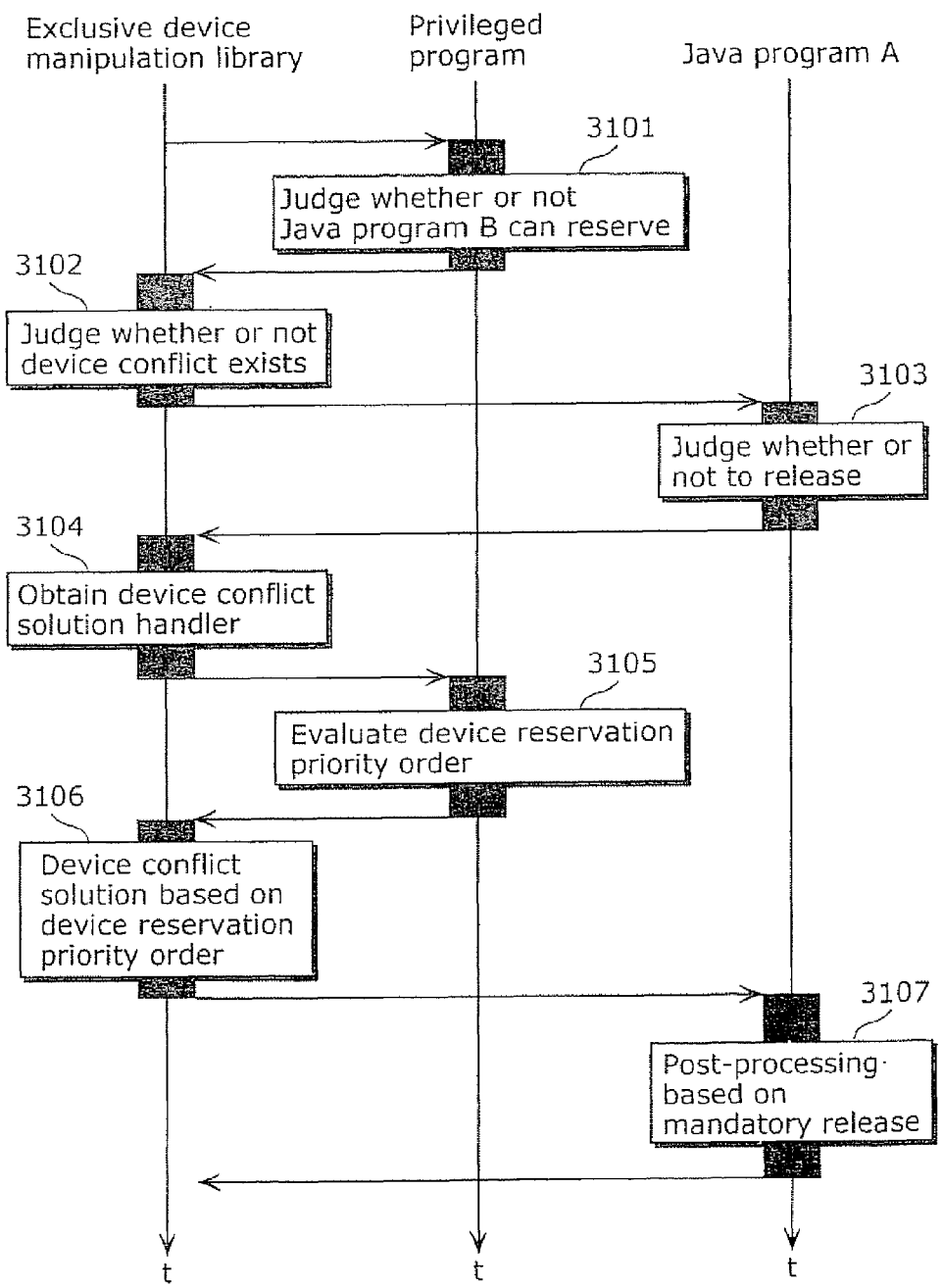
FIG. 31 is a sequence diagram representing the time consumption during the use of the device conflict solution algorithm 2 according to the present invention.

FIG. 31 is a sequence diagram describing who consumed time in which type of operation, in the case where the device conflict solution algorithm 2 is used. First, it is assumed that a Java program B newly requests reservation of the exclusive device to the exclusive device manipulation library. Then, the exclusive device manipulation library first uses the Java program filter in order to have the privileged program judge whether or not the Java program B can reserve the exclusive device which is the object for reservation. The privileged program judges whether or not the Java program B can reserve the object exclusive device (3101), and returns the result to the exclusive device manipulation library. Next, the exclusive device manipulation library judges whether or not there will be a conflict over the device to be reserved (3102).

In the case of a conflict, the exclusive device manipulation library requests release of the device to the Java program A already reserving such device. The Java program A judges whether it is possible to stop the process being performed at that time so as to release the device (3103). Here, when it is judged that the device cannot be released, the exclusive device manipulation library, upon receiving such result, uses the device conflict solution handler in order to have the privileged program decide on which Java program to prioritize. The privileged program decides on a device reservation priority order (3105), and returns the result to the exclusive device manipulation library. The exclusive device manipulation library solves the device conflict based on such priority order (3106). In addition, a mandatory release notification is given to the Java program A for which the device is to be denied. Upon receiving the mandatory release notification, the Java program A carries out mandatory release-based post-processing (3107) and notifies the exclusive device manipulation library of the end of the post-processing.

As shown in FIG. 30 and FIG. 31, the device conflict solution procedure stipulated in the OCAP and OCAP-DVR specifications sequentially incorporate, not only the exclusive device manipulation library which is built into the terminal, but also the privileged program which is downloaded and executed, as well as the operation of a Java program reserving a device. In other words, the time taken for device conflict solution cannot be predicted as it is dependent on the privileged program and the operation of Java programs.

A specific example is given. A case where the privileged program registers the device conflict solution handier in a device conflict solution algorithm control library 1605i is considered. At this time, the Java program A and the Java program B are operating at the same time and, when each attempts to manipulate the tuner 1301 using the tuner 1605c, the tuner 1605c calls the device reservation priority order obtainment API of the device conflict solution handler, and obtains a matrix representing an order, Subsequently, device conflict solution is carried out based on the order of Java program identifiers within the obtained matrix. Here, focusing on the fact that the device conflict solution handier is provided by the privileged program, it is possible for the privileged program to perform a desired operation inside the device schedule priority order obtainment API implementation. For example, it is possible to have an implementation which returns a matrix in which the Java program A is always prioritized.

For example, it is also possible to have an implementation in which a dialogue indicating the Java program A and Java program B as options is displayed on a screen, and the right to select is given to the user. In the latter case, since time is needed for the user to input a choice, certain privileged programs may set a timeout, such as one minute, and wait for the input during that duration, and certain privileged programs may wait indefinitely for the input of the user. In other words, it is not possible for the tuner 1605c to predict the amount of time needed from when the tuner 1605c calls the device reservation priority order obtainment API to when a matrix indicating the priority order is returned.

Hereinafter, characteristic elements of the present invention are described in detail. The present invention relates to device conflict solution between a scheduled recording and reproduction of a service.

It is already mentioned that the Java program can make a scheduled recording by using the recording manager administrator 1605g. A record schedule can be made with at least the channel identifier, recording start time, and recording duration of the service to be recorded. Since the recording process is a process which reserves at least the In-band receiving tuner 1301 as an exclusive device, the scheduled recording can be considered as "the scheduling of a future device reservation".

Since a scheduled recording per se explicitly has a recording start time, and a recording duration, it is easy to avoid conflict between scheduled recordings. For example, although a scheduled recording A in which a one-hour recording is performed from 10 o'clock, and a scheduled recording B in which a one-hour recording is performed from 12 o'clock will not cause device conflict, a scheduled recording C in which a one-hour recording is performed from 10:30 will cause device conflict with the scheduled recording A. This is because, in this case, two recording processes are requested at least between 10:30 and 11 o'clock. There is a need for the recording manager administrator 1605g to have a function for detecting such overlapping of scheduled recording times in advance.

However, whereas the time slot for using a device is explicitly indicated in the scheduled recording, time limits for the use of a device is not explicitly indicated in a "process which is requested by a Java program and started in real-time" such as reproduction of video and audio included in a broadcast MPEG-2 transport stream. In addition, there is no way for the terminal to predict when a Java program will start such process. In this manner, in the present invention, a process for which the start and end cannot be predicted by the terminal is referred to as a "spontaneous process".

Processes stipulated in the OCAP specification, that are performed using information within an MPEG-2 stream (section filtering, AV reproduction, and so on) are all spontaneous processes. In device conflict between spontaneous processes, it is sufficient to carry out device conflict solution when the device conflict occurs.

It is already mentioned that it is easy to solve "future device conflict" between scheduled recordings, at the time of recording scheduling. However, whether or not device conflict between a spontaneous process and a scheduled recording will occur is not clear until the start time of the recording that was scheduled (Fact 1).

Furthermore, as described earlier, the time needed by the device conflict solution processes conforming to the device conflict solution algorithm 1 and the device conflict solution algorithm 2 stipulated in the OCAP specification cannot be predicted in advance by the terminal (Fact 2).

From the aforementioned fact 1 and fact 2, it is possible to derive a conclusion that in the case where device conflict solution is started when the recording start time comes, the recording cannot be started from the time specified at the time of scheduling, and thus, in order to uphold the recording start time, it is necessary to perform the device conflict solution in advance.

In the present embodiment, the privileged program specifies in advance, to the recording manager administrator 1605g the time indicating "how far ahead of the start time of the scheduled recording the device conflict solution is to be performed". The recording manager administrator 1605g starts the device conflict solution process ahead of the time at which the recording will actually be started.

Figure 32:
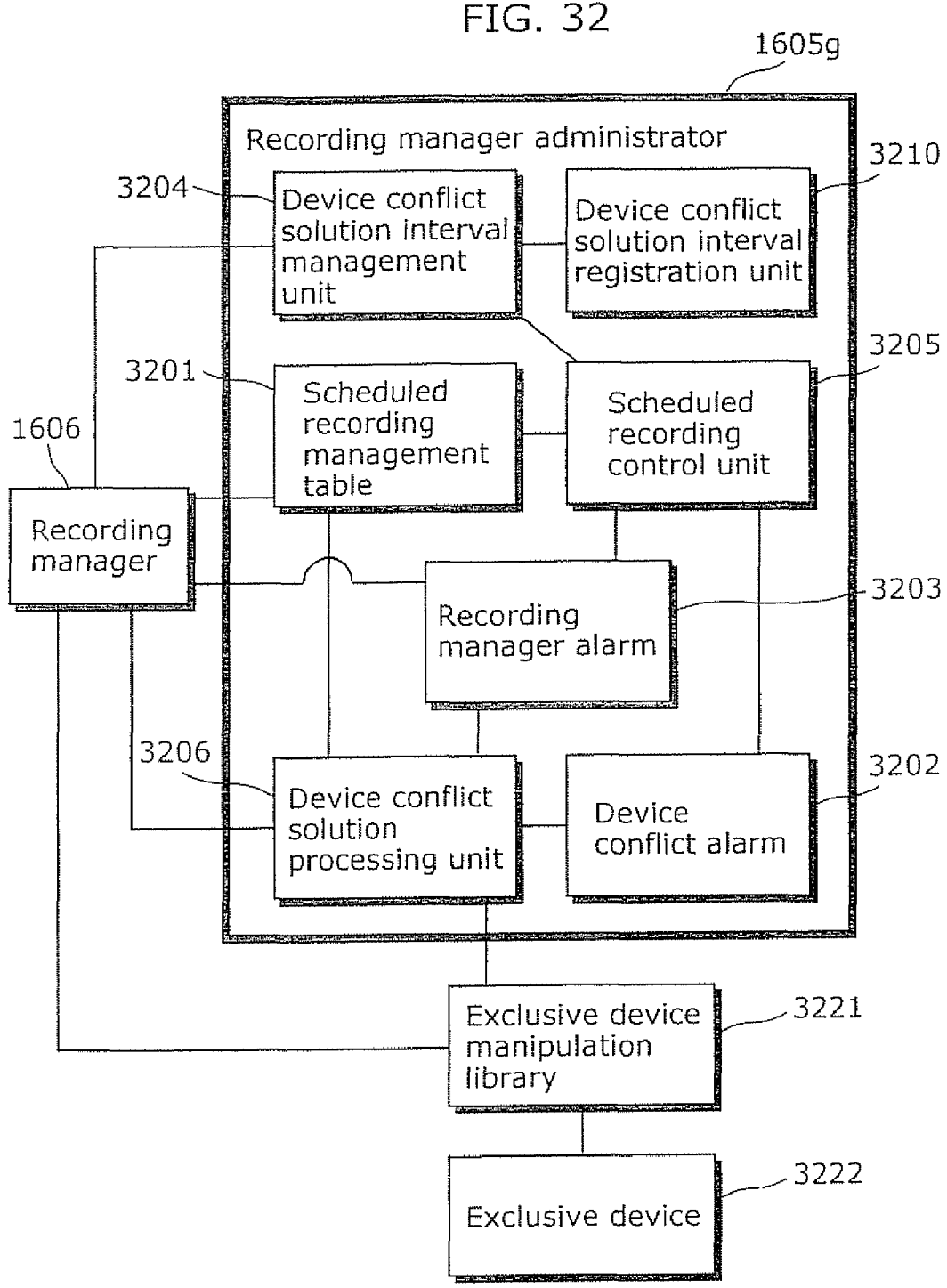
FIG. 32 is a configuration diagram of the recording manager administrator 1605g according to the present invention.

FIG. 32 is a structure diagram of the recording manager administrator 1605g which implements the present invention.

The recording manager 1606 is the same as that in FIG. 16.

An exclusive device 3222 represents the exclusive device such as the tuner 1301, as described earlier.

An exclusive device manipulation library 3221 represents the exclusive device manipulation library described earlier.

A scheduled recording management table 3201 is a table which holds scheduled recording information. The scheduled recording management table 3201 is managed in the secondary storage unit 1307 so as to be continuously held even during interruption of power supply. FIG. 33 is a diagram representing an example of the scheduled recording management table 3201. A column 3311 is a channel identifier of a service. A column 3312 is an identifier of a Java program which made the scheduled recording. A column 3313 is the time slot at which the recording is to be performed. A column 3314 is the status of the scheduled recording. The states of "recording-standby", "in conflict", "unsolved" are managed. "Recording-standby" indicates that there is no overlapping with a recording time of another scheduled recording. "In conflict" indicates that there is overlapping with the recording time of another scheduled recording, and that recording cannot be started as is. "Unsolved" indicates that the scheduled recording has not yet been examined as to whether or not its time slot overlaps with that of another scheduled recording. The column 3315 is a schedule ID for uniquely identifying a scheduled recording. Rows 3301 to 3303 are details of the scheduled recordings.

Figures 35, 36:
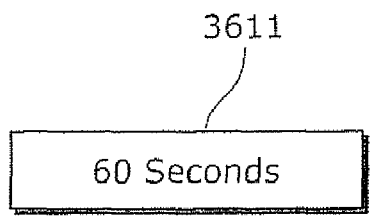
FIG. 35 is diagram representing an example of an alarm schedule chart managed by a device conflict alarm.
FIG. 36 is a diagram representing an example of the device conflict solution interval management unit 3206.

A device conflict alarm 3202 is an internal module which notifies the timing for performing device conflict solution, to a device conflict solution processing unit 3206. The device conflict alarm 3202 is initiated simultaneously during initiation of the terminal. This module may be implemented using a hardware timer, or it may also be implemented using software. FIG. 35 is a diagram representing an example of an alarm schedule chart managed by the device conflict alarm. A column 3511 is a time at which a device conflict is solved. A column 3512 is a schedule ID indicating a scheduled recording for which device conflict is to be solved. Rows 3501 to 3503 are the respective scheduled recordings.

A recording manager alarm 3203 is a module which notifies the recording manager 1606 that the recording start time has come, and is initiated during initiation of the terminal. This module may be implemented using a hardware timer, or it may also be implemented using software.

A device conflict solution interval management unit 3204 is an area for managing "an interval between a device conflict solution performed ahead of the recording start time and the recording start timer", which is set by the privileged program. The device conflict solution interval management unit 3204 is an area implemented in the primary storage unit 1308 or the secondary storage unit 1307. FIG. 36 is a diagram representing an example the device conflict solution interval management unit 3204. 3611 is an area which holds an interval. In the example in FIG. 36, the interval is 60 seconds.

Figure 34:
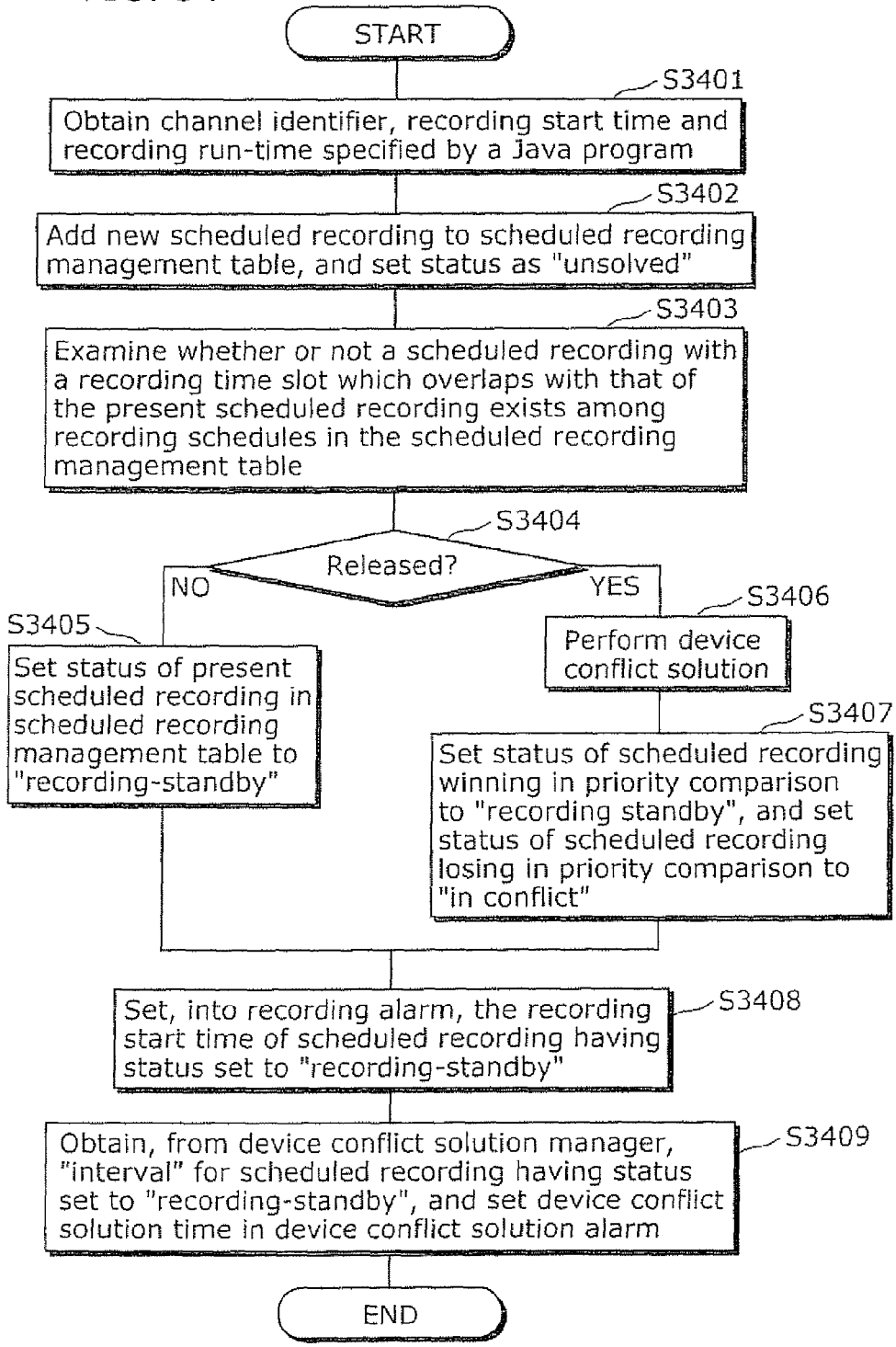
FIG. 34 is a sequence diagram describing the operating procedure of the scheduled recording control unit 3205.

A scheduled recording control unit 3205 is implemented as a library which manages information about scheduled recording. It is recorded in the ROM 1309, and is deployed in the primary storage unit 1308 at the time of execution. It operates by being used by a lava program executed by the Java VM 1603. FIG. 34 is a sequence diagram describing the operating procedure of the scheduled recording control unit 3205. In S3401, a channel identifier, a recording start time, and a recording duration specified by a Java program for registering a scheduled recording is obtained. In S3402, the information obtained in S3401 is additionally registered in the scheduled recording management table 3201. At this time, the status is set as "unsolved".

In S3403, examination is carried out as to whether or not there is a scheduled recording with a recording time slot which overlaps with that of the scheduled recording added in S3402. In S3404, it is judged whether or not a scheduled recording with an overlapping recording time slot exists. In the case where none exists, the process advances through NO to S3405. In S3405, the status is changed to "recording-standby" since there is no scheduled recording with a recording time slot which overlaps with that of the scheduled recording additionally registered in S3402, and the process ends. In branch S3404, in the case where there is a scheduled recording with an overlapping time slot, device conflict solution is carried out between the scheduled recordings in S3406; and the scheduled recording to be prioritized is determined The device conflict solution is carried out in accordance with the device conflict solution algorithms discussed earlier. In S3407, the status of the scheduled recording to be prioritized is set to "recording-standby", and the status of the scheduled recording that is not prioritized is set to "in conflict". In S3408, the recording start time of the scheduled recording which has had its status set as "recording-standby" in S3407 is obtained from the scheduled recording management table 3201, and the schedule ID and recording start time of such scheduled recording is set in the recording manager alarm 3203.

In S3408, a time which is ahead of the recording start time of the scheduled recording having a status set as "recording-standby" in S3407, by as much as the time obtained from the device conflict solution interval management unit 3204 is calculated. The time, which was obtained as a result of the calculation, and the schedule ID are set in the device conflict alarm 3202. For example, in the case where the scheduled recording management table 3201 is in the state shown in FIG. 33, the device conflict solution interval management unit is in the state shown in FIG. 36, and as a result of S3406, the scheduled recording having its status set as "recording-standby" is the row 3301, the recording start time "May 5th 21:00" obtained from the row 3301 is advanced by 60 seconds and "May 5th 20:59" is obtained. This value and a schedule ID obtained from the row 3301 are set in the device conflict alarm 3202.

Figure 37:
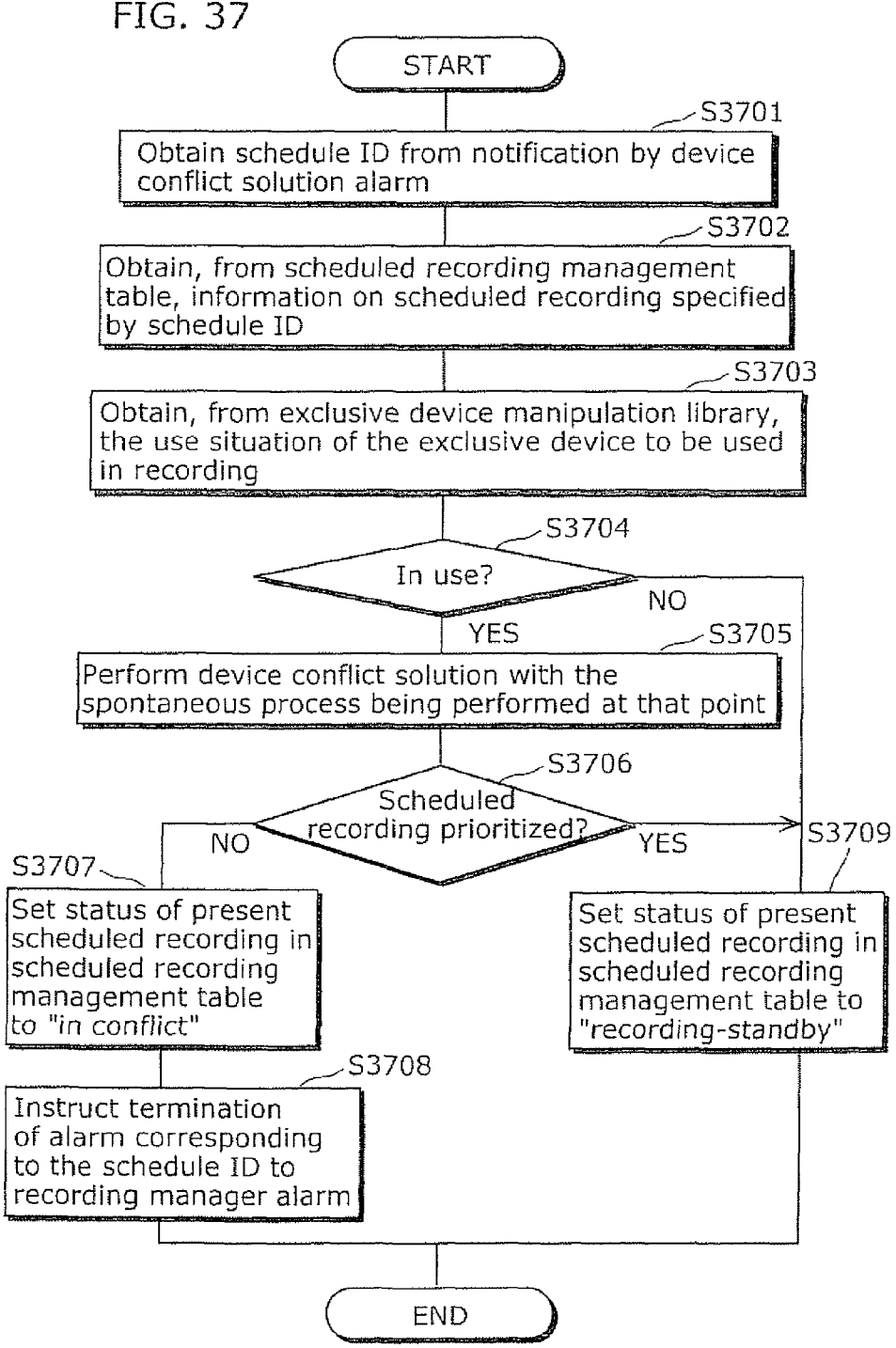
FIG. 37 is a sequence diagram describing the operating procedure of the device conflict solution interval management unit 3206 upon receiving a notification from the device conflict alarm 3202.

The device conflict solution processing unit 3206 is an internal module which performs device conflict solution between a recording that has been scheduled and a spontaneous process. The device conflict solution processing unit 3206 is implemented as a process or thread which actively operates by itself, and is initiated during initiation of the terminal, by being loaded from the ROM 1309 to the primary storage unit 1308. FIG. 37 is a sequence diagram describing the operating procedure of the device conflict solution processing unit 3206 upon receiving a notification from the device conflict alarm 3202. In S3701, the schedule ID of a scheduled recording on which advance device solution will be performed is obtained. In S3702, information regarding the scheduled recording is obtained from the scheduled recording management table 3201, using the schedule ID obtained in S3701. The process advances to S3703 and the use situation of the exclusive device is obtained from the exclusive device manipulation library which manages the exclusive device used in scheduled recording. In S3704, judgment is performed regarding the use situation of the exclusive device.

When, at that point, it is not being used for a spontaneous process such as reproduction, the process advances through NO to S3709 where the status of the scheduled recording in the scheduled recording management table 3201 is set as "recording-standby", and the process ends. When, at that point, the exclusive device is being used in a spontaneous process, the process advances through YES to S3705. In S3705, device conflict solution is carried out between the scheduled recording and the spontaneous process, and the process to be prioritized is determined. Device conflict solution is carried out in accordance with the device conflict solution algorithm discussed earlier. However, at this point, the priority order of between the scheduled recording and the spontaneous process is merely determined, and the actual take-over of the device is not carried out. The take-over of the device is carried out when the recording manager 1606 actually starts the recording. In S3706, it is judged whether or not to prioritize the scheduled recording, as a result of the device conflict solution performed in S3705. In the case where the scheduled recording is prioritized, the process advances to S3709 where the status of the scheduled recording in the scheduled recording management table 3201 is set as "recording-standby", and the process ends. In the case where the spontaneous process is prioritized, the process advances to through NO to 3707.

In S3707, the status of the scheduled recording in the scheduled recording management table 3201 is set as "in conflict" in order to indicate that recording for the scheduled recording cannot be started due to device conflict. In S3708, the schedule ID is specified and alarm termination is instructed to the recording manager alarm 3203. With this, the recording manager 1606 will not start the recording for the scheduled recording.

A device conflict solution interval registration unit 3210 is used for recording a device conflict solution interval in the device conflict solution interval management unit 3204. The device conflict solution interval registration unit 3210 is implemented as a library, and sets the device conflict solution interval by being called by the privileged program.

Figure 38:
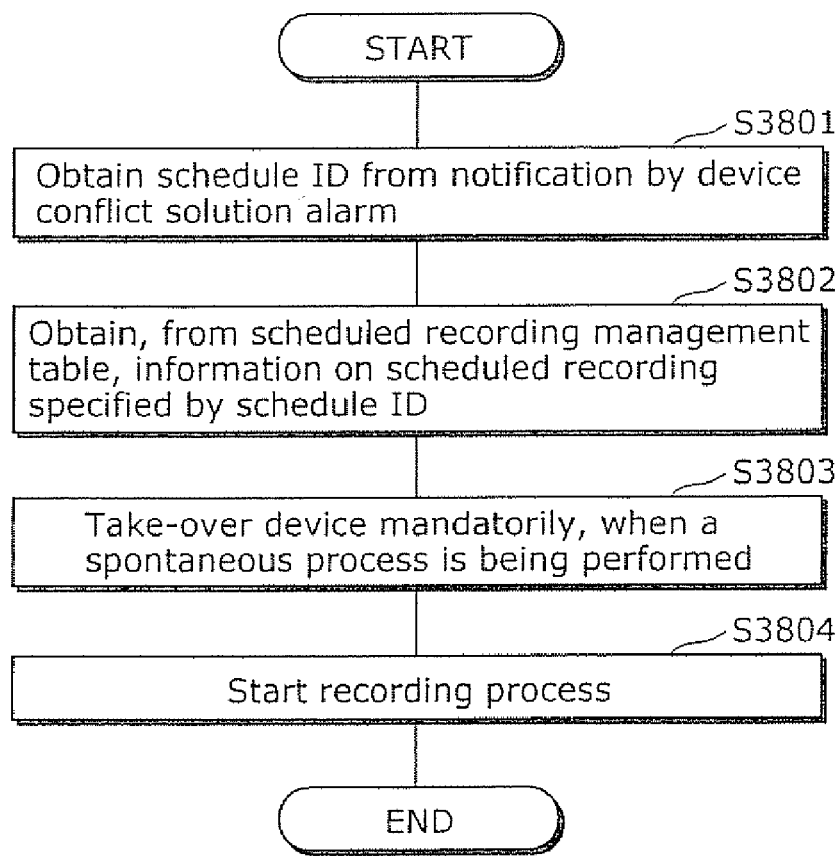
FIG. 38 is a sequence diagram describing the operating procedure of the recording manager 1606.

The recording manager 1606 receives the notification from the recording manager alarm 3203, and starts the recording process. Since the device conflict solution between the scheduled recording and the spontaneous process is already finished prior to the start of the recording, the device being used at this point by the spontaneous process is taken-over and the recording process is started. FIG. 38 is a sequence diagram describing the operating procedure of the recording manager 1606. In S3801, a schedule ID indicating a scheduled recording is obtained from a notification from the recording manager alarm. In S3802, information regarding the scheduled recording specified by the schedule ID is obtained from the scheduled recording management table 3201. In S3803, the device is mandatorily taken-over and, in S3804, recording is started.

With the method described in the present embodiment, device conflict solution can proceed ahead of the actual recording start time by as much as the interval specified by the privileged program, and the recording start time can be strictly upheld.

Note that, although in the present example, the recording manager 1606 reserves the exclusive device at the start of the scheduled recording, it is also possible to have an implementation in which the device conflict solution processing unit 3206, not the recording manager 1606, reserves the exclusive device at the end of the advance device conflict solution processing. In this case, the exclusive device is reserved before the start of the scheduled recording.

Second Embodiment

In the invention discussed in the present embodiment, in the case where the advance device conflict solution processing by the device conflict solution processing unit 3206 takes much time and the device conflict solution processing by the privileged program has not ended by the start of recording, the device conflict solution processing is ended mandatorily and shifted to the device conflict solution using Java program priority levels.

In the example for the device conflict solution interval management unit 3204 in FIG. 36, the advance device conflict solution processing is set by the privileged program to be performed 60 seconds in advance. In this case, it means that when there are 60 seconds, the privileged program presumes that "device conflict solution can be finished". However, there is a possibility that, in the device conflict solution processing, the processing does not finish within the interval which is set in advance by the privileged program, and which includes the operation of the privileged program. In this case, the device conflict solution by the device conflict solution processing unit 3206 is not yet finished when the recording manager 1606 is initiated by the recording manager alarm 3203, and thus an inconsistency arises.

Figure 39:
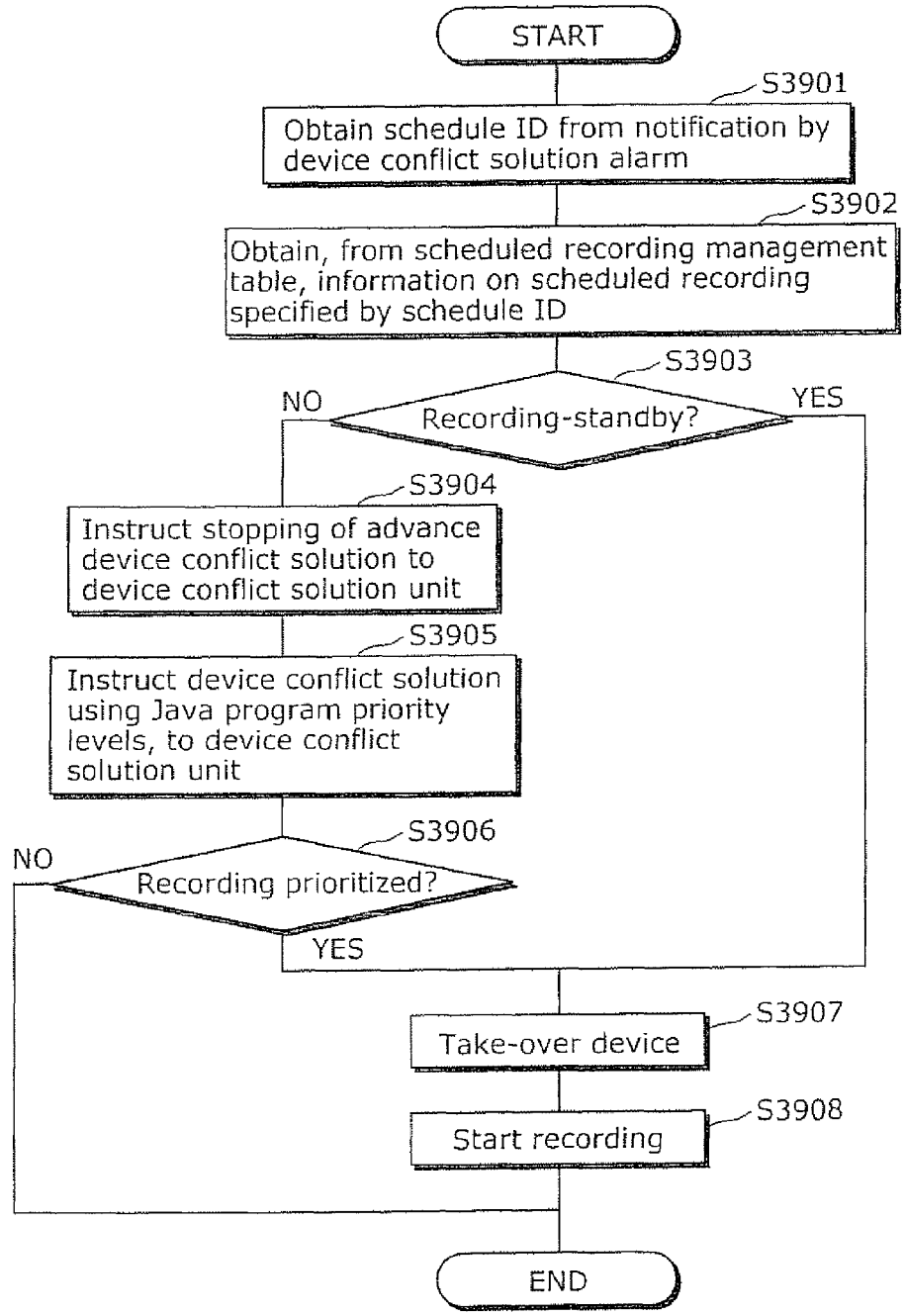
FIG. 39 is a sequence diagram describing the operating procedure of the recording manager 1606.

In the present embodiment, in the case where the device conflict solution by the device conflict solution processing unit 3206 is not yet finished when the recording manager 1606 is initiated by the recording manager alarm 3203, the recording manager 1606 instructs the device conflict solution processing unit 3206 to immediately stop the device conflict solution processing. Subsequently, it instructs the device conflict solution processing unit 3206 to immediately start device conflict solution processing using the Java program priority levels. FIG. 39 is a sequence diagram is diagram showing the operating procedure of the recording manager 1606. In S3901, a schedule ID indicating a scheduled recording is obtained from a notification by the recording manager alarm 3203. In S3902, information on the scheduled recording specified by the schedule ID is obtained from the scheduled recording management table 3201. In S3903, the status of the scheduled recording is examined.

When the status is "recording-standby", it means that the advance device conflict solution by the device conflict solution processing unit 3206 is already finished. In this case, the process advances through YES to S3907. In S3907, the device is mandatorily reserved and, in S3908, the recording is started, and the process ends. In branch S3903, when the status of the scheduled recording is "unsolved" instead of "recording-standby", it means that the advance device conflict solution by the device conflict solution processing unit 3206 is on-going. Here, the process advances through NO to S3904.

In S3904, the device conflict solution processing unit 3206 is instructed to stop the advance device conflict solution and, in S3905, the device conflict solution processing unit 3206 is instructed to immediately start device conflict solution processing which uses the Java program priority levels. When recording is prioritized as the result of priority judgment in S3906, the process advances through YES to S3907 and the process described earlier is carried out. When recording is not prioritized, the process advances through NO and the process ends.

Third Embodiment

In the present embodiment, in the case where advance device conflict solution does not end by the recording start time, scheduled recording processing is mandatorily prioritized.

Figure 40:
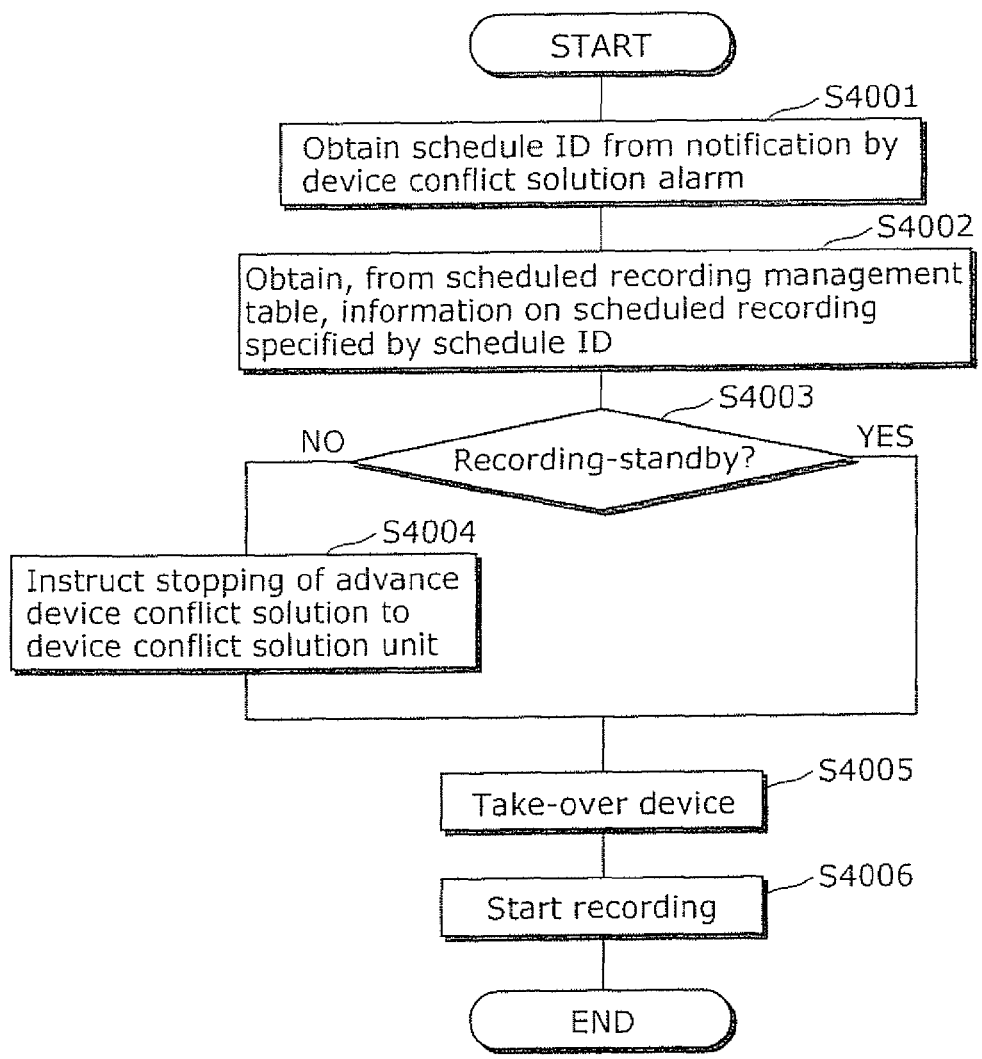
FIG. 40 is a sequence diagram describing the operating procedure of the recording manager 1606.

FIG. 40 is a sequence diagram showing the operating procedure of the recording manager 1606. In S4001, a schedule ID indicating a scheduled recording is obtained from a notification by the recording manager alarm 3203. In S4002, information on the scheduled recording specified by the schedule ID is obtained from the scheduled recording management table 3201. In S4003, the status of the scheduled recording is examined. When the status is "recording-standby", it means that the advance device conflict solution by the device conflict solution processing unit 3206 is already finished. In this case, the process advances through YES to S4005. In S4005, the device is mandatorily reserved and, in S4006, the recording is started and the process ends. In branch S4003, when the status is "unsolved", the process advances through NO to S4004. In S4004, the device conflict solution processing unit 3206 is instructed to stop the advance device conflict solution, and the process advances to S4005.

Note that although, in the present embodiment, a scheduled recording is always prioritized, it is also possible to have a policy in which a spontaneous process such as reproduction is always prioritized.

Fourth Embodiment

In the present embodiment, a privileged program sets, in advance, a policy for judging whether to prioritize a scheduled recording or a spontaneous process, in the case where advance device conflict solution does not end by the recording start time. In the case where advance device conflict solution does not end by the recording start time, the process to be prioritized is determined in accordance with the judgment policy.

Figure 41:
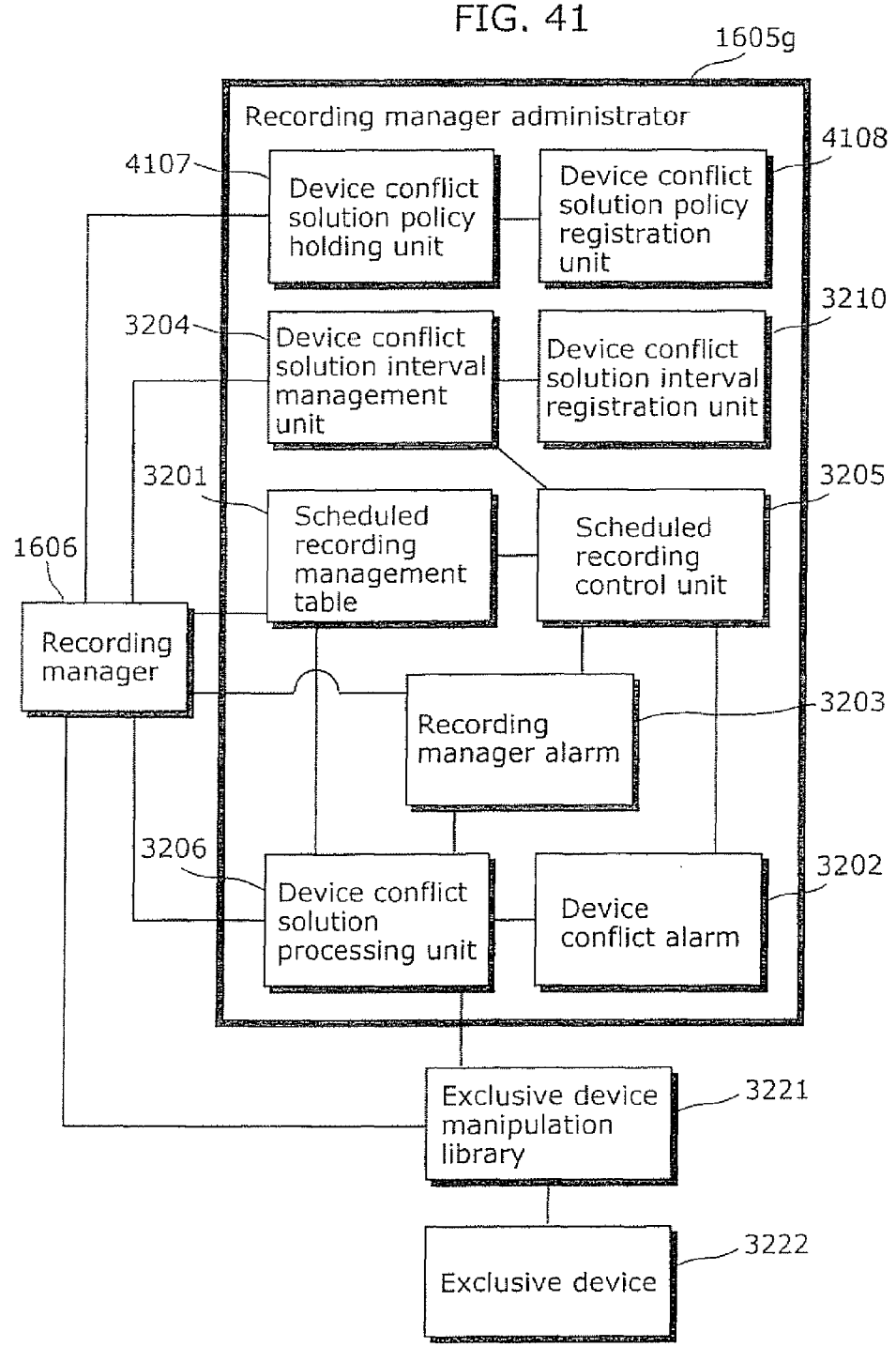
FIG. 41 is a diagram showing the configuration of the recording manager administrator 1605g in the fourth embodiment.

FIG. 41 shows the structure of the recording manager administrator 1605g in the present embodiment. Elements having the same reference numerals as in FIG. 32 are the same and thus, description is omitted. In the present embodiment, a device conflict solution policy holding unit 4107 and a device conflict solution policy registration unit 4108 are introduced.

The device conflict solution policy holding unit 4107 holds the judgment policy set in advance by the privileged program. The device conflict solution policy holding unit is implemented in the secondary storage unit 1307, and details are not lost even with power supply interruption.

The device conflict solution policy registration unit 4108 is implemented as a library. When the device conflict solution policy registration unit 4108 is used by the privileged program, it registers the judgment policy specified at the time of use, into the device conflict solution policy holding unit 4107.

Prior to the use of the scheduled recording control unit 3205, the privileged program sets the device conflict solution policy in advance by calling the device conflict solution policy registration unit 4108. When the device conflict solution policy registration unit 4108 is called, the terminal registers, in the device conflict solution policy holding unit 4107, the device conflict solution policy specified in parameters. The parameters in the device conflict solution policy registration unit 4108 in the present embodiment include at least "a flag which represents whether to prioritize scheduled recording, or to prioritize a spontaneous process such as reproduction".

Figure 42:
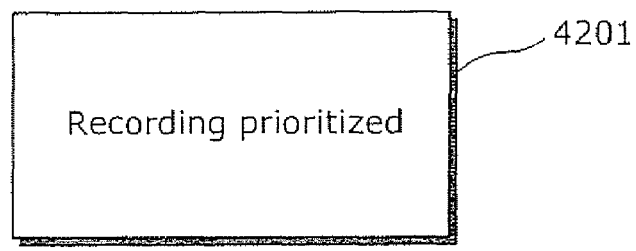
FIG. 42 is an example of a table managed by the device conflict solution policy holding unit 4107 in the fourth embodiment.

FIG. 42 shows an example of a table managed by the device conflict solution policy holding unit 4107, in the present embodiment. An area 4201 records the judgment policy in the case where the aforementioned advance device conflict solution process is not finished. In FIG. 42, a fact that scheduled recording is to be prioritized is recorded.

Figure 43:
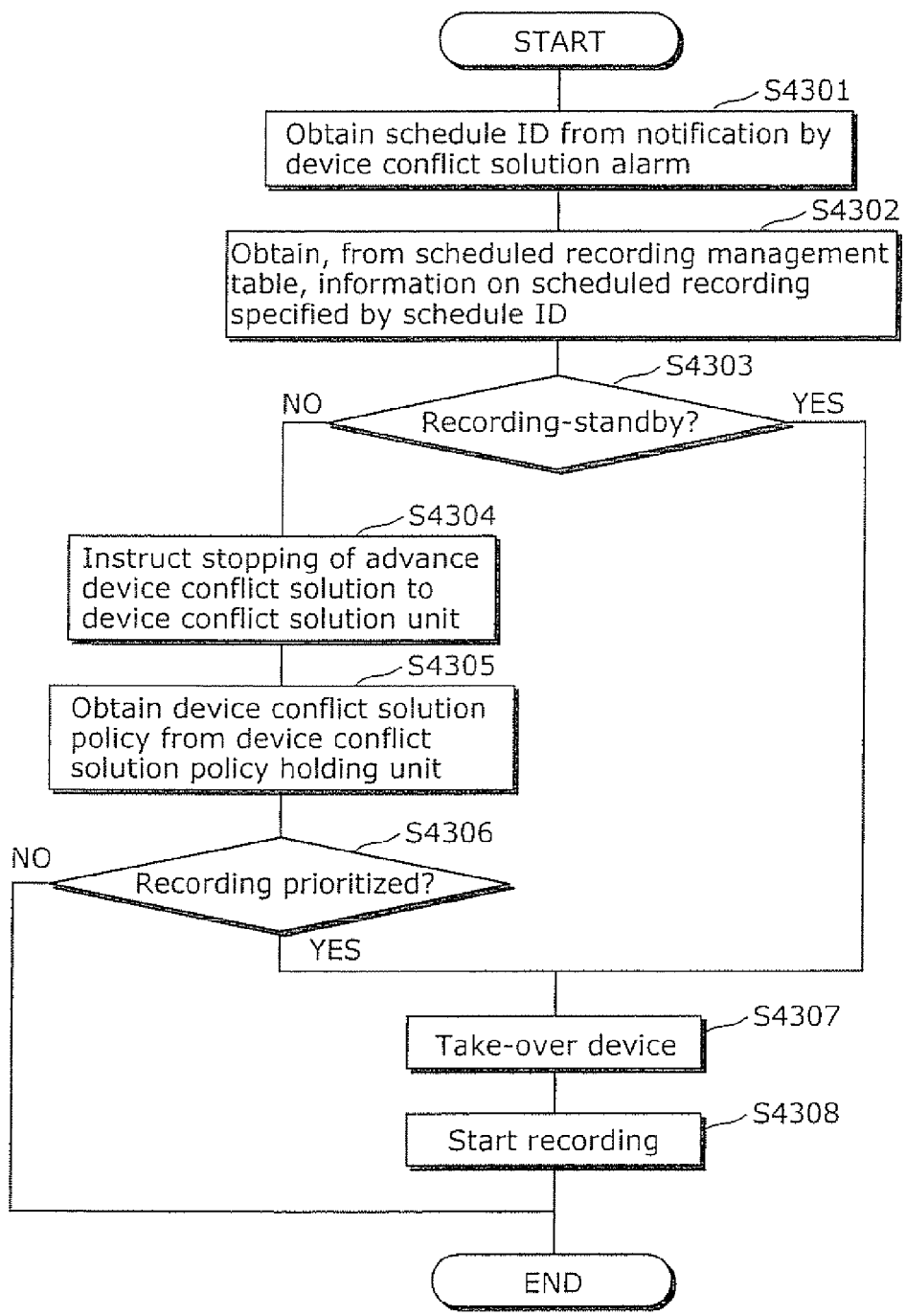
FIG. 43 is a sequence diagram describing the operating procedure of the recording manager 1606 in the fourth embodiment.

FIG. 43 is a sequence diagram showing the operation of the recording manager 1606 in the present embodiment. In S4301, a schedule ID indicating a scheduled recording is obtained from a notification by the recording manager alarm 3203. In S4302, the information on the scheduled recording specified by the schedule ID is obtained from the scheduled recording management table 3201. In S4303, the status of the scheduled recording is examined. When the status is "recording-standby", it means that the advance device conflict solution by the device conflict solution processing unit 3206 is already finished. In this case, the process advances through YES to S4307. In S4307, the device is mandatorily reserved and, in S4308, the recording is started and the process ends In branch S4303, when the status of the scheduled recording is "unsolved" instead of "recording-standby", it means that the advance device conflict solution by the device conflict solution processing unit 3206 is on-going. Here, the process advances through NO to S4304. In S4304, the device conflict solution processing unit 3206 is instructed to stop the advance device conflict solution. In S4305, the device conflict solution policy set in advance by the privileged program is obtained from the device conflict solution policy holding unit 4107. In S4306, the device conflict solution policy obtained in S4305 is judged and, when scheduled recording is to be prioritized, the process advances through YES to S4307 and the process described earlier is carried out. When scheduled recording is not prioritized, the process advances through NO and the process ends.

Fifth Embodiment

In the present embodiment, the privileged program sets, "on a per time slot basis", a judgment policy indicating which of scheduled recording and a spontaneous program is to be prioritized in the case where advance device conflict solution does not end by the recording start time.

The parameters in the device conflict solution policy registration unit 4108 in the present embodiment include at least "a specification for a time slot in which scheduled recording is prioritized".

Figure 44:
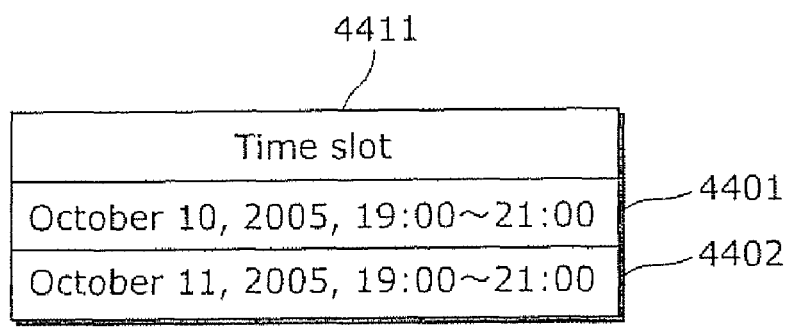
FIG. 44 is a diagram showing an example of a table managed by the device conflict solution policy holding unit 4107 in the fifth embodiment.

The device conflict solution policy holding unit 4107 in the present embodiment holds time slots in which scheduled recording is prioritized. FIG. 44 shows an example of a table managed by the device conflict solution policy holding unit 4107 in the present embodiment. A column 4411 denotes a time slot. Lines 4401 and 4402 indicate respective time slot settings. In the present example, scheduled recording is prioritized on Oct. 10, 2005, 19:00 to 21:00 and Oct. 11, 2005, 19:00 to 21:00.

The operation of the recording manager 1606 in the present embodiment is the same as in FIG. 43. However, what is read in S4305 is information in the table represented in FIG. 44, and in judging which to prioritize in S4306, scheduled recording is prioritized when the start time of the scheduled recording is included in the time slot described in such table; and the spontaneous process such as reproduction is prioritized when the time slot is not included.

Moreover, although in the present embodiment, scheduled recording is prioritized in the time slots held in the device conflict solution policy holding unit 4107, and the spontaneous process such as reproduction is prioritized in the rest of the time slots, the opposite setting is also possible. In other words, management can also be carried out by having the device conflict solution policy holding unit 4107 hold time slots in which a spontaneous process such as reproduction is prioritized, and scheduled recording is prioritized in the rest of the time slots. In this case, the parameters in the device conflict solution policy registration unit 4108 include at least "a specification for time slots in which a spontaneous process such as reproduction is prioritized".

Note although in the present embodiment, it is described that the scheduled recording is prioritized when the start time of the scheduled recording is included among the time slots held in the device conflict solution policy holding unit 4107, it is also possible that the scheduled recording is prioritized when the entire time period from the start time to the end time of the scheduled recording is included. Furthermore, it is also possible that scheduled recording is prioritized when the end time of the scheduled recording is included.

Sixth Embodiment

In the present embodiment, the privileged program sets, "on a per channel basis", a judgment policy indicating which of scheduled recording and a spontaneous program is to be prioritized in the case where advance device conflict solution does not end by the recording start time.

The parameters in the device conflict solution policy registration unit 4108 in the present embodiment include at least "a channel identifier which prioritizes scheduled recording".

Figure 45:
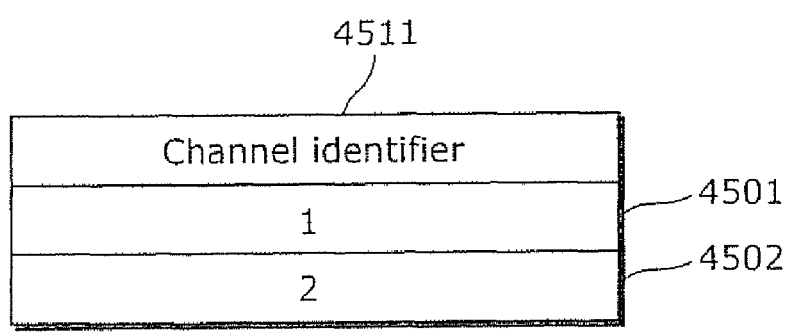
FIG. 45 is a diagram showing an example of a table managed by the device conflict solution policy holding unit 4107 in the sixth embodiment.

The device conflict solution policy holding unit 4107 in the present embodiment holds a channel identifier for identifying a service in which scheduled recording is prioritized. FIG. 45 shows an example of a table managed by the device conflict solution policy holding unit 4107 in the present embodiment. A column 4511 denotes a channel identifier. Lines 4501 and 4502 indicate respective channel identifier settings. In the present example, scheduled recording is prioritized for channel identifiers "1" and "2".

The operation of the recording manager 1606 in the present embodiment is the same as in FIG. 43. However, what is read in S4305 is information in the table represented in FIG. 45, and in judging which to prioritize in S4306, scheduled recording is prioritized when the channel identifier representing the service which is the object of the scheduled recording is included in the channel identifier group described in such table; and the spontaneous process such as reproduction is prioritized when it is not included.

Moreover, although in the present embodiment, scheduled recording is prioritized for the services represented by the channel identifiers held in the device conflict solution policy holding unit 4107, and a spontaneous process such as reproduction is prioritized for the rest of the services, the opposite setting is also possible. In other words, management can also be carried out by having the device conflict solution policy holding unit 4107 hold channel identifiers of services in which a spontaneous process such as reproduction is prioritized, and scheduled recording is prioritized for the rest of the services. In this case, the parameters in the device conflict solution policy registration unit 4108 include at least "a channel identifier which prioritizes a spontaneous process such as reproduction".

Seventh Embodiment

In the present embodiment, the privileged program sets, "on a one or more broadcast program basis", a judgment policy indicating which of scheduled recording and a spontaneous program is to be prioritized in the case where advance device conflict solution does not end by the recording start time.

Specifications concerning broadcast program recording, in the OCAP-DVR specification and the like, assume a method which provides, during the specifying of a broadcast program recording, a broadcast program identifier which identifies a broadcast program. The broadcast program identifier used at this time indicates one or more broadcast programs. The broadcast program identifier is linked to a service and time slot through an SI. Upon receiving the scheduled recording request specifying a broadcast program identifier, the terminal derives the specific service and recording time, using the SI, and carries out the recording.

As an example of the case where the broadcast program identifier represents one broadcast program, a broadcast program identifier indicating, for example, a certain movie is specified to schedule the recording. As an example of the case where the broadcast program identifier represents a plurality of broadcast programs, a broadcast program identifier indicating, for example, a certain twelve-part drama series is specified to schedule the recordings. In this manner, there are cases where one broadcast program identifier can represent one or more broadcast programs. Moreover, methods which use the SI, for settling "whether a broadcast program identifier represents one broadcast program or a plurality of broadcast programs", and "which time slot of which service is to be shown" vary depending on the format of the SI, and thus descriptions shall be omitted. However, the present invention can be applied regardless of what means for solving is utilized.

The parameters in the device conflict solution policy registration unit 4108 in the present embodiment include at least "a channel identifier indicating one or more broadcast programs for which scheduled recording is prioritized".

Figure 46:
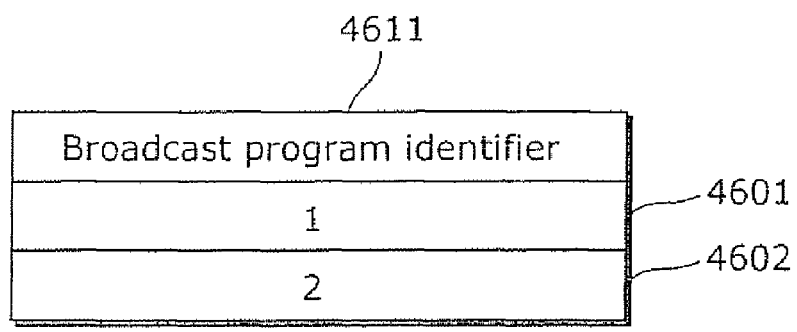
FIG. 46 is a diagram showing an example of a table managed by the device conflict solution policy holding unit 4107 in the seventh embodiment.

The device conflict solution policy holding unit 4107 in the present embodiment holds a broadcast program identifier for identifying a broadcast program for which scheduled recording is prioritized. FIG. 46 shows an example of a table managed by the device conflict solution policy holding unit 4107 in the present embodiment. A column 4611 denotes a broadcast program identifier. Lines 4601 and 4602 indicate respective broadcast program identifier settings. In the present example, scheduled recording is prioritized for broadcast program identifiers "1" and "2".

The operation of the recording manager 1606 in the present embodiment is the same as in FIG. 43. However, what is read in S4305 is information in the table represented in FIG. 46, and in judging which to prioritize in S4306, scheduled recording is prioritized when the broadcast program identifier, which represents the broadcast program which is the object of the scheduled recording, is included in the broadcast program identifier group described in such table; and the spontaneous process such as reproduction is prioritized when it is not included.

Moreover, although in the present embodiment, scheduled recording is prioritized for the broadcast programs represented by the broadcast program identifiers held in the device conflict solution policy holding unit 4107, and a spontaneous process such as reproduction is prioritized for the rest of the broadcast programs, the opposite setting is also possible. In other words, management can also be carried out by having the device conflict solution policy holding unit 4107 hold broadcast program identifiers of broadcast programs for which a spontaneous process such as reproduction is to be prioritized, and scheduled recording is prioritized for the rest of the broadcast programs. In this case, the parameters in the device conflict solution policy registration unit 4108 include at least "a broadcast program identifier for which a spontaneous process such as reproduction is prioritized".

Note that although in the present embodiment, the device conflict solution policy holding unit 4107 manages broadcast program identifiers as in FIG. 46, it is also possible that the broadcast program identifiers are settled in advance using an SI, and then held by being changed into a time slot table as in FIG. 44.

Eight Embodiment

In the present embodiment, the privileged program sets, "on a per resource basis", a judgment policy indicating which of scheduled recording and a spontaneous program is to be prioritized in the case where advance device conflict solution does not end by the recording start time.

The parameters in the device conflict solution policy registration unit 4108 in the present embodiment include at least "a resource identifier for which scheduled recording is prioritized".

Figure 47:
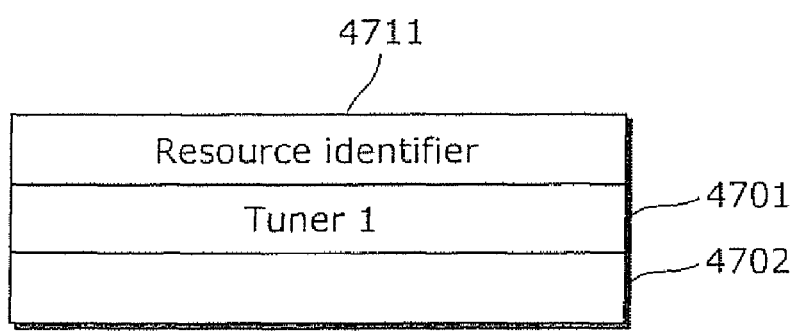
FIG. 47 is a diagram showing an example of a table managed by the device conflict solution policy holding unit 4107 in the eighth embodiment.

The device conflict solution policy holding unit 4107 in the present embodiment holds a resource identifier for identifying a resource for which scheduled recording is prioritized. FIG. 47 shows an example of a table managed by the device conflict solution policy holding unit 4107 in the present embodiment. A column 4711 denotes a resource identifier. A line 4701 indicates a respective resource identifier setting. In the present example, scheduled recording is prioritized for a resource identifier "tuner 1".

The operation of the recording manager 1606 in the present embodiment is the same as in FIG. 43. However, what is read in S4305 is information in the table represented in FIG. 47, and in judging which to prioritize in S4306, scheduled recording is prioritized when the resource identifier, which represents the resource which is under conflict, is included in the resource identifier group described in such table; and the spontaneous process such as reproduction is prioritized when it is not included.

Moreover, although in the present embodiment, scheduled recording is prioritized for the resource represented by the resource identifiers held in the device conflict solution policy holding unit 4107, and a spontaneous process such as reproduction is prioritized for the rest of the resources, the opposite setting is also possible. In other words, management can also be carried out by having the device conflict solution policy holding unit 4107 hold resource identifiers of resources for which a spontaneous process such as reproduction is prioritized, and scheduled recording is prioritized for the rest of the resources. In this case, the parameters in the device conflict solution policy registration unit 4108 include at least "a resource identifier identifying a resource for which a spontaneous process such as reproduction is prioritized".

Ninth Embodiment

In the present embodiment, a judgment policy indicating which of scheduled recording and a spontaneous program is to be prioritized in the case where advance device conflict solution does not end by the recording start time is provided to the scheduled recording control unit 3205 at the time of the scheduled recording.

The parameters in the scheduled recording control unit 3205 in the present embodiment include at least "a flag indicating whether or not to prioritize scheduled recording", aside from values indicating the object of the recording.

FIG. 48 is a diagram representing information managed by the scheduled recording management table 3201 in the present embodiment. Columns 3311 to 3315 are the same as in FIG. 33 and thus descriptions are omitted. A column 4816 is a recording priority flag indicating, on a per scheduled recording basis, "whether to prioritize the scheduled recording or to prioritize a spontaneous process such as reproduction". Lines 4801 to 4803 are respective scheduled recordings which include a recording priority flag. In the present example, since the recording priority flag is "TRUE" for the scheduled recordings described in lines 4801 and 4803, they indicate that scheduled recording is prioritized, and since the recording priority flag is "FALSE" for the scheduled recording described in line 4802, it indicates that a spontaneous process such as reproduction is prioritized.

The operation of the recording manager 1606 in the present embodiment is the same as in FIG. 43 except in two points. The first point of difference is that what is read in S4305 is information shown in FIG. 48, which is managed by the scheduled recording management table 3201. The second point of difference is that, in judging which to prioritize in S4306, scheduled recording is prioritized for the scheduled recording causing the conflict when the recording priority flag of such scheduled recording is "TRUE"; and the spontaneous process such as reproduction is prioritized when it is "FALSE".

Moreover, in the present embodiment, prioritizing of scheduled recording is indicated when the recording priority flag in the column 4816 of FIG. 48 managed by the scheduled recording management table 3201 is "TRUE" and prioritizing of a spontaneous process such as reproduction is indicated when it is "FALSE". However, it is also possible to introduce a spontaneous process priority flag in place of the recording priority flag, and indicate the prioritizing of a spontaneous process such as reproduction when such flag is "TRUE", and indicate prioritizing of a scheduled recording when it is "FALSE". In this case, the scheduled recording control unit 3205 includes, as parameters, at least "a flag which indicates whether or not to prioritize a spontaneous process such as reproduction".

Tenth Embodiment

In the present embodiment, in the case where advance device conflict solution does not end by the recording start time, an inquiry is made to the privileged program as to whether or not to extend and continue executing the advance device conflict solution.

Figure 49:
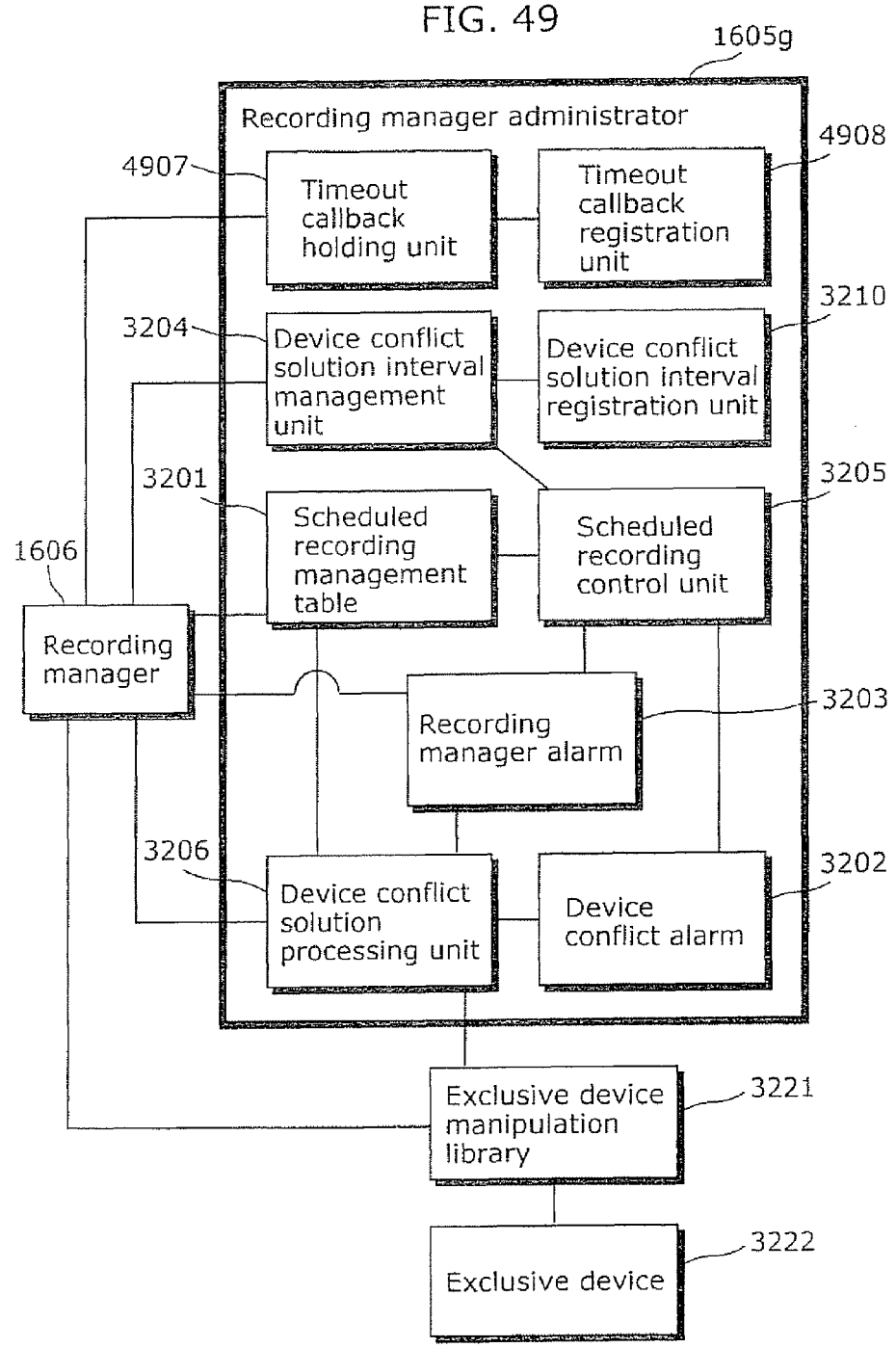
FIG. 49 is a diagram showing the configuration of the recording manager administrator 1605g in the tenth embodiment.

FIG. 49 shows the structure of the recording manager administrator 1605g in the present embodiment. Constituent elements having the same reference numbers as in FIG. 32 have the same functions and thus description is omitted. In FIG. 29, a timeout callback holding unit 4907 and a timeout callback registration unit 4908 are introduced.

The timeout callback holding unit 4907 holds a timeout callback which is called in the case where advance device conflict solution does not end by the recording start time. The timeout callback holding unit 4907 is implemented as an area in the primary storage unit 1308 or the secondary storage unit 1307. Furthermore, it may also be implemented as a dedicated register.

The timeout callback registration unit 4908 is used in registering the timeout callback held in the timeout callback holding unit 4907. The registration of a timeout callback is carried out through the calling of the timeout callback registration unit 4908 by the privileged program. The timeout callback registration unit 4908 is implemented as a library, actually exists in the ROM 1309, and is deployed in the primary storage unit 1308 at the time the terminal is initiated.

Figure 50:
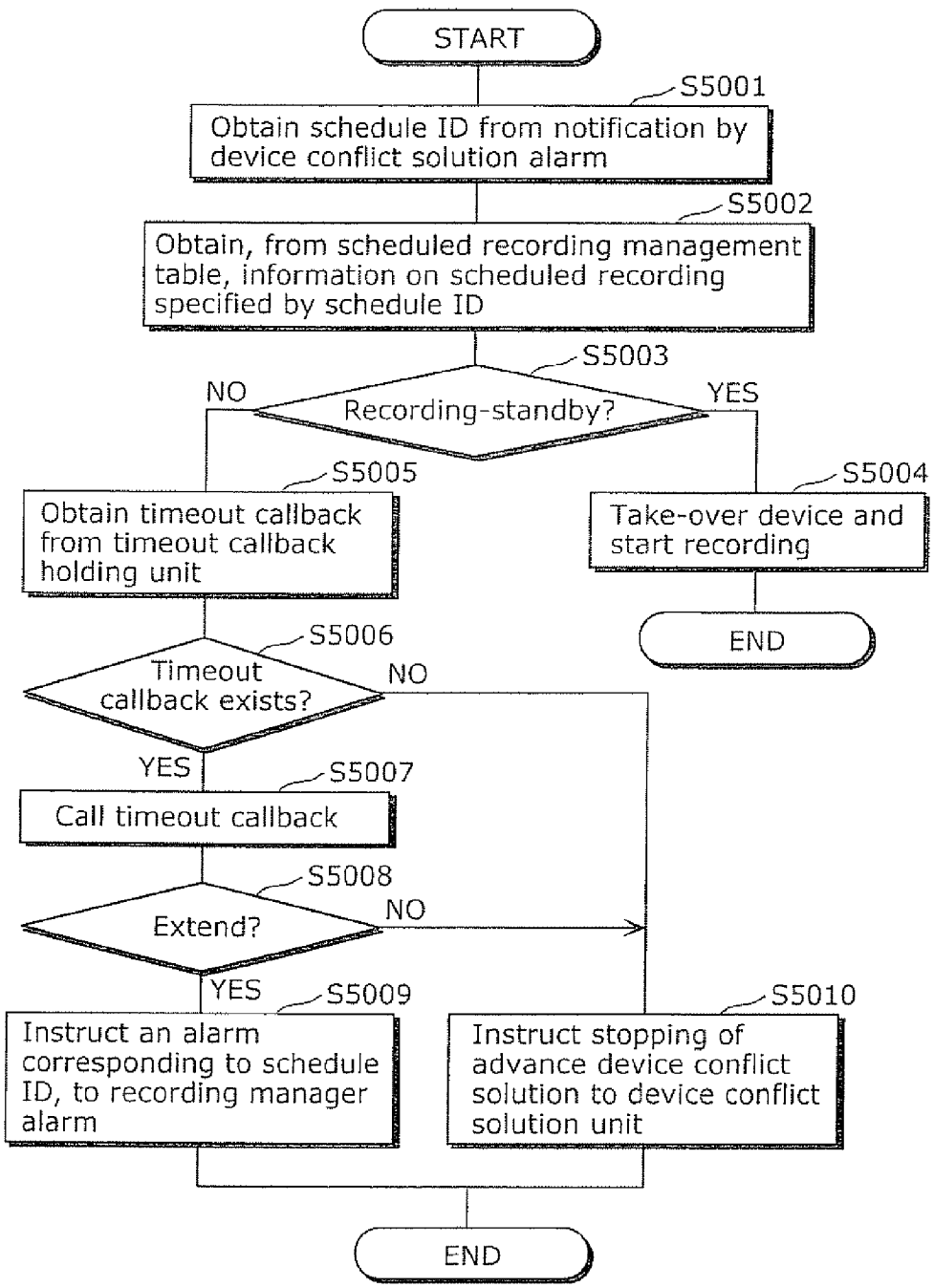
FIG. 50 is a operating sequence diagram of the recording manager 1606 in the tenth embodiment.

FIG. 50 is a sequence diagram describing the operation of the operation of the recording manager 1606 in the case where a timeout callback is registered. In S5001, a schedule ID indicating a scheduled recording is obtained from a notification by the recording manager alarm 3203. In S5002, information on the scheduled recording specified by the schedule ID is obtained from the scheduled recording management table 3201. In S5003, the status of the scheduled recording is examined. When the status is "recording-standby", it means that the advance device conflict solution by the device conflict solution processing unit 3206 is already finished. In this case, the process advances through YES to S5004.

In S5004, the device is mandatorily reserved, the recording is started, and the process ends. In branch S5003, when the status of the scheduled recording is "unsolved" instead of "recording-standby", it means that the advance device conflict solution is not yet finished. In this case, the process advances through NO to S5005. Here, the timeout callback held in the timeout callback holding unit 4907 is obtained. Advancing to S5006, judgment is made as to whether or not the timeout callback is obtained. When it is not obtained, the process advances to S5010 and the device conflict solution processing unit is instructed to stop the advance device conflict solution, and the process ends. When the timeout callback is obtained in S5006, the process advances through YES to S5007, the timeout callback is called, and the fact that the processing has not finished in time is notified. As a return value, the timeout callback returns whether to extend or to end the advance device solution processing.

When the return value is "NO", the processes advances to S5010, the device conflict solution processing unit is instructed to stop the advance device conflict solution, and the process ends. When the return value is "YES", in order to extend the device conflict solution processing, the process advances to S5009, and an alarm is requested to the recording manager alarm 3203 by once again setting the timeout time managed by the device conflict solution interval management unit 3204, and the process ends. By requesting the alarm to the recording manager alarm 3203, the sequence in FIG. 50 is once again initiated after the timeout time elapses.

Note that in the present embodiment, in resetting the alarm in S5009, the timeout value held in the device conflict solution interval management unit 3204 is used as the time interval of the alarm. However, it is possible to obtain a new timeout value as the callback return value called in S5007, and use such value. In such a case, the judgment to be performed in S5008 is different from the abovementioned description. When the return value is greater than 0, it is considered that the device conflict solution processing is to be extended and the process advances to S5009, and when the return value is less than 0, it is considered that extension will not be carried out and the process advances to S5010.

Moreover, although in the present embodiment, the process ends after the advance device conflict solution is stopped in S5010, further device conflict solution processing may be carried out as described in the previous embodiments. For example, Java program priority solution may be carried out as in the second embodiment, and recording may also be started mandatorily as in the third embodiment. Conflict solution may also be carried out using the various judgment policies in the fourth embodiment onward. Furthermore, in such case, the device conflict solution processing to be selected can be determined using the callback return value. For example, it is also possible to have mandatory starting of recording when the value is "−1", Java program priority solution when it is "−2", and solution using a judgment policy when it is "−3".

Furthermore, although in the present embodiment, the interval for processing once again is specified and an alarm is set in S5009, it is also possible not to assume the processing once again and wait indefinitely. In this case, the processing by the device conflict solution processing unit 3206 is waited for indefinitely, and upon ending, the device conflict solution processing unit 3206 initiates the recording manager 1606 and the recording process is started.

The number of embodiments described above show embodiments of the present invention, but other embodiments can be implemented as long as the objects of the present invention are achieved.

Although the embodiments show a configuration for a cable system, the present invention is not dependent on the type of the broadcast system. For example, the present invention can also be easily applied in a satellite system, a ground wave system, or a broadcast program distribution system using an IP network In addition, as the present invention has no direct relationship with the differences of the respective broadcast systems, it can be applied to an arbitrary transmission medium regardless of the broadcast system. The present invention is also independent of differences in wired and wireless systems.

The AV decoder does not necessarily have to decode video and audio simultaneously. The present invention can be implemented even with a structure having a separate video decoder and audio decoder. Furthermore, it is also acceptable for the AV decoder to have a decoding function for data such as closed captioning. An audio signal and video signal decoded by the AV decoder may be scrambled in any arbitrary stage up to when they are stored in the recording area 1404.

Although the embodiments show examples which introduce an adapter that controls the conditional access system, an adapter is not necessarily required to implement the present invention. The adapter may be of any format, and a configuration without an adapter is also possible, In such a case, in FIG. 14, the MPEG-2 transport stream from the tuner is inputted directly to the TS decoder. The present invention can also be applied in this case.

Furthermore, the descrambling by the adapter does not necessarily have to be carried out before the TS decoder. A structure in which descrambling using an adapter located in an arbitrary position can be easily adopted and, the present invention can also be applied in such case as well.

The encoding format used by the AV encoder for the audio signal and video signal may be any arbitrary format. The present invention can be applied with any encoding format.

The multiplexing format of the multiplexer may be any arbitrary format. The present invention can be applied with any multiplexing format.

The display and the speaker may be included inside the broadcast recording and reproduction apparatus, and an external display and speaker may also be connected to the broadcast recording and reproduction apparatus. The present invention can be applied independently of the location and number of the display and the speaker.

The present invention can be implemented even when the CPU itself is a system which performs, in combination, all or a number of processes such as TS decoding, AV decoding, AV encoding, and multiplexing.

As for the format for recording a service, it is also possible to record the MPEG-2 transport stream output from the tuner directly into the recording area, without passing through the TS decoder, or provide a translator which converts the format of an MPEG-2 transport stream and convert the format of the MPEG-2 transport stream from the tuner and record this in the recording area. The present invention can be implemented regardless of what service recording scheme is used.

Although in some Java virtual machines, the bytecode is passed on to the CPU and executed after being translated to an execution format that can be understood by the CPU, the present invention is also applicable for such cases.

Although in the preceding embodiments, the implementation method regarding the AIT is described with the transport stream being obtainable from the In-band, the technique for referring to the Java program to be executed by the AM is not limited to that which uses the AIT. OCAP, which is assumed to be used in the United States cable system, uses the XAIT which describes reference information of application programs in the OOB described in FIG. 3. Aside from this, other methods such as initiating a program recorded beforehand in the ROM, initiating a program downloaded and stored in the secondary storage unit, and the like, may also be considered.

In some of the embodiments, it is mentioned that the privileged program sets the judgment policy for the case where the advance device conflict solution cannot meet the scheduled recording start time, in this case, a plurality of judgment policies may be used simultaneously. For example, by specifying a channel identifier indicating a service for which recording is prioritized, as well as its time slot, it becomes possible to specify so that recording is prioritized only for a service matching a condition and, in addition, for the time slot which matches the condition. This is not limited to a pairing of the channel identifier and the time slot, and is also possible for any combination of the judgment policies mentioned.

Furthermore, in the present invention, the "time interval to be traced back from the recording start time to the start of the advance resource conflict solution processing (advance device conflict solution processing) (described in the first embodiment with 60 seconds as an example)" may be for any number of seconds, as the value set by the privileged program is to be used. In addition, it is possible that, instead of being set by the privileged program, a value which is unique to the terminal is used. Furthermore, although the base time from which to trace back is the "recording start time", since there are cases where, depending on the terminal, time is already consumed during the preparation for the start of recording, such as in HDD rotation and the like, the base time may also be "a time traced back from the recording start time by an amount of preparation time which is unique to the terminal".

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention can be used in an electronic device which downloads an application from a broadcast signal, and executes the downloaded application.

What is claimed is:

1. A broadcast receiving terminal having a recorder and a reproducer, the recorder recording received video information and audio information into a recording medium, and the reproducer reproducing the received video information and audio information or the video information and the audio information recorded by the recorder, said broadcast receiving terminal comprising:

a schedule registration unit operable to register, according to a request from a first program executed in said broadcast receiving terminal, schedule information including a start time for executing recording and a duration for which the recording continues;

a schedule storage that holds the schedule information registered by said schedule registration unit;

a privileged program that includes a criteria for resolving a conflict, when the conflict occurs over a resource managed by a resource manager;

a resource conflict solver operable to examine whether or not it is possible to exclusively use a predetermined resource, in said broadcast receiving terminal, that should be reserved to execute the recording scheduled by the first program, and when the predetermined resource is already reserved by a second program executed in said broadcast receiving terminal, to perform a judgment process, according to the criteria included in said privileged program, to judge which program should reserve the predetermined resource, the recording being performed by the recorder;

a solution time interval storage that holds a time interval indicating how far ahead of a start time said resource conflict solver starts to function, the start time being held by said schedule storage; and a processor operable to execute the first program, the second program, and said privileged program, wherein said privileged program is received and recorded after said broadcast receiving terminal is turned on, said resource conflict solver starts to function upon reaching a point in time, which is a time ahead of the start time for executing the recording, the time ahead corresponds to the time interval held by said solution time interval storage, the start time being held by said schedule storage, and the program, which said resource conflict solver judges should reserve the predetermined resource, reserves the predetermined resource, and executes a predetermined process, or a recording based on a schedule, using the reserved resource.

2. The broadcast receiving terminal according to claim 1, further comprising said resource manager operable to manage a resource which is exclusively used according to a request from a program, in association with the program requesting use of the resource, the program being executed in said broadcast receiving terminal, and the resource being used, in said broadcast receiving terminal, for the predetermined process, wherein said resource conflict solver is operable to judge, by examining the resource managed by said resource manager, whether or not the predetermined resource is already reserved by the second program executed in said broadcast receiving terminal.

3. The broadcast receiving terminal according to claim 2, wherein, when said resource conflict solver determines that the first program should reserve the predetermined resource, said resource manager is operable to stop management of the predetermined resource in association with the second program, and to manage, according to a request from the first program, the predetermined resource in association with the first program, the predetermined resource being exclusively used in said broadcast receiving terminal.

4. The broadcast receiving terminal according to claim 3, wherein, when said resource conflict solver determines that the first program should reserve the predetermined resource, said resource manager is operable to notify the second program to release the reserved resource in said broadcast receiving terminal.

5. The broadcast receiving terminal according to claim 1, wherein the first program and the second program respectively have information indicating a priority level, and when the judgment process by said resource conflict solver does not end by a start of a time that is newly scheduled by the second program, said resource conflict solver is operable to terminate the judgment process, and to judge that the program having a higher priority level should reserve the predetermined resource.

6. The broadcast receiving terminal according to claim 1, wherein, when the judgment process by said resource conflict solver does not end by a start of a time that is newly scheduled by the second program, said resource conflict solver is operable to terminate the judgment process, and to judge that the first program should reserve the predetermined resource.

7. The broadcast receiving terminal according to claim 1, wherein said privileged program specifies the time interval held by said solution time interval storage.

8. The broadcast receiving terminal according to claim 1, further comprising:
a judgment policy registration unit operable to register a judgment policy for said resource conflict solver to judge which request, among requests from the programs, to accept; and
a judgment policy storage which holds the judgment policy registered by said judgment policy registration unit,
wherein said privileged program registers the judgment policy using said judgment policy registration unit, and
when the judgment process by said resource conflict solver does not end by the start time in the schedule, said resource conflict solver is operable to terminate the judgment process, and to judge which of the programs should reserve the predetermined resource, using the judgment policy held by said judgment policy storage.

9. The broadcast receiving terminal according to claim 8, wherein said judgment policy storage holds, as the judgment policy, a flag indicating whether to prioritize the recording according to a request from the first program or to prioritize the predetermined process according to a request from the second program, and when the judgment process by said resource conflict solver does not end by the start time in the schedule, said resource conflict solver is operable to terminate the judgment process, and to judge which of the programs should reserve the predetermined resource, based on the flag.

10. The broadcast receiving terminal according to claim 8, wherein said judgment policy storage holds, as the judgment policy, a time slot in which recording is prioritized, and when the judgment process by said resource conflict solver does not end by the start time in the schedule, and when the start time in the schedule is included in the time slot in which recording is prioritized, said resource conflict solver is operable to terminate the judgment process, and to judge that the first program should reserve the predetermined resource.

11. The broadcast receiving terminal according to claim 8, wherein said judgment policy storage holds, as the judgment policy, a time slot in which recording is prioritized, and when the judgment process by said resource conflict solver does not end by the start time in the schedule, and when a time slot of the schedule is included within the time slot held by said judgment policy storage, said resource conflict solver is operable to terminate the judgment process, and to judge that the first program should reserve the predetermined resource.

12. The broadcast receiving terminal according to claim 8, wherein said judgment policy storage holds, as the judgment policy, channel identifiers corresponding to video information and audio information for which recording is prioritized, and when the judgment process by said resource conflict solver does not end by the start time in the schedule, and when a channel identifier of a channel corresponding to audio information and video information to be recorded is included in the channel identifiers held by the judgment policy storage, said resource conflict solver is operable to terminate the judgment process, and to judge that the first program should reserve the predetermined resource.

13. The broadcast receiving terminal according to claim 8, wherein said judgment policy storage holds, as the judgment policy, broadcast program identifiers of broadcast programs for which recording is prioritized, and when the judgment process by said resource conflict solver does not end by the start time in the schedule, and when a broadcast program identifier of a broadcast program corresponding to audio information and video information to be recorded is included in the broadcast program identifiers held by the judgment policy storage, said resource conflict solver is operable to terminate the judgment process, and to judge that the first program should reserve the predetermined resource.

14. The broadcast receiving terminal according to claim 13, wherein the broadcast program identifier specifies a plurality of broadcast programs.

15. The broadcast receiving terminal according to claim 8, wherein said judgment policy storage holds, as the judgment policy, resources, in said broadcast receiving terminal, for which recording is prioritized, and when the judgment process by said resource conflict solver does not end by the start time in the schedule, and when a resource reserved by the second program is included in the resources held by the judgment policy storage, said resource conflict solver is operable to terminate the judgment process, and to judge that the first program should reserve the predetermined resource, the second program being executed in said broadcast receiving terminal.

16. The broadcast receiving terminal according to claim 1, wherein said schedule registration unit is operable to receive a flag indicating whether to prioritize recording or to prioritize the predetermined process, when the conflict occurs over the predetermined resource, in said broadcast receiving terminal, that should be reserved in order to execute the recording by the recorder, said schedule storage holds the flag in association with the schedule information, and when the judgment process by said resource conflict solver does not end by the start time in the schedule, the recorder terminates the judgment process by said resource conflict solver, and causes said resource conflict solver to judge which program should reserve the predetermined resource, based on the flag associated with the schedule information.

17. A broadcast receiving method used in a broadcast receiving terminal including a recorder, and a reproducer, the recorder recording received video information and audio information into a recording medium, and the reproducer reproducing the received video information and audio information or the video information and the audio information recorded by the recorder, the broadcast receiving method comprising:

receiving and recording a privileged program after the broadcast receiving terminal is turned on, the privileged program holding a criteria for resolving a conflict when the conflict occurs over a resource in the broadcast receiving terminal;

registering, according to a request from a first program executed in the broadcast receiving terminal, schedule information including a start time of executing recording and a duration for which the recording continues;

holding the registered schedule information in a schedule storage;

examining whether or not it is possible to exclusively use a predetermined resource in the broadcast receiving terminal, that should be reserved to execute the recording scheduled by the first program, the recording being performed by the recorder;

performing, when the predetermined resource is already reserved by a second program executed in the broadcast receiving terminal, a judgment process, according to the criteria held by the privileged program, to determine which program of the first and second programs reserves the predetermined resource;

holding, in a solution time interval storage, a time interval indicating how far ahead of a start time the examining starts, the start time being held by the schedule storage; and executing the first program, the second program, and the privileged program, wherein, the judgment process is started upon reaching a point in time, which is a time ahead of the start time for executing the recording, the time ahead corresponds to the time interval held by the solution time interval storage, the start time being held by the schedule storage, and the program, which is determined to reserve the predetermined resource in the judgment process, reserves the predetermined resource, and executes a predetermined process or a recording based on a schedule, using the reserved resource.

* * * * *